July 14, 1970  G. W. MEADOWS ET AL  3,520,656
SILICON CARBIDE COMPOSITIONS
Original Filed Jan. 21, 1963  3 Sheets—Sheet 1

AGGREGATED BOCASI POWDER

GRIND OR CRUSH →

DISAGGREGATED BOCASI POWDER

DISAGGREGATED BOCASI POWDER

PEPTIZE →

BOCASI SOL

INVENTORS
GEOFFREY W. MEADOWS
PAUL C. YATES

BY John R Powell

ATTORNEY

July 14, 1970   G. W. MEADOWS ET AL   3,520,656
SILICON CARBIDE COMPOSITIONS
Original Filed Jan. 21, 1963   3 Sheets-Sheet 3

INVENTORS
GEOFFREY W. MEADOWS
PAUL C. YATES

BY John R. Powell

ATTORNEY

United States Patent Office 3,520,656
Patented July 14, 1970

3,520,656
SILICON CARBIDE COMPOSITIONS
Geoffrey W. Meadows, Kennett Square, Pa., and Paul
C. Yates, Wilmington, Del., assignors to E. I. du Pont
de Nemours and Company, Wilmington, Del., a corporation of Delaware
Application Jan. 9, 1963, Ser. No. 250,442, which is a continuation-in-part of application Ser. No. 824,943, July 6, 1959. Divided and this application Mar. 30, 1966, Ser. No. 538,693
Int. Cl. C01b *31/36, 33/06;* C22c *29/00*
U.S. Cl. 23—208        12 Claims

ABSTRACT OF THE DISCLOSURE

Silicon carbide having an average particle size of less than a micron and characterized as having a crystallite atomic extensity coefficient of between 4.60 and 8.80 and an X-ray diffraction line broadening coefficient of between $9 \times 10^{-2}$ and $3.6 \times 10^{-4}$ is prepared by reacting a silicon-containing reactant with a carbon-containing reactant in a molten metal halide bath at a temperature between 400 and 1100° C. in the presence of an alkali metal or alkaline earth metal reducing agent. The silicon carbide is particularly useful in preparing dense, hard, refractory bodies.

---

This is a divisional application of our copending application Ser. No. 250,442, filed Jan. 21, 1963, which in turn is a continuation-in-part of then copending application Ser. No. 824,943, filed July 6, 1959, now abandoned.

This invention relates to super-refractory materials and is more particularly directed to: particulate borides, carbides and silicides, as dry products or sols and to processes for their production, to disaggregated macro-molecular powders of such borides, carbides and silicides and to processes for their production, and to super-refractory articles which are polycrystalline, heteromorphous articles having sub-microscopic crystallite size and containing juxtaposed units of borides, carbides or silicides which are maintained out of uniformly contiguous relation by the interposition of a heterosomatic refractory, and to processes for their production.

In the drawings, the various forms of the invention are depicted starting with a particulate submicron boride, carbide, or silicide powder of the invention.

I. PROCESSES OF MAKING THE POWDERS OF THE INVENTION

Figure 1:
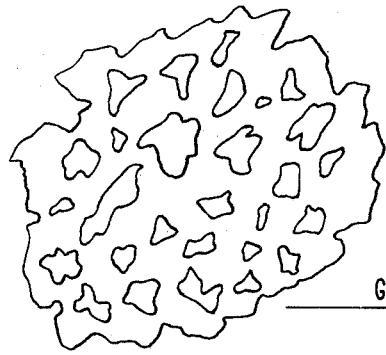
FIG. 1 illustrates the disaggregation of this powder into ultimate units of discrete particles.
Figure 1:
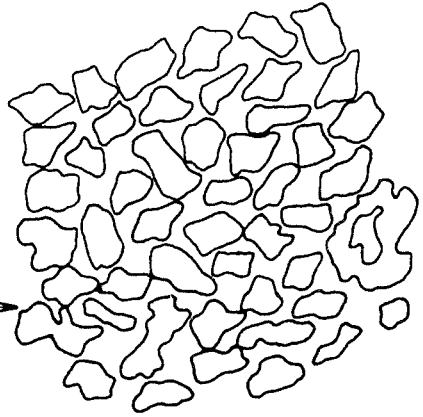
Figure 2:
FIG. 2 illustrates the disaggregation and peptizing of the powder to form a sol of silicon carbide and it is to be noted that the sol of FIG. 2 is shown as being amenable to drying to produce the disaggregated powder of FIG. 1.
Figure 2:
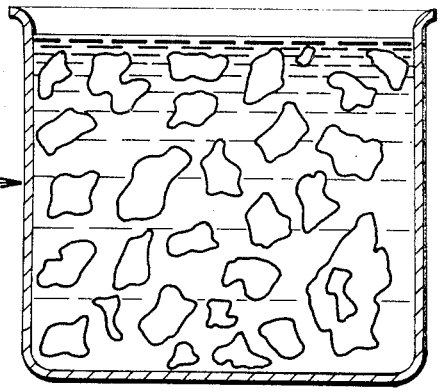
Figure 3:
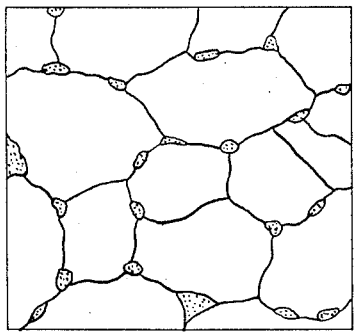
FIG. 3 illustrates a super-refractory, polycrystalline heteromorphous article of the invention shown in cross section and, shows relatively large juxtaposed particles which are kept out of uniformly contiguous relationship by small interspersant units at the grain boundaries.

The processes of the invention are directed to the preparation of particulate metal analogue compositions which for convenience are herein called bocasi compositions. The term "bocasi" refers to the borides, carbides and silicides of the invention which are selected from the group consisting of the carbides of boron and silicon, silicon borides, and the borides, silicides, and carbides of titanium, zirconium, hafnium, vanadium, niobium, tantalum, chromium, molybdenum and tungsten. The bocasis, as just described, can in particulate form, be inter-mixed with an interspersant, as will be hereinafter described. The interspersant can be selected from one of the above-named bocasis, but will be one that is different from the other bocasi with which it is mixed. For convenience, when the interspersant is also a bocasi, it is herein referred to as a heterosomatic bocasi. The interspersant can also be another of the refractories selected from the group consisting of oxides of beryllium, zirconium, hafnium, aluminum, calcium, magnesium, thorium, uranium, chrominum, yttrium, lanthanum, and the rare earths of atomic numbers 58 through 71; nitrides of titanium, zirconium, hafnium, aluminum, boron, beryllium, thorium and uranium; carbides of thorium, uranium, berryllium, and carbon.

(a) Process for preparing the bocasi powders

The bocasi powders of this invention are produced by processes in which the bocasi is formed by chemical reaction in a fused salt bath. By using fused salt as the reaction medium it is possible to control the temperature of the reaction, and by using such proportions of the reactants as to yield the desired stoichiometric quantities of the essential elements in elemental form upon reduction and by using stoichiometric proportions of the reducing metal the concentrations of the reacting essential elements is controlled at a desired high level so as to give an abundance of new nuclei for crystallite formation. The result is that the bocasi is retained in the form of discrete macro-molecular particles or crystallites which, except for their inorganic constituents, are similar in structure to organic polymer molecules. As will be hereinafter further described, the discrete bocasi particles exhibit a degree of three dimensional bonding of atoms within specific limits which is analogous to the combining of monomers to form molecules of organic polymers. This degree of three-dimensional atomic bonding is hereinafter expressed as the crystallite atomic extensity coefficient and, as will be further described, the particulate bocasi products of this invention have an average crystallite atomic extensity coefficient ranging from 4.60 to 8.80.

(b) Control of crystallite atomic extensity

The extent of atomic bonding in the microcrystalline products is determined by the reaction time and temperature and by the solubility of the reactants and products in the melt system. For a particular product the extent of atomic bonding in the ultimate particles will increase with time and temperature, but this effect will be minimized in the case of those products which have low solubility in the melt. Broadly speaking, solubility is related to melting point and at the same melt temperature the extent of atomic bonding in the ultimate particle is an inverse function of the melting point of the product. For example, molybdenum disilicide (M.P. 2030° C.) prepared at 880 to 900° C. has an average crystallite atomic extensity coefficient from 7.6 to 7.7, whereas silicon carbide (M.P. 2600° C.) made at the same temperature has an average crystallite atomic extensity coefficient from 4.6 to 4.7. Moreover, increasing the temperature of the melt by 100° C. greatly increases the average crystallite atomic extensity coefficient in the case of molybdenum disilicide, but has little effect upon the atomic extensity coefficient of the silicon carbide crystallites. The effect of reaction time is similar, in that products having higher solubility in the melt will exhibit increased crystallite atomic extensity coefficients with prolonged exposure to high temperature in the molten system. Consequently, the time and temperature conditions required to give a desired average crystallite atomic extensity coefficient are dependent on the nature of the product, as will be apparent from the examples given hereinafter.

The degree of crystallite atomic extensity in the melt is minimized by maintaining a high degree of supersaturation of the reacting species. This leads to the continuous creation of fresh nuclei during the process, and limits the degree of atomic extensity in the microcrystallites formed in the earlier stage of the reaction. In preferred processes of the invention the concentration of the reactants in terms of their essential elements should be at least 100-fold the concentrations required by the solubility product of the bocasi being produced.

In particular it is desirable to control the rate of addition of the reactants so as to maintain in the melt a degree of supersaturation of the reacting bocasi essential elements as just mentioned. This can conveniently be accomplished by mixing the reactants at a sufficiently high initial concentration and maintaining this concentration level throughout the process. The degree of supersaturation in the melt at any given moment can be readily ascertained by drawing off a sample and determining the concentration of the essential elements therein according to ordinary techniques of analytical chemistry.

The maintenance of a supersaturated condition in the melt becomes more important at higher temperatures, and with the lower melting products, in order to minimize crystallite atomic extensity and avoid formation of particles having a wide range of atomic extensity in the final product. In some applications of the products of the invention, however, a controlled crystallite atomic extensity distribution may be advantageous and the process of the invention is readily adaptable to the preparation of such compositions by careful control of the above-mentioned reaction variables.

(c) Types of molten salts used

The fused salt can be a single salt or a mixture of salts. Broadly, the salt or salts can be any which do not decompose at the temperature of the reaction. Molten halides are preferred, since it is desired to maintain a reducing environment throughout the reaction system. Particularly preferred are the chlorides of the alkali or alkaline earth metals and eutectic-forming mixtures of these salts. For temperatures above 600° C. lithium chloride, sodium chloride and calcium chloride are most useful.

The salt employed must, of course, be more difficult to reduce than the corresponding precursor of the bocasi undergoing reduction. For example, $WO_3$ could be reduced by sodium in a $NaCl-AlCl_3$ melt in the presence of carbon to form WC, but $NaCl-AlCl_3$ could not be used as a reaction medium to reduce $TiO_2$ with calcium in the presence of carbon to form TiC because of the greater ease of reduction of the solvent system itself and the probability of a competing reaction.

(d) Reactants

Each of the reactants will contain one of the elements of the bocasi, but obviously not the same one.

Chemically, a reactant can be any material which forms one of the components of the bocasi in the elemental state under the reducing conditions existing in the molten salt bath. Either of the reactants can be the element itself, and either or both can be a compound containing the element, said compound being reducible during the reaction to give the element. In other words, at least one of the reactants is such a compound of an essential element of the bocasi to be produced. In such a compound reactant the essential element will have a positive valence. For example, when titanium dichloride is used as a reactant and source of titanium in making titanium silicide, the titanium has a positive valence of two.

In a preferred aspect of the invention at least one of the reactants will be soluble in the fused salt bath. The speed of the reaction is increased as the particle size of the reactants is diminished, and the most rapid rate of reaction is achieved when both reactants are molecularly dispersed—that is, are in solution.

The type and variety of reactants that can be used will be apparent from the numerous examples given hereinafter.

(e) Reducing agents

The reducing conditions are provided by having present the amount of an alkali or alkaline earth metal stoichiometrically required to reduce the positive-valenced element to its zero-valence, i.e., its elemental state. Chemical reaction occurs to form the particulate bocasi and the heating is continued until the bocasi particles become flocculated. These flocculated particles are separated from the melt, as by filtering them off.

The reducing agent is selected from metals of the group consisting of alkali and alkaline earth metals. Thus, the metal can be, for example, sodium, potassium, lithium, calcium, magnesium, barium, or strontium: sodium, calcium or magnesium being preferred.

(f) Temperatures

It will be remembered that the present processes are concerned with reactions at very high temperatures, and in certain of the preferred processes it can be theorized that the elements of the bocasi are formed in the reaction mixture in a nascent, highly reactive form.

The temperature of the reaction is in the range of from 200 to 1200° C. More particularly it is preferred to operate in the range of from 400 to 1100° C., the range from 600 to 1000° C. being especially preferred.

(g) Initiation of reaction

To initiate the reaction the reactants are dispersed with agitation in the molten salt bath. The dispersion can be molecular, as when the reactant actually dissolves in the bath, or it can be colloidal, as when colloidal carbon is used to form carbides. The dispersion can be of particles even larger than the colloidal range, especially when the other reactant is soluble in the bath. The nature and degree of the agitation of the bath should be sufficient to disperse the reactants substantially uniformly throughout the bath as fast as they are added. Such dispersion is facilitated, of course, by adding the reactants continuously or in small increments, and in stoichiometric proportions.

It is essential when adding the reactants and reducing agents, whether continuously or in small batches, to maintain correct stoichiometric proportions as close as feasible to those of the elements in the desired product. The manner in which this is accomplished is described in more detail in the illustrative examples. The correct stoichiometric proportions of reactants, of course, are those which provide the essential elements in the same atomic ratio as they have in the desired bocasi. The correct stoichiometric proportion of metal reducing agent is that required to convert the positive-valenced essential elements in the reactant compound or compounds to the zero valenced, elemental form. It will be understood, of course, that some of the desired bocasi can be formed even without such control of stoichiometry, but the product will be contaminated with impurities.

While it is desirable to build up the concentration of the bocasi product as much as possible in the fused salt bath, in practice it will seldom exceed 30%.

To avoid excessive oxidation, the reaction should be conducted under an inert atmosphere, such as helium or argon, from which oxygen has been removed by passing the gas over titanium sponge heated to 700 to 800° C.

(h) Materials of construction of reactor

The material used for constructing the equipment which is to come into contact with the melt is important from the standpoint of the product purity. Corrosion problems become more severe as the temperature is increased, and even if the mechanical strength of the material of construction is not impaired, the corrosion products will contaminate the melt and consequently the product. The most satisfactory materials of construction from the standpoint of corrosion resistance are the non-metallics such as graphite, impervious alumina and zirconia, and silicon nitride-bonded silicon carbide. These materials are used despite the fact that they are relatively difficult to fabricate, are lacking in mechanical strength, and, in most cases, are sensitive to thermal shock. These deficiencies are minimized by careful equipment design.

At the highest temperature used, corrosion and strength properties of most metals and alloys are such as to render them unsatisfactory, and above 1000° C., non-metallic materials are preferred. High-melting metals or alloys coated with ceramic or other non-metallic materials by flame spraying or sintering are particularly useful in the practice of the invention in the higher temperature range. Below 1000° C., high temperature alloys such as "Hastelloy" B and C, "Haynes" 25 and "Inconel" are satisfactory in most instances.

(i) Recovery of products

In the reaction the bocasi is formed initially in the form of discrete macro-molecular crystallites. As the reaction progresses and the heating is continued these ultimate particles or crystallites become substantially flocculated in the fused salt bath. The heating is continued until this flocculation has proceeded to a substantial degree. It will be understood, however, that such flocculating of the particles is not equivalent to increasing the crystallite atomic extensity, since in the flocculated product the ultimate particles or crystallites are still discernible.

With the exception of boron carbide, the density difference between the bocasis and the molten salt phase is sufficient to cause the flocculated bocasi particles to concentrate at the bottom of the melt when stirring is discontinued. This permits a bocasi-rich fraction to be recovered by draining off the upper layer of salt. The recovered salt can be reused if desired.

Alternatively, most of the salt phase can be removed by filtration, using ceramic or fritted metal filters.

Still another alternative is to free the bocasi in the sedimented or filtered residue from salt by extracting the salt out of the solidified product using anhydrous solvents such as methanol or ethylene glycol. This is accomplished by repeated cycles of slurrying with the extracted solvent and recovering the desired product by filtration or centrifugation.

It will be understood that while the bocasi is separated from the fused salt bath at this point in a flocculated, i.e. a loosely aggregated, condition, it is not so highly aggregated that it resists redispersion. On the contrary, the product is so loosely agglomerated that it is readily peptized to form suspensions or sols in liquid media.

(j) Exposure of products to oxygen

In processes of this invention, after the bocasi has been formed it can at some point be exposed to an oxygen-containing environment. Such exposure can be made as part of the step of recovering the product from the molten salt bath, as by employing an aqueous extraction method. Water is considered an oxygen-containing environment because the bocasi, by reason of its high surface area and very reactive surface, can react with the water and combine with the oxygen therein, to form either the oxide or hydrated oxide of the bocasi.

This reaction with water is a surface reaction and its rate decreases rapidly as the surface of the bocasi becomes covered with oxides or hydrated oxides of the elements in the bocasi, provided that the pH is such that the oxidation products are insoluble. Also, in order to prevent excessive attack on the bocasis the aqueous extraction is carried out at low temperatures—say, in the range of 0 to 10° C. The pH is controlled between the limits of about 4 and 10 during the extraction, the particular choice of pH being dependent on the stability of the oxide formed. In the case of silicon carbide a pH of 7 to 8 is preferred. The object of the pH control is to maintain a stable oxide layer on the surface of the bocasi particles and thus prevent further attack.

If the bocasi has been recovered from the salt without exposure to an oxygen-containing environment it can subsequently be subjected to the oxygen-containing environment to provide an oxide coating on the bocasi particles. This can be accomplished merely by bringing the particles into contact with an oxygen-containing atmosphere or an atmosphere containing moisture, the amount of oxygen or oxygen-containing component in such atmosphere being no more than that which it is desired to incorporate into the bocasi. Also, means are provided for controlling the temperature during such exposure, since the reaction with the bocasi is exothermic and should not be permitted to get out of hand. After the bocasi particles have reacted with oxygen to the desired extent the product is relatively immune to further reaction and can even be exposed to air without deleterious results.

The percentage of oxygen by weight which is combined with the bocasi in the foregoing oxidation step is in the range of from $$\frac{18D^2+12D+2}{5D(\rho D^2+1.8D+1.2)}$$

to 25%, where $D$ is the average particle diameter in millimicrons and $\rho$ is the density of the bocasi in grams per milliliter. In preferred aspects of the invention it is preferred that the oxygen content be within the range of $30/\rho D$ to 10%.

(k) Purification of products

As previously discussed, the bocasi products are recovered from the salt reaction medium by various processes, including filtration and dissolution of the salt in a suitable aqueous or non-aqueous solvent, followed by centrifugation. Owing to the high surface area and loosely flocculated state of the products at this point, they will still contain a considerable quantity of residual salt, reaction by-products, and corrosion products arising from attack on the equipment used during synthesis. In some instances, it will be found that the formation of a corrosion layer, usually of an oxide, on the surface of the bocasi particles will be sufficiently extensive that it is desirable to remove this layer by further purification. For any or all of the above purposes, further purification steps can be included to prepare products of optimum purity.

The first step in such purification is usually to expose the bocasi particles to a relatively concentrated, aqueous solution of a non-oxidizing acid, preferably a monobasic acid such as hydrochloric acid. The bocasic products of this invention are usually sufficiently insoluble that it is possible to treat them with concentrated acid at elevated temperature, for example, 100° C. This acid treatment dissolves by-products such as calcium oxide and it also leaches the metal ions out of complex impurity by-products such as calcium silicate, which would otherwise make subsequent purification steps less effective.

Following the treatment with acid, the product is recovered by filtration or by centrifugation, washed to remove excess acid, and treated with other possible purification reagents. For example, in the case of most silicides or silicon carbide, the corrosion layer on the surface developed during the previous recovery by aqueous dissolution of the salt, often comprises silica or of metal silicates. These can be removed substantially completely by the addition of hydrofluoric acid, or concentrated solutions of sodium hydroxide or other reagents which are known to attack silica. Here again, the reaction can be conducted at an elevated temperature. The product can then be washed and recovered as previously discussed.

Contamination in the form of transition metal ions such as iron can be encountered if equipment such as stainless steel is used in the fused salt reaction. These can be removed by treatment with complexing agents such as ethylenediamine tetraacetic acid, hydroxyacetic acid, citric acid, and others known in the art for their ability to form soluble, stable complex ions with the transition metals.

Finally, further purification can be accomplished by treating the bocasi products at high temperature with gases. Silicon carbide can be freed from oxygen by mixing it with an amount of carbon black stoichiometrically equivalent to the oxygen content of the product, and heating at 1400 to 1600° C. under a vacuum or in a stream of inert gas such as argon. By these procedures, it is possible to obtain bocasis of substantially 100% purity.

(1) Preparation of mixed products

It is understood that although the foregoing description has related to the preparation of a particular bocasi, the same techniques can be used to prepare complex mixtures of the bocasi powders of this invention, and, in addition, certain mixtures of these bocasis with grain growth inhibiting refractory materials. When more than one bocasi is prepared simultaneously by suitable reduction reactions in the salt melt, the final product comprises a very intimate mixture of the two or more bocasis particles. This occurs in those instances where the bocasis are essentially insoluble in one another. If, however, two bocasis are simultaneously prepared which show a substantial degree of mutual solubility in one another, for example, titanium carbide and tungsten carbide, a mixed crystal type of bocasi, in which both constituents are present in a common lattice is formed.

A mixture of boron carbide and silicon carbide can be prepared by feeding silica, boric oxide, magnesium and carbon in stoichiometric proportions into a rapidly stirred melt held at 900° C. of calcium chloride. When stoichiometric proportions are maintained for all of the above reactants, the product recovered will be an intimate macro-molecular mixture of boron carbide and silicon carbide. As further described hereinafter, such mixtures have a special utility in forming dense, solid, very finely-crystalline bodies.

A considerable number of mixtures of a bocasi with various refractory non-bocasi compounds can also be prepared. One can, for example, prepare a mixture of molybdenum disilicide and titanium nitride by a reaction in which a mixture of calcium molybdate, titanium dioxide, calcium nitride, calcium, and carbon are introduced simultaneously into a calcium chloride melt.

One can similarly prepare complex mixtures of various refractory oxides with the bocasis products of this invention by a suitable choice of the oxide concerned and close control over stoichiometry. Thus, for example, since thoria is much more difficult to reduce than is silica, it is possible to prepare a macro-molecular mixture of silicon carbide and thoria by feeding a reaction mixture of colloidal thoria, silica, and carbon, along with a suitable reducing agent such as sodium, calcium, or magnesium metal simultaneously into the molten salt. If only enough reducing agent and carbon are introduced to allow for the stoichiometric formation of silicon carbide from the silica present, the thoria will remain in an unreduced state and will be recovered as an intimate macro-molecular mixture with the macro-molecular silicon carbide.

A wide variety of other complex or composite powders may be prepared by this method, as will be readily apparent to anyone skilled in the art, and as will be illustrated further in the examples given.

II. BOCASI POWDER PRODUCTS (a) General characteristics

As mentioned hereinabove, the bocasi powders of the present invention are comprised of sub-micron macromodecular particles which, except for their inorganic constituents, can be likened in structure to organic polymer molecules. The discrete particles or crystallites of the powders exhibit three-dimensional atomic bonding which is analogous to the combining of monomers to form molecules of organic polymers. Because of this macro-molecular characteristic, the bocasi powders of the present invention compared to the corresponding massive bocasis heretofore available exhibit a discontinuity of chemical and physical properties and a discontinuity of methods or processes for their preparation.

In addition to the above-mentioned degree of crystallite atomic extensity of the bocasi particles of this invention, their macro-molecular characteristic is further illustrated by a comparison of their dimensions with other known molecules. For example, when silicon carbide is prepared by chemical means so that the particles or crystallites are comprised of silicon and carbon atoms linked together three dimensionally to form a mass 25 millimicrons in diameter, this dimension is only about 10 times as large as a stearic acid molecule, a relatively small organic molecule, and is considerably smaller than the lengths of many organic polymer molecules. Thus, being macro-molecular in character the bocasi particles of this invention combine chemically with other compounds and exhibit physical properties of cohesion and adhesion.

Ordinarily, reduction of particle size does not appreciably change the chemical reactivity of the solid material. Grinding a powder to pass a screen of 100 meshes per inch does not increase the solubility of the powder or make it behave chemically in an appreciably different manner. However, when crystallites which exhibit a relatively small degree of atomic extensity are formed in the manner of the present invention they assume a chemical and physical behavior which is different in kind from the pulverized massive state.

The macro-molecular bocasis of the invention exhibited a marked capacity to combine chemically with a protein such as gelatin or albumen. This unique protein combining capacity provides an additional excellent means for identifying and characterizing the particular bocasi products of the present invention, since pulverized bocasi products exhibit no such protein combining capacities. This will be hereinafter further described.

Additional chemical behavior of the macro-molecular bocasi powders of this invention can be exemplified by the characteristics of one of them, silicon carbide. It is so chemically reactive that when it is rubbed on glass, it reacts chemically with the surface to form a thin metallic-like film which cannot be rubbed off. Conventional silicon carbide powder similarly rubbed on glass produces only abrasion and there is no chemical combination between them as it does not adhere to the surface of the glass.

Further, submicron, macro-molecular silicon carbide powders which are chemically synthesized by the processes of the present invention, spontaneously dry to coherent, adherent films which are relatively clear and which resemble films of organic macro-molecules such as cellulose and polyvinyl alcohol. Conventional wet silicon carbide powder dries to a loose, flaky and dusty powder which exhibits neither cohesion nor adhesion.

(b) Particulate character

The bocasi compositions are particulate in character. They are made up of ultimate particles or crystallites which are macro-molecular. These ultimate particles can be aggregated but the aggregates are loosely bound together and are easily redispersible. Thus, the bocasi products can be in the form of fine powders in which the ultimate particles are held together merely by surface forces, and they can be in the form of sols by dispersing them in water or organic liquids, such as lower alcohols, for instance methanol, ethanol, propanol, butanol, or glycols or glycol derivatives such as ethylene glycol, or diethylene glycol monoethylether or glycol monoethylether.

It is the macro-molecular characteristic of the bocasi particles which makes it possible to bring these materials into intimate contact with each other or with other subdivided macro-molecular refractory substances so that the dense polycrystalline, heteromorphous articles of the present invention can be made. Such articles have a novel sub-micron grain size by which they obtain outstanding strength and resistance to thermal shock as will be described hereinafter.

(c) Particle dimensions

The bocasi particles have an average dimension in the range of 10 to 250 millimicrons, preferably from 10 to 100 millimicrons. It will be understood that the dimension given is an average one, but ordinarily all three dimensions of the particles here involved are about the same, so that for practical purposes the dimension can be considered the diameter of a spherical particle.

The particle dimension can be determined by any method with which the art is already familiar. It can be measured directly by observation of electron micrographs. It can also be calculated from nitrogen adsorption data as described in "A New Method for Measuring the Surface Area of Finely Divided Materials and for Determining the Size of the Particles," by P. H. Emmett in "Symposium on New Methods for Particle Size Determination and the Subsieve Range" in the Washington Spring Meeting of A.S.T.M., Mar. 4, 1941.

The surface area of the particles or crystallites in square meters per gram, A, is related to the average diameter, D, in millimicrons (m$\mu$) according to the expression $$D = \frac{6000}{\rho A} \text{ m}\mu$$

where $\rho$ is the density of the bocasi, if the particles are approximately spherical in shape, or by the expression $$D = \frac{4000}{\rho A}$$

if they are in the form of fibers or long rods.

(d) Microcrystalline character

The bocasi products of the invention are microcrystalline and are readily characterized by X-ray diffraction analysis of the powders. A particular bocasi is identified by comparison of its measured "d" value with the published "d" value for that bocasi in macrocrystalline form. Although the diffraction pattern enables this identification to be made, the diffraction lines of the novel compositions differ substantially from those obtained for the corresponding macrocrystalline materials with respect to both their breadth and their relative intensities, as explained in greater detail hereinbelow.

The pure breadth of a diffraction line is readily determined by procedures described in detail in such standard tests as "X-ray Diffraction Procedures" by Klug and Alexander, published by John Wiley and Sons, Inc. (1956). Using this quantity the compositions of the invention are described by the following equation:

$$K' = \frac{\beta \cos \theta}{\lambda}$$

$\beta$ is the pure angular breadth in microns of a powder reflection free of all broadening due to the experimental method employed in observing it.
$\lambda$ is the wavelength of the X-rays in Angstroms
$2\theta$ is the angle of deviation of the diffracted beam.

K', designated the line broadening coefficient, is a function characteristic of the compositions of the invention and the nature of the radiation used. Thus, for monochromatized CuK radiation, the range of permissible values for K'$\alpha$ is $9 \times 10^{-2}$ to $3.6 \times 10^{-4}$. Similarly for monochromatized MoK$\alpha$ radiation, the range of permissible values for K' is $1.84 \times 10^{-1}$ to $7.35 \times 10^{-4}$.

A number of factors influence line broadening in X-ray diffraction patterns and these fall generally into two categories, namely, microcrystalline effects and lattice distortion effects. Thus, the observed broadening is a function of the mean crystallite diameter, the nature of the crystallite distortion and the shape of the individual crystallites. The nature and distribution of lattice distortions throughout thet crystallites is also reflected in the broadening of X-ray diffraction lines. In principle it should be possible to estimate the relative proportions of the crystallite-diameter lattice-distortion influences producing a mixed type of broadening, but actually this subject has not yet been developed to a point permitting accurate quantitative measurement. However, it is not necessary to do this in order to adequately define the products of the invention and it will be understood that the above factors may best be considered collectively in terms of the foregoing expression.

Thus, the nature and distribution of lattice distortions is closely related to the extent to which oxygen is present in the compositions and to the manner in which the oxygen is associated with the lattice in the microcrystalline particles; however, at the very lowest levels of oxygen content the lattice distortion is minimized and the observed broadening of the diffraction lines is primarily a function of the crystallite diameter, shape and diameter distribution variables. Although the lattice factors are subject to modification by the process conditions it is considered that the latter have a more profound effect on the particle geometry. It will be observed that the bocasi products with which this invention is concerned are the carbides, borides and silicides of the Groups IV, V and VI transition metals and additionally the carbides of silicon and boron and the silicon borides. It is well known that these materials exist in a variety of crystalline forms and in many cases several stoichiometric compositions. For example, silicon carbide is obtained as the alpha form, having a hexagonal form or rhombohedral cell structure, and also as the beta form, a face-centered cubic lattice arrangement. The alpha form itself is known to exist in at least twelve crystalline forms, differing only in the arangement and number of layers in the unit cell. The following tabulation shows known forms of the bocasis which can be produced in a modified form according to the present invention.

TABLE 1.—CARBIDE COMPOSITIONS

| | Known composition |
|---|---|
| Boron carbide | $B_4C$; $B_6C$. |
| Silicon carbide | SiC [1]. |
| Titanium carbide | TiC. |
| Zirconium carbide | ZrC. |
| Hafnium carbide | HfC. |
| Vanadium carbide | VC; $V_2C$; $V_4C_3$; $VC_2$. |
| Niobium carbide | NbC; $Nb_2C$. |
| Tantalum carbide | TaC $Ta_2C$ [1]. |
| Chromium carbide | $Cr_{23}C_6$; $Cr_7C_3$; $CR_3C_2$; CrC; $CR_5C_2$; $Cr_4C$. |
| Molybdenum carbide | $Mo_2C$; MoC [1]. |
| Tungsten carbide | $W_2C$ [1]; WC. |

[1] In these cases, two or more crystalline forms have been reported.

(e) Mixtures of bocasis

It will be understood, of course, that the invention is applicable to mixtures of the various bocasis listed above. These can be produced directly, by simultaneously forming two or more of the bocasis in the fused salt bath, or can be obtained by mixing two or more species prepared independently.

(f) Degree of crystallite atomic extensity

The particulate bocasi products of the present invention, as stated hereinabove, are macro-olecular by being similar in structure to organic polymer molecules Corresponding to the degree of polymerization obtained in the formation of organic polymers, the bocasi crystallites of the present invention manifest a degree of atomic extensity. In other words, the expression, "degree of crystallite atomic extensity," refers to the total number of atoms which are three-dimensionally bonded to form a discrete bocasi crystallite in a manner analogous to the combining of monomers to form organic polymer molecules The degree of crystallite atomic extensity in the particulate bocasi products of the present invention is expressed as a coefficient, E, which is determined from the formula:

$$E = 24.42 + \log \frac{\rho n r^3}{M}$$

where $\rho$ is the specific gravity of the bocasi in grams per cubic centimeter;
$n$ is the number of atoms per unit formula of bocasi;
$r$ is the average radius of the coherent bocasi crystallite in centimeters as determined by an electron micrograph; and
M is the formula weight of the bocasi The crystallite atomic extensity coefficient can also be determined from the formula:

$$E = 13.85 + \log \frac{n}{M \rho^2 A^3}$$

where $\rho$ is the specific gravity of the bocasi in grams per cubic centimeter;
$n$ is the number of atoms per unit formula of bocasi;
A is nitrogen surface area of the bocasi crystallite in square meters per gram; and
M is the formula weight of the bocasi A third suitable determination can be made from the formula:

$$E = \log \frac{\rho n}{(K')^3 M} - 0.62$$

where $\rho$ is the specific gravity of the bocasi in grams per cubic centimeter;
$n$ is the number of atoms per unit formula of bocasi;
$K'$ is the line broadening coefficient of the coherent bocasi crystallite as determined by X-ray diffraction; and
M is the formula weight of the bocasi.

While all three of the above methods are generally suitable for determining the crystallite atomic extensity coefficient for the bocasi products of this invention, the third determination which employs the X-ray diffraction line broadening coefficient will in some instances, be inapplicable. If the line broadening coefficient has been overly influenced by lattice distortions in the bocasi crystallite, this determination for atomic extensity can not be relied upon to characterize the bocasi. Accordingly, the first two of the above three formulas provide the preferred means for characterizing the bocasi products of this invention.

Using a typical bocasi powder, silicon carbide, prepared in accordance with the invention, determination of the crystallite atomic extensity coefficient is exemplified as follows:

(1) E determined from electron micrograph.
SiC:

$$r = 5 \times 10^{-7}$$
$$\rho = 3.22$$
$$n = 2$$
$$M = 40$$
$$E = 24.42 + \log 3.22 \times 2 \times (5 \times 10^{-7})^3$$
$$= 24.42 + \log 20.07 \times 10^{-21}$$
$$= 24.42 - 19.70$$
$$E = \underline{4.72}$$

(2) E determined from nitrogen surface area.
SiC:

$$A = 186 \text{ M}^2/\text{g}.$$
$$\rho = 3.22$$
$$n = 2$$
$$M = 40$$
$$E = 13.85 + \log \frac{2}{40 \times (3.22)^2 \times (186)^3}$$
$$= 13.85 - 9.13$$
$$E = \underline{4.72}$$

(3) E determined from X-ray diffraction line broadening.
SiC:

$$K' = 9 \times 10^{-3}$$
$$\rho = 3.22$$
$$n = 2$$
$$M = 40$$
$$E = \log \frac{3.22 \times 2}{(9 \times 10^{-3})^3 \times 40} - 0.62$$
$$= 5.34 - 0.62$$
$$E = \underline{4.72}$$

Similar determinations for all of the particulate bocasi products of this invention characterize them as having average crystallite atomic extensity coefficients ranging from 4.60 to 8.80. This will be even more readily understood by reference to the numerous examples given hereinafter.

(g) Oxygen content

Certain of the novel compositions of the present invention are characterized by containing a minor, but definite, percentage of combined oxygen. The oxygen content is determined according to ordinary analytical procedures by analysis of the total product.

The percentage of combined oxygen in the products of this embodiment of the invention is broadly in the range from $$\frac{18D^2+12D+2}{5D(\rho D^2+1.8D+1.2)}$$

to 25%, where D is the average particle diameter in millimicrons and $\rho$ is the density of the bocasi in grams per milliliter. The densities of the bocasis are already well known and are in the range of about from 2 to 10. Thus, broadly, when $\rho=2$ and $D=1$ the lower limit of the percent oxygen is 1.0. When $\rho=10$ and $D=1$ the percent oxygen is 0.5. When $\rho=2$ and $D=200$ the percent oxygen is 0.09. When $\rho=10$ and $D=250$ the percent of oxygen is 0.015.

A preferred range of bocasi particle diameter is from 10 to 200 millimicrons. With particles in this range the preferred oxygen contents are within the range of $30/\rho D$ to 10%.

(h) Chemical reactivity—Protein combining capacity

As mentioned before, the macro-molecular bocasi products of this invention are characterized by chemical reactivity not found in the corresponding conventional bocasi powders. The high chemical reactivity is exemplified by the reaction of the macro-molecular bocasi with proteins to form bocasi-protein chemical complex. This chemical combining power of macro-molecular bocasi powders is also shown by the capacity of colored macro-molecular bocasis to act as a dye on fabrics which cannot be removed by washing. Also macro-molecular bocasis act as tanning and plumping agents in leather. It is known that conventional bocasi powders such as pulverized tungsten carbide or silicon carbide will not act as tanning or plumping agents.

One method of characterizing bocasi powders is to measure their protein combining capacity. When bocasi sols or bocasi powders of this invention are stirred into a gelatin at proper pH, the gelatin combines with the bocasi and is not separated from it by washing with water. In a typical test, one gram of macro-molecular bocasi solids is suspended in 100 cc. of water at a pH of about 4.0, and this is mixed with 200 cc. of a 1% solution of gelatin. The latter solution is freshly prepared by swelling 2 g. of "Knox XXX" gelatin in 25 cc. of cold water, then adding 173 cc. of water at 90° C., and stirring to obtain a clear solution; the pH is adjusted to 4.0 with a small amount of acetic acid. Then 100 cc. of the 1% suspension of bocasi solids at pH 4 is mixed with 200 cc. of the 1% gelatin solution, also at pH 4, and thoroughly stirred for 10 minutes. The mixture is centrifuged at sufficient speed to bring about sedimentation of at least 90% of the bocasi in the mixture. The supernatant liquid is discarded, and the precipitate is resuspended in 100 cc. of water and recentrifuged, until at least 95% of the bocasi in the suspension is again recovered as a precipitate. The supernatant liquid is discarded and the precipitate is dried in a vacuum oven at 60° C. at a pressure of 1 mm. of mercury. The powder is then analyzed for bocasi and for gelatin.

The protein combining capacity of the macro-molecular bocasi is expressed as grams of gelatin combined per 100 cubic centimeters of the bocasi. The macro-molecular bocasi powders differ greatly in protein combining power, when compared on a weight basis, because of the great differences in densities of different bocasis. For this reason, the protein combining power is expressed as grams of protein combined per 100 cc. of solid bocasi. Thus, where G grams of gelatin combine with 100 cc. of solid bocasi, G may be calculated from the chemical analysis of the complex, as follows: Where P=percent by weight gelatin in the complex by analysis, and B is the percent by weight of bocasi in the complex, than $$G=\frac{100Pd}{B}$$

For example, if the dried complex of gelatin with macro-molecular silicon carbide contained 10% by weight of protein and 80% by weight of silicon carbide and 10% of adsorbed water, the protein combining powder would be:

$$G=\frac{100\times10\times3.2}{80}=40$$

Thus 100 cc. of volume of solid bocasi in this instance combines with 40° g. of gelatin.

If the bocasi powders of this invention do not contain carbon or nitrogen, the percent by weight of protein can be calculated from the carbon or from the nitrogen content of the complex. Gelatin contains 17.5% by weight of nitrogen and 50% by weight of carbon.

(i) Utility

The bocasi powders of the invention are useful as binders in refractory bodies. They can be incorporated with relatively coarse powders of other refractory compositions to give products of greatly improved properties. Many refractory materials, also possessing very desirable high-temperature stability, are lacking in mechanical strength and resistance to shock, both thermal and mechanical. These deficiencies are related to poor binding between the particles of the refractory and to the difficulty of obtaining compositions approaching the theoretical density of the constituent material. The macro-molecular particles of the compositions of this invention enable greatly improved binding and higher densities to be obtained by conventional procedures such as dry pressing or slip casting, followed by sintering. The lower sintering temperatures which are required to form strong refractory articles constitute a further advantage of using the bocasi compositions of this invention as binders.

The particulate bocasis of the invention can also be used as materials of construction by powder metallurgy techniques. Thus, they can be hot-pressed, compacted under pressure and sintered, or fabricated by flame techniques, to form articles of any desired shape. Such articles are characterized by having unusually high impact strength and resistance to thermal shock.

They are also very useful as catalyst, catalyst supports, as extremely fine abrasive and polishing agents, as fillers and reinforcing agents in organic and inorganic polymers and glasses, and as the hard phase in dispersion-hardened metals.

The processes and bocasi powder products of the present invention will be better understood by references to the numerous illustrative examples given hereinafter.

III. BOCASI SOL PRODUCTS (a) Description of sols

In sols, sub-micronic particles are suspended in liquids such that minute convection currents invariably present under ordinary storage conditions, are sufficient to keep them dispersed indefinitely, especially if the specific gravity of the particle is not more than 2 or 3 times that of the liquid. When particles of greater specific gravity are suspended, they will tend to settle over extended periods of time even if the particles are of extremely small dimensions. However, such dispersions are still defined as sols as they can be readily rendered uniform in concentration by brief stirring.

In sols of this invention, the particles of the bocasi are mostly disaggregated and generally consist of so few aggregated crystallites that the average particle has a maximum crystallite atomic extensity coefficient of less than 8.80. In the case of the bocasis having a specific gravity in excess of 4 grams per cc., as measured for the solid, the crystallite atomic extensity coefficient of the particles in the sol is preferably less than 7.60 to prevent rapid settling. The specific gravity of the solid material in suspension is calculated from the specific gravity of the sol, the percent solids by weight present in the sol, and the specific gravity of the fluid medium. By this means, the specific gravity of the bocasi particles, because of their sub-micronic, macro-molecular nature, will usually calculate to be a few percent less than the specific gravity of the particular bocasi in its solid, dense state. However, the specific gravity of the particles will generally be found to be at least 85% of the specific gravity of the solid material.

In general, the bocasi sols are mobile fluids. At concentrations of higher than 5 or 10%, they become noticeably more viscous than the liquid medium and at even higher concentrations of 20% by weight of bocasi or more, the sols often become thixotropic.

The appearance of the sols can range from almost transparent to a jet black, depending upon the material and the crystallite atomic extensity coefficient of the bocasi particles. Thus, 1 percent sols of silicon carbide with a crystallite atomic extensity coefficient of 5.0 or smaller, are transparent, although somewhat opalescent. But 1 percent sols of tungsten carbide, molybdenum disilicide, titanium diboride, and titanium carbide having the same crystallite atomic extensity coefficient are black and opaque. However, when they are greatly diluted, for example to 0.01% solids by weight, they become transparent and exhibit a clear, yellow, brown, or reddish shade with no sign of sedimentation.

For the most part, the sols of this invention are aqueous and contain sufficient amounts of acid or base to adjust the pH to the optimum for stability of the particular bocasi, and are substantially free of soluble salts.

(b) Conversion of powders to sols

During the initial stages of the extraction in the presence of relatively large amounts of salt, the bocasi particles are flocculated and the product is readily separated from the solvent by filtration. As more of the salt is removed the product becomes more dispersible and can best be recovered by high-speed centrifugation. The residues recovered in this way, although not entirely free from trace of salt, are usually readily dispersible using a colloid mill and adjusting the pH to obtain reasonably stable dispersions which may be used in fabricating novel refractory materials.

Sols of greater stability can be obtained by more complete removal of soluble salts by dialysis or treatment with ion exchangers such as "Dowex" 2 and "Dowex" 50 and subsequent adjustment of the pH of the sol to give the most stable dispersion. Such sols are usually dilute, the concentration of dispersed bocasi being of the order of 1% or less. The sols can be concentrated by careful evaporation of the solvent to obtain stable sols in the desired concentration range.

(1) Disaggregation of powders.—The bocasi powders, recovered from the molten salt reaction medium and purified, contain discrete, disaggregated primary particles or crystallites, and also usually contain aggregates of crystallites. When the powder is stirred, for example into water at suitably adjusted pH, only a portion of the bocasi particles are peptized or spontaneously dispersed to the sol state.

In order to obtain a high yield of sol from the bocasi powder, it is usually necessary to subject the powder to attrition, i.e. the aggregates to intense local shearing action. For this, colloid mills can be employed, such as those described in "Chemical Engineers Handbook," John H. Perry, Editor-in-Chief (third edition) McGraw-Hill, page 1169. Wet ballmilling can also be employed, the powder being suspended in a liquid medium such as water, at a pH suitable for peptization of the particular bocasi, and the suspension then subjected to attrition in a ball-mill. Other attrition means known to those skilled in the art can also be used.

An objection to attrition of a liquid suspension by ballmilling is that impurities often are introduced into the suspension from abrasion of the mill and balls. One alternative is to mill the powder with sodium chloride or other solid, water-soluble materials such as sugar, urea, starch, or the like. Sodium chloride is preferred as it is an inexpensive and effective milling diluent for such use. For example, from 0.5 to 2.0 parts by weight of salt can be mixed with the aggregated bocasi powder and milled in a ballmill for 3 to 24 hours, using enough solid material in the mill to minimize direct contact between the balls, and thus minimize their abrasion and the resulting contamination. Usually, an amount of salt and bocasi powder is employed which is sufficient to fill the spaces between the balls when the mill is at rest, the mill generally being about half full of balls.

Another very effective alternative is wet ballmilling the powder in a steel mill with steel balls, in the presence of enough water or organic fluid to make a paste or suspension.

A preferred technique is to wet ballmill a 20% dispersion of the bocasi powder in ethylene glycol in a steel ballmill which is filled to about 40% of its volume with ⅜" diameter steel balls, and which is rotated at speeds sufficient to cascade the load. The various factors required to give satisfactory milling conditions are discussed generally in a book entitled "Colloidal Dispersions," by L. K. Fisher of the National Bureau of Standards, published by John Wiley & Sons, and copyrighted in 1950.

Following the milling operations which break down the bocasi aggregates, if necessary, the powders can be purified to free it from any metallic impurities acquired from the mill and the balls. This can be accomplished by contacting the material with hydrochloric or acetic acid. Other strongly acidic, aqueous solutions of non-oxidizing acids can similarly be used.

The milled disaggregated powder is then separated from the balls by washing with water or an organic solvent such as acetone, and stirred in sufficient water to dissolve the water-soluble grinding aid. The macro-molecular disaggregated bocasi particles are flocculated in the presence of the strong salt solution or organic solvents and are readily removed by filtration or sedimentation. The salt or grinding aid remaining in the product is then removed by suspending the product in water and washing it by decantation or by treatment in a dialyzer or electrodialyzer. The salts can also be removed by using ion exchange resins or, alternatively, by maintaining the bocasi particles in a flocculated condition by washing them with ammonium carbonate solution. Other schemes known in the art for removing the water-soluble grinding aids from the disaggregated particles can be used.

For example, another particularly advantageous method of recovering the disaggregated bocasi particles from the water-soluble grinding aids and other impurities is to subject the suspension to the action of a high speed centrifuge. The wet sedimented particles are redispersed in the washing medium, usually water, by high speed stirring, and then again centrifuged out. This process is repeated until the bocasi particles are substantially free from salt. Subsequently, the recovered bocasi particles, when redispersed in a fluid medium such as water, will not remain in dispersion but will be flocculated and can be readily recovered.

Further purification of the bocasi particles is preferred and often desirable for preparing stable sols. The oxide content of the resulting powders can be brought to a relatively low level, in the range of 1 to 3%, by contacting the product with an aqueous caustic solution. Treatment with 5% sodium hydroxide in water at 90° to 100° C. for a period of an hour is suitable in most instances. Alternatively, contacting the bocasi particles with an aqueous solution of hydrofluoric acid is effective to reduce the oxygen content considerably.

Transition metal impurities can be removed by treating the milled, dispersed bocasi particles with chelating agents to form soluble complex ions with the impurity ions. For example, iron impurities and Groups II and III metal impurities such as calcium and aluminum can be removed with ethylenediamine tetraacetic acid, citric acid, and other known chelating agents capable of tying up transition metal and Groups II and III metal impurities.

Unless the salt content is maintained at a relatively high level during the purification and washing steps, it will frequently be found that the particles have a tendency to redisperse. Such redispersion can be prevented by adding ammonium bicarbonate or ammonium carbonate to flocculate the bocasi particles without adding any non-volatile impurities as the ammonium carbonate evaporates easily from the particles.

Another method for removing both ammonium bicarbonate and other salt contaminants is by treating the particles with anion and cation exchange resins, or by dialysis.

All of these techniques can be employed after the purification and disaggregation of the dry bocasi powder products, and thus give a substantially pure sol containing no foreign materials.

(2) *Peptizing disaggregated bocasi at optimum pH.*—The milled bocasi powder, which often still contains some aggregated particles or crystallites which have escaped the attrition process, is then suspended in a peptizing medium. The powder is suspended in water and the pH adjusted to a value where the surface of the bocasi particles becomes ionically charged. Acids with monovalent anions such as acetic, hydrochloric, or nitric acid, can be used for lowering the pH, and monovalent cation bases such as ammonium hydroxide, lithium hydroxide, potassium hydroxide, sodium hydroxide, or tetramethylammonium hydroxide can be used for raising the pH.

The optimum pH for each bocasi can be determined as follows: A sample of the wet, washed, partially or completely disaggregated macro-molecular bocasi powder is suspended in the liquid in which it is to be dispersed, at a solids concentration of 2% by weight. Then separate portions of this suspension are adjusted to a series of pH values ranging between pH 1 and pH 13 by the addition of 2 normal hydrochloric acid and 2 normal sodium hydroxide. In regard to the bases, sodium hydroxide solution will generally be used, but if suitable dispersion does not occur at any pH, then tetramethylammonium hydroxide is used. The number of samples provides the above range of pH values in increments of 0.5 pH units. Each of the mixtures is then subjected to high speed mixing in a homogenizer, for about one minute. Then the mixtures are permitted to stand for two hours. At the end of this time, the upper half of each sample is withdrawn and the concentration of bocasi by weight is determined. The pH at which the highest concentration is found is the optimum pH for peptization of the bocasi particles. The pH is preferably determined by means of a pH meter employing a glass electrode.

In most instances, a simple visual comparison of the peptized sample is adequate to determine optimum pH values for the bocasi dispersions. At optimum pH value, the particulate bocasi suspension is very stable such that the bocasi particles do not settle. The samples in which peptization does not occur contain a settled precipitate and a clear supernatent liquid.

After the bocasi has been suspended in the liquid medium at optimum pH for peptization, the mixture can be subjected to intense agitation to separate any weakly flocculated aggregates and to permit the surface of all the particles to become ionically charged.

Loosely flocculated bocasi particles are separated by subjecting the suspension to mechanical shear. This can be accomplished by passing the suspension through a high speed gear pump and ejecting it from a nozzle under pressure, or by high speed agitation in a mixing device having a stirrer or propellor blade rotating at several thousand r.p.m.

Then the mixture is permitted to stand so that the aggregated material, if any, will settle, leaving the uniformly dispersed bocasi particles in suspension. The process can be hastened by controlled centrifugation. Separation can be achieved because there is a difference in the rate of sedimentation of the aggregates and the diecrete, macro-molecular bocasi particles or crystallites. For optimum yield, the settled aggregates, separated and recovered as a sludge, should be resuspended in more of the fluid medium at the optimum pH, and again permitted to settle so that any occluded, discrete, ultimate, macromolecular particles or crystallites will be released to remain in suspension for recovery.

Once the disaggregated, discrete macro-molecular bocasi particles have been separated from the aggregates, the dilute sol can be concentrated by flocculating the sol with ammonium carbonate, centrifuging and removing supernatent liquid, and leaving the precipitated bocasi particles as a filter cake. This cake is then resuspended at higher concentration in fresh liquid medium at optimum pH. The sols can also be concentrated by other means such as evaporation, electrodialysis and the like.

(3) *Salt content.*—It has been pointed out that most of the salts or electrolytes should be removed before peptizing the bocasi particles at optimum pH. Knowing the degree of removal of electrolytes is helpful in preparing the bocasi sols of this invention.

The degree of salt removal can be followed by chemical analysis or by measuring the electrical conductivity of the suspension of bocasi particles. Where the salt that is present is a univalent electrolyte such as sodium chloride, the salt level should be reduced to well below 0.1 normality, and preferably below 0.001 mormality. Also, the specific resistivity of the solution should be greater than about 2000 ohm-cm., and preferably greater than 10,000 ohm-cm.

Polyvalent anions and cations are undesirable if the charge of the polyvalent ion is opposite that of the charge on the macro-molecular bocasi particle in suspension. Trace amounts of salts such as aluminum chloride or ferric chloride, for example, will prevent the peptizing of negatively charged bocasi particles such as silicon carbide. In general, the maximum concentration of ionic impurities in the aqueous phase during the peptization process should be such that the concentration of the ions, having a charge opposite that on the bocasi particles, is less than $10^{-1}$ normal for monovalent ions, $10^{-3}$ normal for divalent ions, and $10^{-4}$ normal for trivalent ions. Preferably the concentration of said oppositely charged ions is one tenth as much as the maximum concentration just stated.

(c) Characteristics of Bocasi sol products (1) *Concentration.*—The concentration of the bocasi in the sol can vary widely from 0.1% to 50% by volume. In the case of certain very dense materials such as tungsten carbide suspended in water, the sol may be as high as 90% by weight of tungsten carbide. In the case of materials of lesser density such as silicon carbide, the concentration may be as high as 50% by weight. Such sols usually have a high viscosity and often are even thixotropic; that is, they may exhibit a relatively low viscosity when stirred, yet have a very high viscosity, exhibiting gelatinous characteristics, when agitation is stopped. If high density bocasi sols are to be stored for some time, a certain degree of thixotropy will be found advantageous. It prevents settling and separation of smaller from larger macro-molecular particles when mixed bocasi particles are in suspension, so that a homogeneous composition is maintained.

When the sols are to be used for many of the purposes of the present invention, and especially when they are to be mixed with other substances in a uniform manner, they should be diluted preferably to less than 10% by weight of bocasi product. Such sols are more fluid and are most easily diluted or mixed with other fluids to obtain homogeneous, uniform mixtures. In instances of extremely divided bocasis having crystallite atomic extensity coefficient as small as 4.60 to 5.00, it is advantageous to employ sols as dilute as 0.1% by weight of solids. This is particularly true when the sols are to be mixed with solutions containing soluble salts which promote aggregation of the bocasi particles. In this case, dilution to 0.1% concentratitn or less retards aggregation and maintains the micro-molecular bocasi particles in a discrete, non-aggregated state for a period of time sufficient for the particle of bocasis to be homogeneously mixed with other components.

(2) *Atomic extensity coefficients and shape of crystallites.*—The atomic extensity coefficient and shape of the particles or crystallites in bocasi sols is related to the atomic extensity coefficient and shape of the ultimate crystallites of bocasi. The particles can consist of single crystallites or of very small aggregates of crystallites. The atomic extensity coefficient of the crystallites will range from about 4.60 to 8.80, with a preferred range being from 4.60 to 7.60. A few bocasi particles in sols may have atomic extensity coefficients less than 4.60, but the average crystallite atomic extensity coefficient in sols will generally be at least 4.60.

Depending upon the particular bocasi, and the method of its preparation, the particles are corpuscular or isodiametric; fibrillar or rod-like; or laminar or plate-like. In fibrillar particles, the minimum dimension is the thickness of the particle, the next smallest dimension is the width, and the greatest dimension is the length. In laminar or plate-like particles, the minimum dimension is the thickness of the plate, while the width and length, if the platelet is isodiametric, is approximately equal. If the shape of the laminar particle is ribbon-like, then the width of the platelet is less than the length.

When the particles in bocasi sols are isodiametric, the particles are rounded; where crystallites are rod-like, the particles are generally elongated and can consist of bundles; where crystallites are plate-like, the particles may be flake-like in shape.

Generally bocasi particles with a crystallite atomic extensity coefficient in excess of 8.8 will not pass through fine filter paper in a gravity filter; they diffuse to a negligible extent and do not pass through a dialyzing membrane; they are microscopically visible under optimum conditions; also they settle out of suspension. Such particles are not sub-micronic, macro-molecular particles.

Particles or crystallites with an atomic extensity coefficient from 4.60 to 8.8 are sub-micronic and macro-molecular. Irrespective of their shape, such particles pass through ordinary filter paper under suction, but do not pass through a dialyzing membrane, nor can they be seen as individual particles in an optical microscope. Also, such particles do not readily settle out of suspension.

(3) *Degree of dispersion.*—As described hereinabove macro-molecular powders which are disaggregated to consist only of discrete ultimate particles are peptized to a sol when they are placed in water at such a pH that the surface of the particles becomes ionically charged. When sols are prepared from bocasi powders which are not completely disaggregated, suspensions are obtained from which the aggregates with a total crystallite atomic extensity coefficient larger than 8.80 tend to settle out more rapidly than the single, discrete macro-molecular particles. Finer aggregates having a total crystallite atomic extensity coefficient less than 8.80 settle out only very slowly. If the aggregates have a total atomic extensity coefficient less than about 7.60, any settling is unlikely.

The preferred bocasi sols of this invention contain macro-molecular particles which are disaggregated and discrete. A small proportion of aggregates comprising 10% of the material can be present if these are macro-molecular aggregates. The preferred sols contain less than 99% of the bocasi particles in the form of aggregates.

The degree of disaggregation of the bocasi powder can be determined by removing samples during the milling operations and examining these with an electron microscope. The support for the sample, such as a plastic film or a copper screen is advantageously treated with a solution of a protein or other polymeric amphoteric electrolyte and dried before it is contacted with the bocasi suspension. A drop of the bocasi sol or suspension is placed on the screen for a few seconds and then removed. The substrate is then washed with several washes of distilled water before allowing it to dry. The particles are bound to the charged sites created by the ionization of the protein polyelectrolyte precoating. Thus, both discrete crystallites as well as aggregates which exist in the solution are retained on the substrate as a monolayer.

Determination of disaggregation of bocasi powders can also be accomplished by allowing the particles to settle either under the influence of gravity, or, in the event that the aggregates are extremely fine, centrifugal sedimentation can be used.

Angular dependence light scattering is also another useful method for such determinations.

(i) *Viscosity of sols and centrifugal volume.*—Viscosity measurements on bocasi sols can be used to indicate the degree of dispersion of discrete ultimate crystallites. Since the viscosity of a suspension is a function of particle shape, atomic extensity, and degree of aggregation, the following viscosity techniques are best used as supplementary rather than primary methods for establishing the degree of disaggregation.

A purified sol is adjusted to a given concentration and pH, at various stages during the milling process, and the viscosities of their solutions determined by viscosity pipettes or other conventional techniques. Simultaneously, studies are also made by sedimentation and electron micrograph methods to establish the degree of aggregation corresponding to the particular viscosity observed. Once a product has been characterized in this fashion, viscosity may be empoyed for all subsequent similar materials as a quick and convenient method for determining reproducibility.

Where the ultimate macro-molecular bocasi particles are isodiametric or roughly spherical, the viscosity of a sol of a given concentration is less when the particles are all separate and discrete than when some of them are present as aggregates. The "dispersed phase" in sols of discrete particles consists of the crystallite particles and the very thin, almost molecular film of aqueous medium adhering to their surfaces. However, in sols containing aggregates, the "dispersed phase" is made up of the whole volume of the aggregates, including the bocasi particles as well as the medium which is present in the spaces between them in the aggregates. Thus the degree of dispersion of the bocasi or the presence of aggregated particles is reflected by the percent by weight of bocasi in the dispersed phase. The present of bocasi in the dispersed phase is at least 40%, and preferably at least 50%. Most preferred are sols in which the dispersed phase is at least 90% by weight of bocasi. In other words, dense discrete particles which contain no spaces between ultimate crystallites are most preferred.

Mooney (J. Colloid, Sc. 6, 162–170, 1951) has developed the relationship between viscosity and the percent solids in the dispersed phase for spherical macro-molecular particles;

$$\ln \mathrm{Nr} = \frac{2.5\,c}{1.1.43\,c}$$

where ln Nr is the natural logarithm of Nr, the relative viscosity of a sol. The quantity $c$ is the fraction of the total volume which is occupied by the viscosity-creating phase. Although the macro-molecular bocasi particles described herein are not necessarily spherical, one can calculate a relative value of $c$ using the above Mooney equation. From this, one can obtain a relative estimate of the percent bocasi by weight in the dispersed phase from the relation:

$$S = \frac{Z}{c(1-FZ)+FZ}$$

and $$Z = \frac{d_b - dm}{100 d_b}$$

where $d_b$=density of solid bocasi in grams per cc.
$dm$=density of liquid medium in grams per cc.
$Z$=percent bocasi in the sol
$S$=percent by weight of bocasi in dispersed phase
$c$=volume of dispersed phase per unit volume of sol.

In the above expression $c$, the volume of the dispersed phase can be determined from the viscosity measurements.

The percent S in the dispersed phase is determined when there is essentially no ionic charge on the particle surface. If an ionic charge is present, a considerable amount of solvent will be associated with the particles in the form of solvent molecules held as hydrated water by the counterions surrounding the charged particles as an electrical double layer to maintain the overall electrostatic neutrality of the system. Under these conditions, viscosity is a function not only of the degree of aggregation, shape, and atomic extensity of the bocasi particles, but also of the salt content, pH, charge, type of the salts present, and many other variables. Therefore, meaningful measurements are made only at the isoelectric pH of the particular bocasi under study.

For silicides and silicon carbide, the isoelectric pH in aqueous solution is about a pH of 3.0. For other bocasi materials it is determined by extrapolating the "suspension" effect as a function of pH to a pH where it drops to zero. This is done by making measurements of the pH of bocasi suspensions at a salt content of a 1:1 electrolyte such as sodium chloride at .001 to .0001 moles/liter over a range of pH values. The same sol can be dialyzed for 24 hours and the pH of the dialysate plotted as a function of pH will become zero at the isoelectric pH. This technique is described in greater detail in an article by G. H. Bolt, in J. Phys. Chem., 61, 1166 (1957).

Thus for spherical particles and aggregates of such particles, viscosity measurements conducted at the isoelectric pH will give reliable percent S values as previously described. If the aggregates are shown by electron micrographs and sedimentation studies to have a total crystallite atomic extensity coefficient less than about 8.80, the percent S determined from viscosity measurements are greater than 50%. Values ranging from 60 to 70% are more desirable. Completely disaggregated sols comprising completely dispersed ultimate macro-molecular, bocasi crystallites have percent S values even greater than 90%.

For sols and suspensions containing bocasi aggregates having a total atomic extensity coefficient greatly in excess of 8.80, as well as for those containing numerous rod-like particles or platelets or other markedly anisometric particles, viscosity techniques are less useful for determining the degree of aggregation. The percent S of such sols can be better determined by centrifugation.

If the solids in the suspension are centrifuged out at several different centrifuging speeds, the wet-packed volume of the bocasi particles are quite sensitive to changes in the centrifugal force (speed of centrifuge) at the lower speeds, but at higher speeds will approach a limiting value at which higher speeds no longer cause any further change in volume. This limiting speed is about 10 times that required to centrifuge the particles out of solution in about 10 minutes.

The wet-packed volume is a measure of the aggregation of the sols. The volume fraction of bocasi particles in the wet-packed volume should be about 40% or higher. Ideally, it can approach as high as 72% by volume for perfectly dispersed or non-aggregated bocasi sols. Values above 50% are preferred, while those between 60 and 72% are most preferred.

(ii) *Settling rates.*—Since all of the bocasis in the solid state have a density greater than most liquid media, bocasi particles will settle rapidly from suspension unless they are macro-molecular particles. For example, a spherical bocasi particle with a crystallite atomic extensity coefficient of 13.0 having a density of 10.5 g./cc. will fall one centimeter in water in about eight minutes. If the same bocasi material is a macro-molecular spherical particle having a crystallite atomic extensity coefficient of 8.50, it requires over 12 hours for the particle to settle one centimeter in water. A homogeneous sol can be maintained with only occasional stirring every few days. A preferred macro-molecular particle with a crystallite atomic extensity coefficient of about 4.8 will settle one centimeter in water in about 58 days; actually, it will settle very little under normal conditions, because settling is opposed by slight convection currents.

Under ordinary storage conditions, slight variations in temperature cause convection currents in the suspended liquid which interfere with settling of the particles. Under practical conditions in large containers, sedimentation is not a problem if the particles are macro-molecular by having a crystallite atomic extensity coefficient smaller than about 8.80.

For bocasis having densities as high as 10 g./cc. it is preferred that the ultimate particles in the sol have a crystallite atomic extensity coefficient of less than about 7.60 to prevent settling during prolonged storage. In all bocasis, a crystallite atomic extensity coefficient of about 5.50 or less is most preferred, because concentrated sols can be prepared which remain dispersed over almost unlimited periods of time. Such sols are extremely stable.

Particles which consist of aggregates of crystallites, settle more rapidly than single discrete particles. Also aggregates having a total crystallite atomic extensity coefficient less than 8.80 settle more slowly than those having a higher total coefficient. Sedimentation techniques are therefore a useful way to remove aggregates of particles from discrete particles and also lesser aggregated particles from greater aggregated ones.

The sedimentation process can be accelerated by centrifuging. By careful control of centrifugal force and settling time, nonmacro-molecular aggregrates are removed from the bocasi sols of this invention. For bocasis having a solid density of between 10 and 20 g./cc., a sedimentation time of 24 hours removes aggregates having a crystallite atomic extensity coefficient greater than 8.80 from a sol stored in water at a depth of 12 inches. For bocasis having a density of 5 to 10 g./cc., a settling period of 5 days, or a centrifugation equivalent to settling for 5 days, removes most of the aggregates. Bocasis of still lower density than 5 g./cc. require somewhat longer settling times, but it is generally found that sedimentation under the influence of gravity for a period of 10 days will remove nonmacro-molecular aggregates from all bocasi sols when stored in water at a depth of 12 inches.

(iii) *Filtration of bocasi sols.*—Sols consisting of discrete isodiametric macro-molecular bocasi particles will pass through conventional filter paper such as Grade E and D No. 615 (Eaton and Dikeman Co.). Nonmacro-molecular aggregates are retained by such filters. When the sols contains such aggregates, the rate of filtration will decrease as the aggregates plug the paper. Accordingly, filtration is generally not very successful for the removal of aggregates from sols, except where such aggregates constitute less than about 10% of the total bocasi particles by weight present. Filtration is primarily valuable for purifying or characterizing bocasi sols having a crystallite atomic extensity coefficient not greater than 7.60, and preferably not over 5.50. Preferred bocasi sols contain ultimate discrete particles with a crystallite atomic extensity coefficient to give a degree of dispersion such that when 1 liter is passed through a 20 cm. diameter filter paper, type No. 615 E and D, at least 90% of the solids pass through the filter.

(iv) *Dry packing density.*—Sols of macro-molecular bocasi particles are dry to form densely packed solid residues with a shiny surface. But, bocasi sols containing non-macro-molecular particles or aggregates of particles, dry to residues which are highly porous and have a dull "mud-cracked" surface.

The cold-pressed packing densities of dried powders made from the preferred bocasi sols of the invention provide a very useful method of characterization. The preferred bocasi sols of this invention dry to residues, which when tested according to the following methods, yield coherent compacts having a density of at least 40% of the theoretical density of the solid bocasi. Preferably, packing densities of at least 50% of the theoretical density of the corresponding solid bocasi are desired. In some instances, where isodiametric bocasi particles which are completely disaggregated are dispersed in the sol, the dried residues show a cold-pressed packing density of 60% or more of the theoretical solid density.

The dry packing density of the micro-molecular bocasi in the preferred sols of this invention is readily determined. Two hundred grams of the sol containing about 2 cubic centimeters of bocasi particles in water, free from soluble impurities, is placed in a shallow dish having a diameter such that the layer of sol is about 0.5″ in depth. The sol is dried in air until a thick paste is formed. The paste is placed in a vacuum oven and heater at 50° C. under a vacuum of 25″ of mercury, while sweeping nitrogen through the oven to remove water. When the residue shows less than 0.1% further loss in weight on additional drying for 1 hour, it is then pulverized in a vibratory mill. Suitable for such milling is one known as a "Mixer Mill," manufactured by Spex Industries, Inc., Scotch Plains, N.J., and which is shown in their Catalog No. 8000.

The residue is milled for 15 minutes. Maintaining the length of time and the type of milling constant, standardizes the reduction of the bocasi powder to a uniform state of granulation suitable for consistently reproducing the cold compaction test.

The milled bocasi powder is passed through a screen of 45 meshes per inch and loaded into the 0.50 inch diameter cylindrical cavity of a steel die fitted with two close-fitting flat-ended steel pistons or plungers. The internal surface of the die and surface of the pistons are preferably lubricated with a 3% solution of stearic acid in carbon tetrachloride which is allowed to dry. One piston is inserted in the die and 3 grams of the powder is then spread evenly in the cavity. The other plunger or piston is then inserted in the other end of the die and the powder compacted in a hydraulic press at a pressure of 9 tons per square inch. This pressure is maintained for 1 minute and then gently released over a period of 15 seconds. The compacted pellet is removed from the die by unilateral hydraulic pressure.

The pellet is weighed to the nearest 0.01 gram and the height of the pellet is measured with a micrometer to the nearest 0.0001 centimeter. Since the diameter of the pellet is 0.5″, the area of cylinder cross-section is 1.27 sq. centimeters. The density of the pellet in grams per cubic centimeter is $0.785\ W/h$, where $W$ is the weight of the pellet in grams, and $h$ is the height of the pellet in centimeters.

Bocasi powders containing aggregates cannot be compacted to the same degree as when the powders contain only discrete macro-molecular particles, i.e., single crystallites. The aggregates consist of ultimate crystallites which are cemented together so strongly that even during the above described milling procedures and compaction under pressure, some of the aggregates can not be collapsed or broken apart. The bocasi sols of this invention which consist of discrete macro-molecular crystallites are particularly valuable for drying to powders, which are highly compactable and which, as described hereinafter form very dense bocasi bodies. They are particularly valuable for forming very dense, heteromorphous, submicron-grained articles.

However, if the diameter of the aggregates is not more than about ten times the diameter (maximum dimension) of the discrete macro-molecular crystallites in the powder, the packing density as measured by cold pressing, is over 40% of theoretical density. Such fine aggregated bocasi powders can still be used to make hot-pressed dense bocasi articles especially if a grain growth inhibitor or interspersant is incorporated as a solution or vapor and deposited within the pores of the aggregate. But, if the interspersant is introduced as discrete, submicron, macro-molecular particles, the juxtoposed units of bocasi particles preferably consist of aggregates having a total crystallite atomic extensity coefficient of less than 8.80 and more preferably consist of discrete single crystallites with a packing density, as measured above, of at least 50% of the theoretical solid density.

(4) *Chemical reactivity of bocasi sols.*—Sols of macro-molecular bocasi particles exhibit chemical reactivity not observed in suspensions of conventional bocasi powders. In the submicron, macro-molecular form, substantially all of the atoms in the bocasi are located at the surface of the crystallites. The latter behave as molecules of high molecular weight inorganic polymers, and as such exhibit definite and measurable chemical combining powder.

Finely pulverized powders of abrasive materials such as silicon carbide have no influence on the acidity or basicity of water in which they are suspended. On the other hand, a sol of macro-molecular bocasi powders of the present invention exhibits a definite pH titration curve different from that of water due to the chemical reactivity of the macro-molecular bocasi particle. The crystallies in aqueous suspension have surfaces comprised of acidic or basic groups, depending upon the type of bocasi. For example, the surface of silicon carbide is covered with SiOH groups; titanium carbide with TiOH groups; molybdenum disilicide with SiOH groups; and the surface of tungsten carbide is covered with WOH groups. The number and effect of such groups irrespective of their exact nature are appreciable in the macro-molecular bocasi sols of the present invention.

The pH titration curve of a bocasi sol is determined by removing the soluble salts and electrolytes as described hereinabove until the specific resistivity of the sol is at least 25,000 ohm-centimeters. The purified, salt-free sol containing from 10 to 300 grams of macro-molecular bocasi particles in 500 mls. of water, is titrated stepwise with 0.5 N hydrochloric acid to a pH of 3.0. Similarly, a pH titration with 0.5 N sodium hydroxide solution is set up with an identical suspension of macro-molecular bocasi particle, starting from the same pH value, until a pH of 11.0 is reached. The volumes of standard alkali and acid solutions required for each step sample are measured to the nearest 0.01 cc. From these measured volumes, a graph is constructed showing the total amounts of acid and base required to change the pH of the suspension stepwise to pH 2 and pH 12, respectively.

A similar acid and base titration of 500 ml. portions of distilled water, requires 1.00 ml. of 0.5 normal HCl and 1.00 ml. of 0.5 normal NaOH solution to reach pH's of 3 and 11.0, respectively. As a control blank, the amounts of acid or base required at each pH of the stepwise titration is subtracted from the volume of standard acid and base solutions required at each corresponding pH step of the bocasi suspendings. The acid-base capacity of the bocasi then is the total of the equivalents of acid and base required to reach pH 3 and pH 11, respectively, in the above titration.

From the above, it is evident that bocasi sols of the invention are polyfunctional acids or bases, depending upon the particular bocasi or bocasis present. This chemical reactivity of bocasi sols is expressed in chemical milliequivalents of acid-base capacity per 100 cubic centimeters of solid bocasi. For example, 100 cubic centimeters of solid silicon carbide weighs about 320 grams. The acid base capacity per 100 cc. of macro-molecular bocasi sols is at least 8 milliequivalents. Preferably, sols of the invention are preferred with an acid-base capacity of at least 30 milliequivalents, and most preferred are those with an acid-base capacity of at least 50 milliequivalents per 100 cubic centimeters of solid bocasi.

Macro-molecular bocasi sols of the invention also exhibit chemical reactivity by combining with gelatin. The "gelatin-combining-capacity" is measured for such sols by flocculating the macro-molecular bocasi particles with the addition of ammonium bicarbonate, decanting off the supernatant liquid and adjusting the pH to 4.0 with acetic acid. The gelatin combining power of the precipitated bocasi particles is then determined in the same manner as described hereinabove for the macro-molecular bocasi powder products of this invention.

The sol products of the present invention will be better understood by reference to the numerous illustrative examples given hereinafter.

IV. BOCASI DISAGGREGATED POWDER PRODUCTS

(a) Coherent aggregates in disaggregates

The extent of aggregation of macro-molecular particles in bocasi powders of this invention, directly affects the ability to make the strong, dense, fine-grained bocasi articles of this invention.

The nature of aggregates of particles is discussed by K. J. Mysels in "Introduction to Colloid Chemistry," Interscience Publishers, Inc., New York, 1959, substantially as follows:

"Particles which are not formed of smaller ones are called 'primary'—In the formation of larger ones, the primary particles may be joined by covalent or by the less specific ionic bonds, or by the much weaker Van der Waals forces."

As used herein, the term "ultimate particle" refers to the term "primary particle," as used above. Larger particles which are composed of joined smaller particles are called "aggregates." When aggregates are broken apart the process is herein referred to as "disaggregation." Furthermore, the aggregates which are formed by joining together primary particles with covalent bonds are referred to as "coherent aggregates." But, aggregates of particle held together by ionic or Van der Waals forces, which are weaker and less rigid, are called "flocculated aggregates." The term "disaggregation" is applied almost entirely to the breaking apart of "coherent aggregates." The loosely formed "flocculated aggregates" generally do not require "disaggregation" by mechanical means.

In the process of forming the submicron, macromolecular bocasi crystallites of this invention, they are sometimes grown or cemented together sufficiently to form coherent aggregates. In most instances, however, the majority of crystallities or ultimate particles are not rigidly attached to each other, but are held by the forces of flocculation to form flocculated aggregates. As such, the particles are attracted to each other in the manner of small magnets, but the assembly is readily disrupted. In the conditions in the medium which caused the flocculation are changed to oppose the forces of flocculation holding the particles together, the particles are spontaneously broken apart ad uniformly dispersed to form a stable sol.

But to form the disaggregated powder products of this invention, it is desirable to also break apart the coherent aggregates of crystallites which are sometimes present. They usually form during their synthesis in the fused salt reaction medium. They also form when the purified, washed particles are dried under such conditions that the particles become cemented together. For example, when bocasi powders are dried at excessive temperatures, such as 200 or 300° C. in air, oxidation of the bocasi particles occurs and the oxides formed at the surfaces of the particles act as a cement. Also, if the powder is heated in an inert gas to a temperature of several hundred degrees centigrade, sintering occurs to a sufficient degree to join the particles rigidly together by the primary chemical linkages of covalent bonds.

Aggregation and packing density

The presence of coarse, coherently aggregated bocasi particles in powders of this invention is undesirable for making dense bocasi articles. If such powder is pressed and consolidated by sintering to a non-porous body, the individual crystallites are not free to move under pressure and orient themselves into a closely packed state. Compacted powders which contain such coarse aggregates are porous. There are fine pores within the aggregates, and larger pores formed by the spaces between the aggregates. Compacts prepared from a powder of this type have a lower bulk density and are more porous than compacts prepared under similar conditions from powders in which the macro-molecular crystallites are fully disaggregated, or where the relatively few aggregates present are no larger than ten times the diameter of the ultimate macromolecular crystallites.

When a powder containing relatively large coherent aggregates is compressed, the aggregates are forced together, but the aggregates themselves do not ordinarily collapse. Consequently, when the pressed mass is heated in a subsequent sintering or hot pressing operation, the spaces within the aggregates remain as regions of higher porosity.

However, if the aggregates themselves are macromolecular, the pores between them are approximately the same size as the pores within the aggregates, so that sintering occurs homogeneously to give a dense, non-porous product. An even better result is obtained with a powder of disaggregated or individual submicronic, maco-molecular crystallites which are free to slip past each other under pressure to form an even more densely packed mass. Since the only porosity in such pre-formed bodies is that between close-packed ultimate crystallites, such bodies sinter to a dense, non-porous state most readily.

(b) Preparation of disaggregated powders (1) *From coherently aggregated powders.*—In dry bocasi powders of the invention, aggregate structures can be broken down by subjecting them to high compression or shear in grinding or milling operations.

Generally, ballmills are used to grind dense, massive, granular material to a finer powder which occupies a greater volume than does the original granular material. But, when a powder containing coherent aggregates of macro-molecular particles is ballmilled, the powder is converted to the more dense form of discrete, macro-molecular, ultimate particles which occupy less volume than the starting powder. This is because the original powder, consisting of larger aggregates of fine crystallites welded together, has been locally subjected to repeated compaction by ballmilling which collapses the aggregates.

The ultimate particles in the ballmilled bocasi powders of this invention are not again welded together, because they are highly refractory in nature. However, Van der Waal's forces of physical attraction can hold them together into dense, apparently coarse granules but these are still readily distorted and compactible when the powder is cold pressed.

The milled powders of this invention, even after extensive ballmilling generally still contain a small portion of coherent aggregates. The degree of disaggregation nevertheless may be sufficient to produce nonporous bodies by the use of such powders in hot pressing. Such milled powders are also usually satisfactory if there is a minor amount of liquid phase present in the mass to act as a lubricant during the high temperature pressing operation. However, if all of the components have extremely high melting points and if no liquid phase or eutectic is present, even 5 or 10% of the material in the form of nonmacromolecular coherent aggregates is detrimental and additional milling will be required.

For the densification of aggregated bocasi powders, vibratory ballmills are very effective as are conventional rotating ballmills if milling is continued for sufficient time. Cold compaction of the powder under pressures of over 50 tons per square inch followed by grinding, is also effective. Each or all of the above treatments can be repeated as often as necessary to obtain disaggregated or discrete macro-molecular bocasi particles.

If bocasi powders are to be disaggregated to give denser-packing powders, milling is preferably done dry, or in low-boiling organic solvents having low surface tension. Grinding in water will break up aggregates, but upon redrying, some reaggregation generally occurs. Grinding in water is employed to form sols as described hereinabove, but not to improve the packing density of dry bocasi powders.

(2) *Preparation of disaggregated bocasi powders from sols.*—Disaggregated macro-molecular bocasi powders which have high packing densities can be recovered from sols of the present invention by one or more of several methods. One such method is to flocculate the bocasi particles as a precipitate from an aqueous bocasi sol by adding a volatile flocculating agent such as propylalcohol or other water miscible organic solvents, or by adding a volatile sol such as ammonium carbonate. The precipitate is recovered by sedimentation or filtering and then dried. It is advantageous to wash the precipitate with monopropanol or other organic solvents which have a lower surface tension than water to minimize caking and to assist in the removal of water during the drying operation.

Disaggregated macro-molecular bocasi powders can also be prepared by recovering a precipitate from a sol of the invention by centrifugation in a high speed centrifuge. The recovered precipitate is then dried in a vacuum.

Additionally, a sol can be frozen to collect the macromolecular particles together in the interstices between the crystals formed from the dispersion medium. For example, from frozen aqueous sols the ice is melted and the water drained from the flocculated particles or alternatively the ice is evaporated under a high vacuum at a low temperature.

Another method to obtain disaggregated bocasi powders from sols is to atomize and spray dry the sol to yield a powder in the form of microscopic beads or granules. These consist of relatively close packed, weakly bound, flocculated aggregates of macro-molecular bocasi particles which are easily and readily broken apart.

The above recovery processes are preferably performed in the absence of any material which acts as a cementing agent between the ultimate bocasi particles when they are recovered as a powder. Also the presence of materials which tend to dissolve the foreign bocasi particles is preferably avoided because the soluble material itself can be an undesirable cementing agent.

(c) Characteristics of disaggregated powder products (1) *Packing density.*—The packing density or cold-pressed density is a significant characteristic of disaggregated macro-molecular bocasi powders and one which renders them capable of forming stronger and more dense articles than have been heretofore available.

When compressed in a mold under a pressure of several thousand pounds per square inch, disaggregated macro-molecular bocasi powders are compacted to densities in excess of 50% of the theoretical density of the corresponding solid material even without heating. Disaggregated bocasi powders of the invention which consist of isodimensional crystallites, i.e. all three dimensions of the crystallite being roughly equal have a cold-pressed packing density of from 55 to 65% of the theoretical solid density. For example, a disaggregated powder of macromolecular tungsten carbide having a crystallite atomic extensity coefficient of about 5.1 when compacted in a cylindrical steel mold ½″ in diameter under a pressure of 9 tons per squar inch, produces cylindrical pellet about half an inch in length. From these dimensions, the volume of the pellet is 1.61 cubic centimeters, and its measured weight is 14.8 grams. The cold-pressed density is, therefore, 9.2 grams per cubic centimeter. The absolute or theoretical density of solid tungsten carbide is 15.7 grams per cubic centimeter. Thus, the cold-pressed packing density of the disaggregated macro-molecular tungsten carbide powder is 59% of the theoretical solid density of tungsten carbide.

(2) *Dispersibility.*—Another characteristic of disaggregated bocasi powders of this invention is their ability upon agitation to disperse uniformly throughout a dispersion medium for the particular bocasi material. Coherently aggregated powders, because of their interlocked structure and strong bonding between crystallites, will not disperse in this manner. As described hereinabove, each disaggregated bocasi powder uniformly disperses in water to an optimum degree at the pH value which is optimum for each particular bocasi material.

(3) *Porosity of compacts.*—When disaggregated macro-molecular powders are cold-pressed into pellets, they contain substantially no pores larger than twice the diameter of the average crystallite. For example, disaggregated macro-molecular tungsten carbide recovered from a tungsten carbide sol cold-pressed to produce a pellet having a tungsten carbide crystallite size of 30 millimicrons, and in which less than 3% of the pores are larger than 60 millimicrons.

The bocasi disaggregated powder products of the present invention will be better understood by reference to the numerous illustrative examples given hereinafter.

V. HETEROMORPHOUS SUBMICRON GRAINED BODIES (a) General description of bodies

The heteromorphous submicron grained bodies of the present invention are super refractory and polycrystalline. They have a submicron crystallite size and are comprised of juxtaposed submicron units of a compound selected from the group consisting of the carbides of boron and silicon, silicon borides, and the borides, carbides and silicides of titanium, zirconium, hafnium, vanadium, niobium, tantalum, chromium, molybdenum, and tungsten. The juxtaposed units inthe bodies of this invention are maintained out of uniformly contiguous relationship by interspersant particles which have a crystallite size smaller than the juxtaposed units. The interspersant particles are selected from the group consisting of the above-named bocasi compounds in addition to the oxides of beryllium, zirconium, hafnium, aluminum, calcium, magnesium, thorium, uranium, chromium, yttrium, lanthanum, and the rare earths of atomic numbers 58 through 71; the nitrides of titanium, zirconium, hafnium, aluminum, boron, beryllium, thorium, and uranium; the carbides of thorium, uranium, and beryllium; carbon; zircon; mullite, and spinel. The bodies of the present invention contain from 50% to 99.8% by volume of juxtaposed bocasi units, the balance being interspersant units. When a body is made in accordance with this invention wherein the juxtaposed units and the interspersant particles are each selected from the group consisting of bocasi compounds, the interspersant particles are a bocasi which is different from the juxtaposed bocasi units.

In the super-refractory heteromorphous submicron grained bodies of the present invention, the interspersant particles preferably have a melting point in degrees that is at least 60% of the melting point of the juxtaposed units. Also the interspersed particles are preferably smaller than the juxtaposed units and are preferably present in a ratio by volume such that the volume of the juxtaposed units to the volume of the interspersant particles is from 0.2 to 5 times the ratio of the diameter of the units but the total volume of the juxtaposed units is always greater than the total volume of the interspersed particles. In all the preferred polycrystalline, heteromorphous bodies the density thereof is at least 90% of the theoretical additive densities of the components. That is to say, 90% of the additive solid density of the components present.

(1) *Definitions.*—The following definitions are provided in order that the heteromorphous polycrystalline bodies of the present invention are better understood.

*Polycrystalline.*—The bodies of the present invention are made up of a great number of submicron crystals, the average diameter of which is preferably smaller than 0.5 micron. This polycrystalline characteristic of the bodies of the present invention is readily identified by X-ray diffraction techniques and by electron micrograph techniques. In preferred bodies of the present invention the crystallites are such that they cause line broadening of X-ray diffraction lines.

*Heteromorphous.* — The bodies of this invention are comprised of two or more kinds of substances rather than a single chemical compound or phase. The term heteromorphous inherently includes the term "poly phase" which means that there is more than one phase present in the body. But even more broadly the term heteromorphous means that in addition to more than one phase being present, these phases are inconsistent in size and form. Reference to the following standard dictionary definitions further define the term heteromorphous as used herein.

The American Illustrated Medical Dictionary, 21st edn., by W. A. Newman Duling, W. P. Saunders Co., Philadelphia and London, 1948; "Heteromorphous—Of abnormal shape or structure; differing from the type."

Webster's Collegiate Dictionary, 5th edn., G. & C. Merriam Co., Springfield, Mass., 1947; "Heteromorphic—Deviating from the normal or usual form; exhibiting diversity of form. In zoology: having different forms at different stages, as insects which undergo a complete metamorphosis. In biology: unlike in form or size".

*Juxtaposed.*—The crystallites of the major components in the bocasi bodies of the present invention are juxtaposed, which means that they are packed in a manner that they lie adjacent to or near each other. However, the juxtaposed crystallites do not touch each other completely along their boundaries. They are kept out of such uniform contiguity by the interposition of interspersant crystallites.

Figure 4:
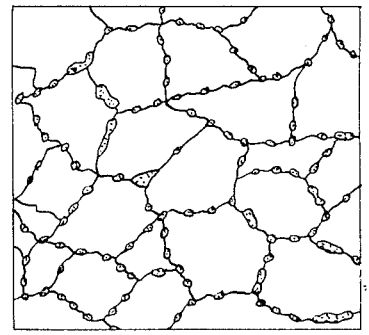
FIG. 4 is a similar illustration showing a modification in which there is a larger proportion of interspersant units at the grain boundaries which more completely keep the juxtaposed particles out of uniformly contiguous relationship.
Figure 5:
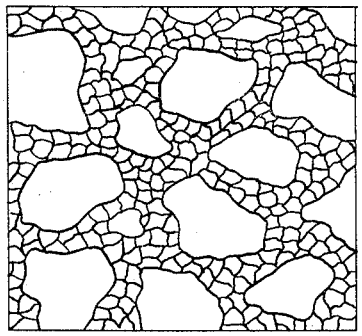
FIG. 5 illustrates a still further modification in which an even greater amount of interspersant units forms a contiguous boundary between the juxtaposed particles.

The interposition of interspersant particles is preferably not complete. They preferably maintain their particulate character such that the in boundary between two adjacent juxtaposed crystallites of bocasi material only a few crystallites of interspersant are positioned therein as is shown in FIG. 4.

Figure 6:
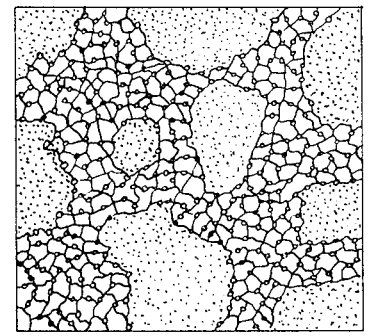
FIG. 6 is a similar representation of juxtaposed particles which are kept out of uniformly contiguous relationship by interspersant units admixed with a metal.
Figure 7:
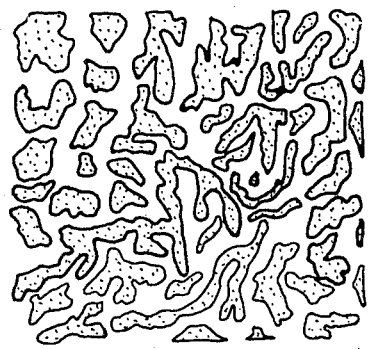
FIG. 7 illustrates a still further modification in which the juxtaposed particles are kept out of uniformly contiguous relationship by interspersant units which are present in an amount substantiallly equal to the amount of the juxtaposed material.
Figure 8:
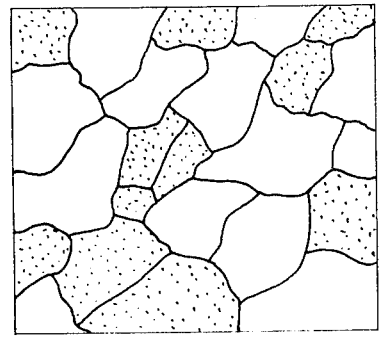
FIG. 8 illustrates yet another modification of an article of the invention in which the juxtaposed particles are kept out of uniformly contiguous relationship by interspersant units which are substantially equal both in size and in amount to the juxtaposed particles.
Figure 9:
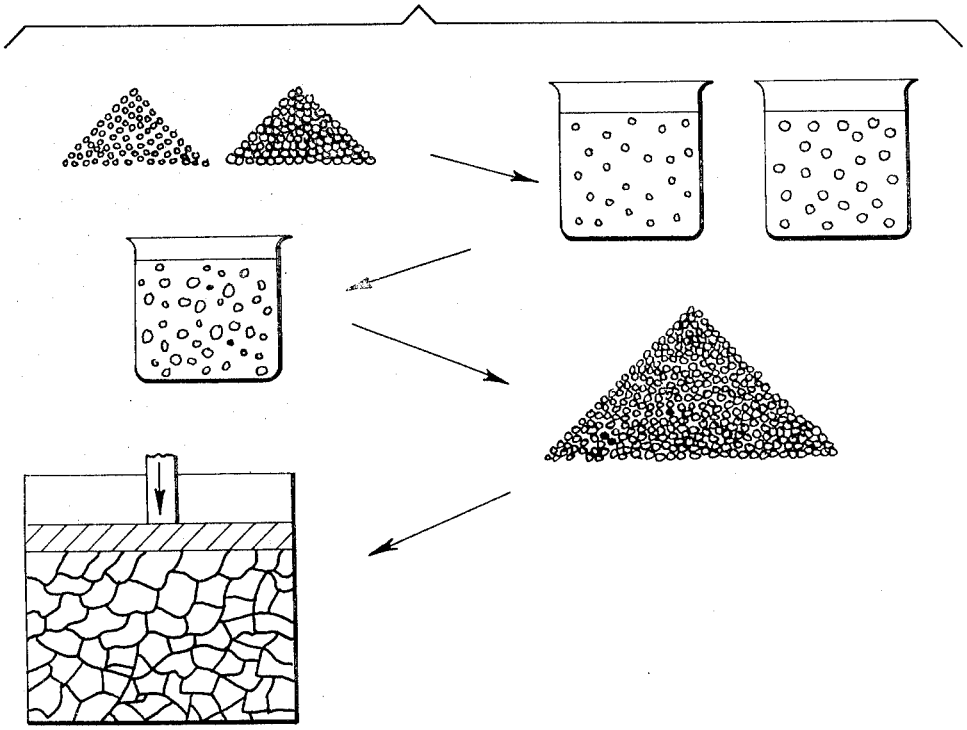
FIG. 9 is a flow-sheet illustrating a process of the invention for preparing the dense, super-refractory, polycrystalline, heteromorphous articles of the invention illustrated in FIGS. 3 through 8.

However, in some instances the juxtaposed crystallites can be kept completely out of uniform contiguity by the interposition of a continuous layer of interspersant crystallites as shown in FIG. 6. This layer can consist of a single layer or of several layers of crystallites of the interspersant. In such instances the interspersant would be termed the continuous phase and although present in less than 50% by volume of the bocasi body can nevertheless surround and be interposed continuously between all the crystallites of the juxtaposed units.

*Interspersants.* — The interspersant used in forming a bocasi body of the present invention is a material which is by definition different from the material of the juxtaposed units and comprises less than 50% by volume of the bodies formed. Since the bocasi compounds of the present invention can be used both as juxtaposed units and as interspersant units in the bodies of the present invention and can also be present in a minor amount as an major amount as juxtaposed units in one body of the invention and can also be present in a minor amount as an interspersant in another body of the invention. However, in any given body formed in accordance with the present invention the material forming the juxtaposed units will be different from the material used as interspersant particles. When both the juxtaposed units and the interspersant particles are bocasi compounds they will be different and are accordingly termed heterosomatic bocasis.

One characteristic of the interspersant particles is that they retain their identity in the heteromorphous submicron grained body. Thus, for a given type of juxtaposed unit there are preferred types of interposed units because they have less tendency to react with or dissolve in the material of the juxtaposed units. If the interposed material dissolved in the juxtaposed material it would no longer be interposed or act as an interspersant. Where such a solution or interaction tends to occur, lower processing temperatures are preferably employed in order to obtain the desired type of structure.

The interposed particles or interspersants are preferably selected from a class of compounds which is different from that of the juxtaposed units. For example, if the juxtaposed unit is a carbide, the interspersant particle is preferably selected from another class of compounds such as one of the oxides or nitrides suitable for use as an interspersant. However, in general, suitable submicron, polycrystallline, heteromorphous bodies of the present invention can be formed if the interspersant material is merely different from the material selected for the juxtaposed units.

It is also preferred that the interspersant particles selected to be used with a particular juxtaposed unit have a melting point which is at least 60% of the melting point of the juxtaposed units expressed in degrees Kelvin. More preferably the interposed particles and juxtaposed units should have melting points which are substantially similar in magnitude. In most instances best results are obtained when the interspersant material chosen has the highest possible melting point. For this reason thorium oxide, an extremely high melting inert substance is especially preferred as an interspersant for uses with many types of juxtaposed units.

(2) *Density—90% of theoretical.*— In addition to the selection of juxtaposed units and interspersant particles in their relative proportions, the preferred submicron heteromorphous polycrystalline bodies of this invention obtain a density which is preferably 90% of the theoretical density. By theoretical density is meant the total additive solid densities of the components in the body.

The bodies of this invention have a very low porosity and are preferably completely nonporous. Pores, particularly the type which are interconnecting, greatly weaken a body and by the processes of this invention are substantially reduced or completely eliminated. However, because of the material selected and the processes for making the heteromophous bodies of this invention, useful mechanical properties are obtained in many instances even with the porosity amounting to 10% by volume.

The "theoretical density" of the submicron heteromorphous polycrystallite bodies of the present invention means the density in the nonporous or solid state. It is calculated by totaling the densities of the juxtaposed units and interspersant particles. For example, if a body comprised 90% by weight of alpha alumina which has a density of 4.0 grams per cubic centimeter and 10% by weight of silicon carbide having a density of 3.2 grams per cubic centimeter, then for 100 grams weight of body there is present 90 grams or 90/4 cubic centimeters of alumina and 10 grams or 10/3.2 cubic centimeters of silicon carbide giving a total theoretical volume of components of 25.62 cubic centimeters. The theoretical density of the body then is 100/25.62 or 3.90 grams per cubic centimeter. If the density of the body is measured and found to be 3.70 grams per centimeter then the density of the body is $3.70/3.90 \times 100 = 95\%$ of the theoretical density. The porosity of the body then is 100—(percent of theoretical density) or 100—95, or 5% by volume.

(b) General advantages of dense submicron grained bodies

The submicron, heteromorphous polycrystalline bodies of the present invention exhibit extremely high strengths. They are from 25% to 10 times stronger than the crystalline bodies heretofore available. In particular, is the extremely high resistance to transverse bending sometimes referred to as the modulus of rupture. The bodies of this invention also exhibit extremely high tensile strengths compared to the crystalline bodies heretofore available.

Much improved toughness or resistance to breaking by impact or mechanical shock is another characteristic of the bodies of this invention. Particularly high impact strengths are exhibited by bodies of this invention which are substantially free of porosity having a density of preferably at least 99% of the theoretical density. This means that the porosity is preferably less than 1% by volume.

The bodies of this invention also exhibit greater hardness than the crystalline bodies heretofore available. In particular is the greater resistance to deformation or creep at high temperatures which is found particularly in the submicron heteromorphous polycrystalline bodies of the present invention in which the interspersant particles have a higher melting point than that of the juxtaposed units.

The submicron grained bodies of this invention are more resistant to thermal shock than bodies heretofore available. Maximum resistance to thermal shock is obtained in bodies made in accordance with the present invention in which the thermal expansion coefficient of the interspersant is substantially equal to that of the juxtaposed units.

The heteromorphous submicron grained bodies of the present invention are vary valuable for producing objects with extreme surface smoothness. For example, in instances where a flat surface is needed with irregularities no greater than a few microinches in depth. Similarly the submicron crystallite structure of the bodies of this invention makes them particularly suitable for the making of extremely sharp cutting edges free from notches or irregularities which are deeper than a few microinches. In the preferred bodies of this invention ultra fine cutting edges with profile irregularities no greater than 50 microinches and in some instances even less than 100 microinches can be formed.

(c) Process for making submicron grained bodies

One of the old processes for making submicron heteromorphous polycrystalline bodies of this invention is shown heterosomatically in FIG. 10. A disaggregated macromolecular powder is mixed uniformly with a disaggregated macro-molecular interspersant. The mixture is then dried and molded to form the desired body. The molded body is then heated or the heating can alternatively be carried out during the molding operation.

(1) Starting materials (a) *Juxtaposed units of disaggregated bocasi particles.*—The juxtaposed units forming the major proportion of the submicron heteromorphous polycrystalline bodies of the present invention are selected from the bocasis listed hereinabove. To achieve the submicron polycrystalline substantially nonporous structure in the bodies of this invention macro-molecular disaggregated bocasi powders either in the form of dry powders or sols prepared in accordance with this invention are used as starting materials in making the polycrystalline bodies of this invention.

(b) Interposed interspersants (1) *Selection of interspersants.*—The interspersants of the invention comprise a wide variety of refractory elements and compounds. Ideally, they are characterized by a relatively low chemical reactivity with the particular juxtaposed bocasi units employed, an extremely high melting point, and a low vapor pressure at temperatures in the range of 1800 to 2400° C. It is preferred that the melting points be in the neighborhood of 1800° C. or higher, and that the vapor pressures at a temperature of 1800° C. be less than 10 millimeters of mercury. It is also preferred that the molar free energy of reaction between the interspersant and the elements of the juxtaposed bocasi units be less than the molar free energy of formation of the bocasi from its separate elements at temperatures above 1800° C.

Other factors influencing the selection of an interspersant are their thermal conductivity and their elastic modulus.

If it is desired to improve the thermal shock characteristics of the resulting composite body, an interspersant is selected which shows a high thermal conductivity. Carbon is a good example of this type of interspersant.

For maximum strength, it is desirable to select an interspersant having an elastic modulus which is substantially equal to or slightly less than that of the bocasi. The elastic moduli for most bocasis are disclosed in the literature. These are somewhat dependent on the porosity, grain size, prior thermal history, and exact level of purity, as well as the crystalline lattice formed. Since there need be only an approximate match in elastic moduli between the juxtaposed bocasi units and the interspersant, the literature values can be used. For the highest strength bodies, the interspersant selected preferably has an elastic modulus which is from 0.1 to 3 times that of the bocasi, and more preferably from 0.3 to 1.5 times.

If the material selected to be used as an interspersant with a particular bocasi forms a low melting eutectic or a solid solution with the bocasi during the pressing operation, then the selected material cannot function as an interspersant. The interspersant must be relatively insoluble in the particular bocasi with which it is used at the temperature of fabrication. In selecting the interspersant for a particular bocasi, therefore, one skilled in the art need merely consult a phase diagram of the system involved. If the phase diagram is not available, then it should be established by procedures already known in the art.

For example, a number of the interstitial type carbide bocasis exhibit mutual miscibility at elevated temperature. But, non-interstitial types of boron carbide and silicon carbide are the least miscible and are the preferred carbide bocasis to be employed as interspersants with the interstitial types of carbide bocasis. If carbide bocasis are selected for use as interspersants with other carbide bocasis, the pressing temperature should not exceed the melting point of the eutectic of that particular pair of carbide bocasis, and the time of heating at maximum temperature should be kept at a minimum required to reach at least 90% of theoretical density.

(2) *Effect of interspersants.*—Depending upon the particular bocasi and interspersant combination employed, a wide variety of effects can be achieved. In most instances, the primary effect of the interspersant is to act as a grain growth inhibiting agent. That is, the interspersant, by interfering with the complete contiguity of the grain boundary between the individual crystals of the juxtaposed bocasi units, will tend to slow down the rate of growth of the bocasi crystallites at any particular temperature and pressure, and will thus assist in maintaining a submicron grained crystalline structure in the final dense body. By maintaining a submicron grain size and a large grain boundary area between the ultimate crystalline bocasi units, the interspersant maintains a large intergranular area through which rapid movement of dislocations, impurities, and interstitial atoms can occur, thus materially increasing the rate of densification at any particular temperature and pressure of fabrication.

The assistance in densification is most dramatically evident when using an interspersant which, at the temperature of pressing, exists in the form of a liquid or a highly plastic solid. By lubricating the grain boundaries between the juxtaposed bocasi crystallites, and by furnishing a continuous phase through which rapid transport of material can occur, the approach to theoretical density under any given set of pressing conditions is greatly facilitated. For example, when the juxtaposed bocasi units are silicon carbide and the interspersant is either alumina, thoria, or an aluminosilicate, a liquid, a plastic, and a liquid phase are formed at pressing temperatures of about 2000° C., and theoretical densities are attained. In the absence of such a plastic interspersant, fabrication temperatures must be increased to a range of about 2400° C. wherein there is a much greater tendency for the bocasi particles to grow and attain an undesirably large grain size.

Another function which many interspersants perform is that of providing a lower modulus and more ductile phase to transfer stress more uniformly throughout the body from regions of high stress concentration, such as surface imperfections and cracks. When the interspersants function in this fashion, they materially improve the strength of the body, particularly under conditions of high loading such as impact testing or thermal shock testing. Interspersants which are to function in this fashion are best chosen from those materials which have elastic moduli approximately $1/10$ to $1/3$ that of the particular juxtaposed bocasi with which they are combined.

In many instances, if the composite, dense bodies of the invention are to be used at elevated temperatures, the interspersants are preferably selected from a group having substantially higher moduli than that of the juxtaposed bocasi itself. Selection of interspersants of this class reinforce and stiffen the structure against creep at high temperatures, and give substantially enhanced stress-rupture life. Interspersants to be used for this purpose should have substantially higher elastic moduli than the juxtaposed bocasi phase itself, and are preferably at least 1.5 times as great in elastic modulus as that of the bocasi.

Other specialized effects can be achieved by the judicious selection of the correct interspersant for use with a particular juxtaposed bocasi. For example, it is possible to modify the temperature and extent of phase transformations of some of the bocasis by the choice of a suitable interspersant. Carbon functions in this manner when used as an interspersant with a silicon carbide. If small amounts of carbon are employed, in the range of 2 to 5%, and if these are well distributed and of submicron size, the interspersant aids in densification and deoxidation, and thereafter substantially delays the temperature at which the thermal transformation of beta silicon carbide (the cubic modification) to alpha silicon carbide (the hexagonal modification) occurs. Substantially higher quantities of the interspersant, again well distributed and of submicron size, prevent this transformation entirely, even up to temperatures where the silicon carbide begins to sublime as a result of the temperature.

Very useful and delicate controls over other properties such as the thermal and electrical conductivity can also be achieved by a suitable choice and distribution of the interspersant. For example, silicon carbide when dense is usually a very good conductor of electricity and also a good thermal conductor. By forming a continuous intergranular film of an interspersant such as alumina throughout and between all of the grains or crystallites of silicon carbide, however, it is possible to obtain a material which is an excellent electrical, and, to a somewhat lesser degree, a thermal insulator.

Alternatively, the electrical and thermal conductivity of silicon carbide can actually be increased by choosing an interspersant such as carbon, for example, particularly when it comprises a fairly large fraction of the total volume of the structure.

A suitable choice of certain interspersants will increase the oxidation resistance of many of the bocasis. For example, alumina can increase the oxidation resistance of a boron carbide body by the formation of alumina-boric oxide oxidation products on the surface which are less volatile and less susceptible to removal by the atmosphere or to spalling than is the boric oxide which is formed on pure boron carbide bodies.

In some instances, it is desirable to substantially increase the amount of internal strain which is present in a bocasi-interspersant composite body. This is accomplished by choosing an interspersant which has a coefficient of thermal expansion substantially greater than or less than the particular bocasi chosen. When such a body is bonded together at high temperature and the temperature is dropped, built-in internal strains of considerable magnitude are developed which increase the strength of the composite body substantially.

In other instances, it is desirable to select more than one interspersant for the purposes of achieving several of the above-mentioned effects simultaneously. For example, it is often desirable to incorporate a somewhat lower melting interspersant such as alumina to aid in the densification of a bocasi such as silicon carbide, while at the same time incorporating some carbon to maintain the silicon carbide in the beta crystalline modification. In a similar fashion, a lower modulus interspersant might be used to assist in the transfer of stress and its more uniform distribution throughout the composite dense body in conjunction with a relatively smaller amount of a higher modulus interspersant, which would function as a slip and grain growth inhibiting agent. Various other combinations of the functions of the interspersants of the invention will be readily apparent to one skilled in the art, and is further illustrated in many of the numerous examples given hereinafter.

(3) *Physical form of interspersants.*—Generally the interspersants macro-molecular ultimate particles or crystallites substantially identical in structure to the macromolecular bocasi particles of the present invention. They are ultimate, crystalline units or ultimate particles which are disaggregated and which have a crystalline atomic extensity coefficient ranging from 4.60 to 8.80. They are further characterized by having an X-ray diffraction line broadening coefficient ranging from $9 \times 10^{-2}$ to $3.6 \times 10^{-4}$ and by having an affinity for combining with proteins.

Macro-molecular interspersant particles can be formed by either of two methods. First, when the interspersant is a bocasi, disaggregated stable macro-molecular sols can be prepared using techniques already described hereinabove. A second method is to synthesize the interspersant as disaggregated macro-molecular particles or crystallites while blending it with the bocasi particles of the invention. This method is described in greater detail hereinafter but in short, the method comprises precipitation of the interspersant from a concentrated aqueous solution of an inorganic oxide using as a starting material a molecularly or ionically dispersed precursor such as aluminum nitrate or other salt in conjunction with ammonium hydroxide or other base to form and simultaneously blend with the bocasi particles a disaggregated macromolecular subdivided aluminum oxide or hydrated oxide particulate powder.

(c) Deoxidizing agents

As described hereinabove, the bocasis of this invention normally contain a relatively small amount of chemically combined oxygen upon their surfaces. While this is desirable for imparting chemical stability and enabling the sols to be peptized, it can exert an undesirable influence upon fabrication of the bocasi particles into dense solid bodies. This is particularly undesirable when the oxygen is associated chemically with some element, the oxide of which becomes volatile at the relatively high temperatures of fabrication which are employed in densifying and bonding the bocasi particles of the invention into solid, dense bodies. For example, most of the refractory silicides and silicon carbide have chemically bonded oxygen which is associated with silicon upon their surfaces. Upon heating these materials to temperatures ranging from 1600 to 2000° C., the silicon and the oxygen volatilize as volatile silicon monoxide, thus exerting an appreciable gaseous vapor pressure, which can create undesirable porosity in the final bocasi body. This type of reaction also occurs with some carbide bocasis of the invention where carbon monoxide is the volatile or gaseous product. If not eliminated prior to fabrication, the gaseous carbon monoxide prevents satisfactory densification of the material. In a similar fashion, some borides contain boric oxide which is potentially volatile and a source of similar difficulty.

There are acceptable means for eliminating this source of difficulty, or, at least, minimizing it to where it presents no serious problem. By one of these, the problem is avoided by lowering the concentration of the oxygen to relatively low values. This is done by subjecting the bocasi particles, either before or after mixing with a suitable interspersant as above described, at an elevated temperature to a reducing gas. Thus, tungsten carbide, for example, can be reduced in hydrogen or in methane, whereas silicon carbide can be reduced in a dilute concentration of methane at an elevated temperature such as 1500° C.

Another means is to mix with the bocasi and, if desired, the interposed interspersant, a material which combines chemically with the combined oxygen of the bocasi, to tie it up as a compound having negligible vapor pressure under the fabrication conditions employed. For example, silicon carbide bodies can be mixed with finely divided metallic aluminum powders or powders of other active metals having a high affinity for oxygen. The metals selected for this purpose are preferably those which upon reaction with oxygen will form extremely refractory and thermodynamically stable oxides. Thus, there can be employed, for example, thorium, lanthanum, calcium, aluminum, chromium, titanium zirconium as well as other similarly active metals.

When the active metal is one which neither melts nor volatilizes at fabrication temperatures it is also provided in a submicron, macro-molecular, disaggregated form such that the ultimate refractory oxide formed from it will not produce a grossly large particle and thus disturb the homogeneous and fine grained structure of the fabricated bocasi-interspersant composite body. This is less critical in those instances where the active metal is either a vapor, or a liquid which wets the surfaces of the bocasi at fabrication temperatures, and thus can be uniformly distributed as a result of such a phase transformation. In general, it is preferable that an amount of deoxidizing agent be employed which is sufficient to react with, and remove, or chemically combine with, all the oxygen present in the form of potentially volatile combined oxygen. However, in some instances oxygen present which is not in excess of a single monolayer can diffuse out of the structure during the fabrication, and thus a small amount of oxygen is tolerable.

In addition to gaseous reduction as described above, it is also possible to add other chemical reducing agents as solids or liquids such as finely divided carbon, or liquid sodium, and then volatilize their oxide reaction products in order to effect a reduction.

The amount of deoxidizing agent or interspersant to be employed will depend on whether it is desired only to inactivate or remove the oxygen impurity, or whether, in addition, it is desired to provide an excess of the deoxidizing agent for the purpose of converting it into an interspersant either directly or by subsequent reaction as above described.

Once the deoxidizing agent and the bocasi have been blended homogeneously together, the deoxidizing agent is reacted with the oxygen content of the bocasi powder by heating them at a temperature within the range of 800 to 1800° C.

When the deoxidizing agent is carbon, which has a volatile oxide by-product, the reaction is preferably conducted on the loose powder by heating in a tube furnace under vacuum or while passing an inert or a reducing gas, such as argon or hydrogen, over the product. In this fashion, the oxygen is eliminated as a volatile oxide and the resulting powder can then be redispersed by additional milling to eliminate any aggregation caused by the heating operation.

When the active-metal deoxidizing agents are also used to form oxide interspersants, the deoxidizing reaction can be accomplished equally well during the heating and compaction steps of the fabrication of the composite powder into a dense solid object.

(2) *Blending of components.*—The techniques used for blending an interspersant uniformly with the units of a disaggregated macro-molecular bocasi powder depend upon the particular components involved, and the form in which they are to be used. In some instances, the interspersant is introduced into the bocasi powder at the time the latter is synthesized, or it is mixed with the bocasi later. The interspersant can be introduced in macro-molecular particles in the same chemical form in which it will reside in the final dense body, or it can be introduced in the form of a chemical precursor which is converted to the interspersant at some point during processing of the mixed powders, or during the molding or sintering operation.

(a) Blending of components by cosynthesis

Homogeneously mixed macro-molecular units of bocasis and interspersants can be prepared by synthesizing the two materials simultaneously. For example, in forming a macro-molecular metal carbide, excess macro-molecular carbon may be present in an amount over that required to form the carbides. The final product is an intimate mixture of metal carbide and carbon. Where both the juxtaposed units of the final body, as well as the interspersant are bocasis, the intimate mixtures of two bocasis can be formed by cosynthesis. It should be noted that in such instances, one of the components can be formed first in the reaction and the second component thereafter formed in intimate admixture with the first. Thus, simultaneous cosynthesis can take place or one substance can first be formed and the second then deposited on the first material by precipitation.

(b) Blending of components as powders

Generally speaking, powders of submicron particle size cannot be uniformly blended by mechanical mixing, especially if the ultimate crystallites of one of the components are smaller than about 0.1 micron in diameter. However, if the starting materials are macro-molecular powders in which the ultimate particles have been disaggregated, uniform blending can be accomplished by prolonged ballmilling. For example, the powders can be dry-milled in a steel mill lined with tungsten carbide, using tungsten carbide balls as the grinding medium. It will ordinarily be necessary to break up the cake which forms on the walls every few hours, and to continue the milling for 24 hours or more for best results.

(c) Blending of components in liquid media

Where the material forming the juxtaposed units and also the interspersant or its precursor are employed in the form of macro-molecular powders of slurries, prolonged wet ballmilling will provide satisfactory blending, although this method is not preferred. In such instances prolonged ballmilling or other means of attrition are required to break up aggregates of bocasi particles so that homogenization can be achieved.

A preferred method of blending in a liquid medium is to provide the disaggregated macro-molecular bocasi in the form of a sol, and also to prepare a macro-molecular dispersion or solution of the interspersant or its precursor and to bring these two liquids together in a zone of intense turbulence, as for example in a high speed mixer involving propeller speeds of 5,000 or 10,000 r.p.m. In some instances, the chemical natures of the two components are such as to lead to mutual coprecipitation. In others an acid or a base precipitant, such as acetic acid or ammonia is added to adjust the pH of the mixture to bring about precipitation. For example, it is possible to prepare homogeneously mixed macro-molecular carbides and oxides by coprecipitating the carbides introduced in the form of sols, with water-insoluble hydroxides and hydrous oxides of metals such as aluminum, calcium, magnesium, thorium, lanthanum. By this method the hydroxides are deposited upon and between the bocasi particles, so that when the mixture is later heated, the hydroxides are dehydrated to oxides which act as interspersants.

The interspersant can also be introduced as a sol. For example, a sol of zirconium oxide and a sol of titanium diboride can be intensively mixed and coprecipitated by the addition of an electrolyte, preferably a volatile salt such as ammonium bicarbonate.

(d) Blending of components by impregnation

Bocasi powders of this invention can be mixed with solutions of the precursors of the interspersants, and the interspersants precipitated within the pores in the bocasi powder. This is not a preferred method, because uniform deposition of the interspersant is not readily attained. However, if aggregates of macro-molecular bocasi particles are small and prolonged intensive mixing is employed, interspersants can be thus mixed with the bocasi. For example, aggregates of a macro-molecular bocasi such as tungsten carbide are milled until the aggregates are broken up into units which are no greater than a micron. Then the powder is suspended in a concentrated solution of basic zirconium nitrate. The mixture is kneaded and concentrated ammonia is added to precipitate hydrous zirconia in situ.

Another method of impregnation by reactions in situ to deposit interspersants within a mass of macro-molecular bocasi powder, provides forming reducible metal oxides in intimate admixture with the macro-molecular bocasi by precipitation as described above, and then reducing these compounds with hydrogen at temperatures between 600 and 1800° C., depending upon the particular bocasi and its stability, to yield the corresponding metals deposited within the bocasi powder. These metals can then be converted to the corresponding metal nitrides or metal carbides by treating the composite powder with nitrogen or ammonia at high temperature to form the nitride or with hydrocarbons such as methane to form the carbides. Metal silicides or borides can be formed as interspersants in an analogous fashion within a bocasi powder by contacting the bocasi-metal powder composition described above, with volatile sources of silicon or boron such as silicon hydrides, mixtures of silicon tetrachloride and hydrogen or boron hydrides.

(e) Ratio of juxtaposed particles to interspersant

In preparing powders for fabricatioon of dense, submicron grained bodies, the proportion of material to be used as the interspersant relative to the bocasi material forming the juxtaposed particles is of primary importance.

Most broadly, in the dense submicron grained bodies of this invention, the interspersant will comprise no more than about 50% by volume of the body. The percent by volume is determined from the percent by weight of interspersant and juxtaposed particles as found by chemical analysis. It can also be determined by the relative intensity of X-ray diffraction lines of the components. From the percent by weight, the percent by volume can be determined by assuming that the volumes of the components are additive and knowing the densities of the solid interspersant phase and of the juxtaposed particles.

In preferred bodies of this invention, the ratio of the volume of the juxtaposed units to the volume of the interspersant is from 0.2 to 5.0 times the ratio of the average diameter of the juxtaposed units to the average diameter of the interspersant. These relative amounts of juxtaposed units and interspersants are based on the sizes of the units in the final fabricated body and are not necessarily based on the sizes of the particles in the powders from which the bodies are made. For example, in the final body one can have juxtaposed units of tungsten carbide which are 300 millimicrons in average diameter, which are maintained out of uniformly contiguous relationship by the interposition of particles of lanthanum oxide as the interspersant. The particles of lanthanum oxide can be 50 millimicrons in diameter. However, in the powder from which this body is pressed, both the macro-molecular tungsten carbide and the lanthanum oxide were in a much more finely divided form. Both materials crystallize and the crystals grow to a limited extent during the hot pressing and consolidation of the body. The starting materials however, are always finer than the units in the final fabricated dense body.

Thus, the ratios of bocasi which will be used as juxtaposed particles to material which will form the interspersant in the final body, is determined from the composition desired in the final body. However, the sizes of the starting materials will not necessarily bear any direct relationship to the sizes of the units in the final body, except that the particle size in the starting materials must be finer than the grain size of the corresponding phase in the final product.

In general, the interspersant is introduced in an extremely finely divided, macro-molecular or even soluble form, so as to be most readily mixed with the macro-molecular bocasi which will form the juxtaposed units in the final body. In all cases the material to be introduced as the interspersant will consist of particles smaller than one micron in diameter, and preferably less than 0.1 micron in diameter. In certain instances, the precursor of the interspersant will be introduced as a solution and will be coprecipitated with the bocasi as macro-molecular crystallites or particles.

Where the desired relative volumes of juxtaposed units and interspersants in the final dense body ranges from 1:1 to about 5:1, the interspersant can be introduced into the blending operation in a form which does not need to be as finely divided as when the relative volumes are from 5:1 to 100:1. When the ratio ranges from 100:1 to 500:1, the interspersant is best introduced in molecular form so that it can be coprecipitated on the macro-molecular bocasi that will form the juxtaposed particles.

In other words, the less interspersant there is in the mixture, the more finely divided it must be, and if the amount of interspersant is very small, it is best furnished as a precursor in true solution in order to achieve best distribution.

For example, if it is desired to prepare a sub-micron grained body of silicon carbide having juxtaposed units of silicon carbide 300 millimicrons in diameter maintained out of uniform contiguity by interposition of 2 percent by volume of carbon particles, then the carbon particles are preferably no more than 20 or 30 millimicrons in diameter. The ratio of the volume of the silicon carbide to the volume of the interspersant carbon particles is 98/2. The ratio of the diameter of the silicon carbide juxtaposed units to the average diameter of the interspersed carbon units is 300/20. From this the ratio of the volume of juxtaposed units to the volume of interspersant is 0.326 times the ratio of the size of the juxtaposed units to the size of the interspersant particles.

The optimum amount of interspersant that is required to maintain the juxtaposed units below a certain size, varies with the extent of grain growth that occurs during fabrication. Since this varies with the function of fabricating conditions such as time, temperature, and pressure, as well as the nature of both interspersant and type of bocasi in the juxtaposed units, it is not possible to give a general formula for the volume fraction of dispersant to be employed. The size of the juxtaposed units of bocasi in the dense, submicron grained body is inversely proportional to the volume fraction of interspersant particles of a given type and particle size, under fixed fabrication conditions. Thus, for a particular bocasi, a particular interspersant and particular fabrication conditions, the use of a larger volume fraction of interspersant results in a finer grain size of juxtaposed units. If the grain size is not sufficiently fine to attain maximum properties, more interspersant should be used.

On the other hand, the addition of more interspersant often inhibits grain growth of the bocasi to such an extent that it becomes more difficult to attain theoretical density in the final body. Thus, if all other factors remain the same, the greatest proportion of interspersant is employed that will still permit attainment of at least 90% of theoretical density in the final body and preferably greater than 99% of theoretical density.

Where the interspersant is such that in the final dense molded body the grain size of the interspersant is about the same as that of the juxtaposed units, then as much as 40 to 50% by volume of interspersant is preferably used. If, on the other hand, use of a given bocasi and a given interspersant under given fabrication conditions result in juxtaposed units of 250 millimicrons in diameter and interspersed particles of 70 millimicrons in diameter, then the ratio of particle size of interspersant to particle size of juxtaposed units is 70/250. A preferred proportion of interspersant used under these conditions is then about 70/250=0.27 volume fraction, or 25 volume percent. This serves only as a guide, since beneficial results from the interspersant are obtained with as little as one-fifth this amount of interspersant, or about 5 volume percent, or with as much as 50% by volume.

(3) RECOVERY OF BLENDED POWDER

(a) Avoidance of aggregation

Undesirable aggregation in the composite powders can be substantially reduced or prevented by isolation techniques which minimze the reaggregation of the composite powder particles with one another. When drying powders from suspensions or slurries wherein the suspending liquid has a high surface tension and also wets the surfaces of the suspended powders, strong compressive forces are exerted by the receding meniscus of the liquid to cement the particles together. This effect is frequently increased by the presence of soluble materials in such solutions which are deposited in the interstices between the particles and function as binders.

This undesirable aggregation and cementation of powders upon their isolation can be avoided by several techniques. One is to lower the surface tension of the suspending liquid by the addition of surface-active agents which, however, are preferably free from inorganic cations such as sodium. Alternatively, this can be accomplished by the complete displacement of the high surface tension liquids with liquids of successively lower tensions. Thus, for example, water can be displaced from an aqueous slurry with a miscible liquid such as normal propyl alcohol which evaporates and at the same time removes residual water. When dried from a liquid of low surface tension, the bonding strength of aggregates is very weak.

Another technique is to heat the liquid slurry to such a high temperature that the surface tension of the suspending liquid is low, and then rapidly evaporate the containing liquid. This technique is commonly referred to as spray drying, and is suitable for recovering the composite powders of this invention.

Still another useful technique is freeze-drying by which the slurry of liquid and the composite powders of the invention are subjected to very rapid freezing, and the frozen liquids is sublimed under reduced pressure. Other techniques for minimizing aggregation include chemical reactions whereby compounds combine with reactive groups on the surfaces of the composite powders of the invention to form an organic monomolecular film and thus minimize the degree of binding between particles when the solvent is evaporated. To create such monomolecular surface layers higher alcohols, amines, quaternary ammonium ions and fatty acids can be used.

As noted hereinabove, soluble impurities, particularly those which are decomposed by heating to give stable refractory materials, frequently act as undesirable binding agents. For this reason it is desirable that all materials such as sodium silicate, silicic acid, metal salts, inorganic bases, strong inorganic acids and other such impurities be removed prior to recovering the composite powder product.

Even when considerable care has been exercised to minimize the degree of aggregation prevailing in the composite powders of the invention, it is still found that the level of aggregation is sometimes too high for ideal fabrication. In this instance, and as a general process step, it is therefore often advantageous to subject the powder to an intensive milling operation either by dry or wet ball-milling in a non-reactive solvent such as benzene or hexane, or by high speed and vigorous dry milling. This step is particularly advantageous when either the deoxidation or the in situ preparation of the interspersant phase in the composite powder requires exposing the powders to elevated temperatures, as, for example, temperatures in excess of 800° C.

(b) Avoidance of segregation

There are some instances where even though the disaggregated bocasi powder to be used as the juxtaposed units and the interspersant have been blending uniformly, there is subsequent segregation upon drying. Such is most frequent when the interspersant is introduced as a soluble precursor. For example, a suspension of macro-molecular titanium carbide and a solution of lanthanum nitrate can be uniformly blended by simultaneously raising the pH to about 10 to bring about coprecipitation of titanium carbide and most of the lanthanum nitrate. But if the mixture is then simply dried to give a cake, the remaining lanthanum nitrate will migrate to the surface, carried there by the evaporating water, and will form regions rich in lanthana, which results in poor heterogeneity in the final submicron grained body formed therefrom.

Any of the wide range of techniques known to one skilled in the art to which this invention pertains is suitable to avoid segregation once the components have been blended.

(c) Avoidance of oxidation

After the blending of disaggregated macro-molecular bocasis and interspersants in a liquid medium, removal of the liquid by evaporated is often attended by oxidation of the bocasi. It is preferred to remove the liquid medium either under high vacuum or in a stream of inert gas such as argon or nitrogen. In most instances, it is satisfactory to cool the powder after it has been heated and dried out of contact with air, and then to treat it at room temperature with nitrogen containing a few percent of air to prevent the development of a sudden temperature rise in the powder when it is finally brought into the atmosphere.

(4) CONSOLIDATION

(a) Improving compactability

After the bocasi which is to form the juxtaposed units in the submicron grained body has been blended with the interspersant or its precursor and the mixture has been recovered as a dry powder, it is often advantageous to subject it to a consolidation treatment to improve its molding and pressing properties. Such treatment prepares the composite powder in such a form that when it is compacted in a mold at room temperature, the cold-pressed body has a very uniform type of porosity.

The ideal type of porosity in a cold-pressed body is such that less than 1% of the pore volume is comprised of pores having a diameter larger than about 100 millimicrons. If, for example, the ultimate crystallites of the bocasi and of the interspersant or precusor material are of a uniform size around 100 millimicrons in diameter, and if these are completely disaggregated, they pack uniformly to a cold-pressed density of over 50% of the theoretical density. The resulting cold-pressed body contains no pores larger than 100 millimicrons.

On the other hand, if a substantial portion of the 100 millimicron bocasi particles are present as coherent spherical aggregate of about 5 microns in diameter, then when these are pressed together there remains spaces or pores between the aggregates several hundred millimicrons in diameter. Within the aggregates the pores are still less than 100 millimicrons in diameter. Thus, the cold-pressed body contains two types of pores. Those within the aggregates which are smaller than 100 millimicrons in diameter, and those between aggregates which are from 100 millimicrons up to several microns in diameter. Such double porosity is to be avoided, since upon subsequent sintering, the larger pores are eliminated, and the final body retains a degree of porosity which detracts from its physical strength.

There are some processes for the preparation of the blended powders that result in weak aggregates which can be broken under a molding pressure of a few thousand pounds per square inch. Aggregates of such material can be cold pressed to compacts which have none of the large pores between aggregates because the aggregates are sufficiently weak that they can be deformed and packed tightly together with no spaces between them. Such lightly aggregated powders are obtained when an aqueous sol of a bocasi and an aqueous sol of an interspersant are mixed and coprecipitated, and the water is washed from the precipitate with alcohol, which in turn is replaced by ether and the mixture is then heated in a closed vessel to above the pressure and temperature of the critical point of ether and the ether vapor is released. By this method a powder having some of the characteristics of an aerogel is obtained. If precautions are taken to remove traces of water by azeotropic distillation with the alcohol prior to displacing the alcohol with ether, especially easily compactible powders are prepared.

It should be understood that even though well-disaggregated bocasi sols are employed for admixture with the interspersant, the combination can, upon drying, yield a powder in which there is some reaggregation. The type and degree of aggregation permissible in the mixed powder prior to pressing and sintering depends also on the pressure-temperature relationship during the molding process.

Thus, blended bocasi-interspersant powders which can be used for pressing and sintering fall into two groups:

(1) Powders which have a voluminous structure with very porous, weak aggregates, such that the cold pressed density is less than around 30% of theoretical density. For such powders, the preferred method of fabrication is to heat the powder in the mold without the application of pressure until the sintering temperature is reached, at which point the pressure is applied.

(2) Powders which have a cold pressed density over 50% of theoretical, preferably around 60%. Such powders are preferably compacted cold and then sintered either with or without the continued application of pressure up to the sintering temperature. Best results are usually obtained with continued application of pressure. An almost universally applicable method of improving the compactibility of powders is to mill them in a ballmill with heavy balls of steel or preferably tungsten carbide for several hours at optimum milling speed. A small amount of lubricant such as an alcohol can be employed. It is best to maintain an inert atmosphere of nitrogen in the mill to minimize oxidation.

It is understood that this treatment does not result in a "grinding" or attrition of the powder, since the ultimate particles in the powder are already macromolecular and much smaller than those producible by grinding. Instead, it is the process of compaction. The porous aggregates of the powder are compacted by the impact between the balls whereby the structure is densified.

(c) Sintering at atmospheric pressure

The preferred method of fabricating bodies of this invention is by hot pressing. However, in some compositions cold pressing, followed by sintering of the compacted body at atmospheric pressure can be employed. This is particularly true of compositions which contain small amounts of lower melting components, such as carbides bonded with a minor percentage of metal. In this instance, the juxtaposed units of bocasis are maintained out of uniform contiguity by interposition of a continuous layer of metal and interspersant as represented in FIG. 6.

In general, the very high melting bocasis cannot be satisfactorily fabricated into the bodies of this invention by cold pressing and sintering.

As pointed out hereinabove, the powders employed in this process of fabrication preferably exhibit maximum compactibility and have a cold pressed density of at least 50% of theoretical, and preferably 60%.

The fabrication is carried out as follows: The blended powder comprising the bocasi used for the juxtaposed units and the interspersants, is pressed in a mold to form a "green" or cold-molded body of desired shape. This is then heated either under vacuum or in an inert atmosphere to a temperature greater than 0.6 times the absolute melting point of the bocasi that is to form the juxtaposed units. In general, the more rapidly the body is heated in the range from 1000° C. to the maximum temperature, the more completely the porosity is eliminated at final temperature. Rapid heating in an induction furnace to reach maximum temperature in 15 to 30 minutes is preferred.

Volatile materials or adsorbed moisture are preferably eliminated at the beginning of the heating period. On large molded objects, it is generally desirable to apply the vacuum slowly and then to raise the temperature from room temperature to 200° over a period of several hours. The rate of heating from 200 to 1000° C. can be over any chosen period of time.

The time at maximum temperature is kept at a minimum consistent with the development of high density and low porosity in the body. Optimum time of heating at maximum temperature is determined by heating a series of samples for different periods of time and determining the point of maximum density. Heating beyond this time produces bodies which show a decrease in density.

If the optimum time of heating at a given temperature does not result in producing a body of at least 90% theoretical density, then a somewhat higher temperature is used. For example, the temperature is increased 25 or 50° C. and the experiment repeated. Each particular composition has a preferred time and temperature for reaching maximum density.

Where the components are not reactive with nitrogen, this gas is employed during the sintering process to avoid oxidation. However, the majority of bocasi products of this invention will react with nitrogen at sintering temperature, with the formation of some nitride. For this reason, argon is a preferred inert gas. Hydrogen, which is commonly used in the sintering of metals, is not employed with most bocasis, because at the sintering temperature, they are partially reduced. For example, carbides lose carbon.

While the above applies to the atmosphere at maximum sintering temperature, inert or reactive atmospheres at lower temperatures prior to sintering are often desirable. In compositions containing metals associated with the interspersants, the cold pressed bodies are preferably heated in hydrogen in the temperature range between room temperature and about 1000 C. to insure the removal of traces of oxygen from the metal portion of the powder. Where the amount of metal in the composition is small, the metal can be introduced as the corresponding metal oxide in intimate admixture with the interspersant. After cold pressing, the shaped body can then be heated in hydrogen and the metal oxide reduced to the metallic state. However, it is generally preferred to reduce the metal oxide to the metallic state prior to cold pressing, since there is some decrease in volume and some increase in porosity as the metal oxide is reduced in a cold pressed body.

(d) Hot pressing

Hot pressing is the preferred method of fabricating the powders of this invention to dense, strong, submicron grained bodies. The type of equipment and techniques employed in hot pressing are well known in the art and are fully described by G. G. Goetzel, "The Physics of Powder Metallurgy," pp. 256–275 (McGraw-Hill, New York, 1951), J. S. Jackson and P. F. Palmer, "Special Ceramics," pp. 305–325 (Academic Press, New York, 1960) and J. S. Jackson, Powder Metallurgy, 8, 73 (1961).

The molds and plungers employed in hot pressing are generally made from high density graphite. The products of this invention are in general so refractory that graphite is the only practical material which can be employed to enclose the material being fabricated. In some instances, other materials are used as mold linings, particularly boron nitride, as described by P. Best and S. R. Twigg, Metallurgia, 62, 146 (1960). Generally it is advantageous to apply a thin coating of fine powdered graphite or finely divided boron nitride to the walls of the graphite die, to act as a lubricant and to facilitate removal of the finished body.

Temperatures reached in hot pressing of products of this invention range from 1400° to as high as 2400° C., or even higher. Ordinarily, about 2300° represents the highest desired temperature, because even with the interspersants present, grain growth is rapid above this temperature.

The hot pressing maximum temperature is preferably no higher than necessary to consolidate the powder to a dense body. Each particular composition requires an optimum time at an optimum maximum temperature. Broadly, the maximum sintering temperature during hot pressing is between 0.6 and 0.9 times the absolute melting point of the bocasi employed as the juxtaposed units. In most instances, the optimum molding temperature is between 0.6 and 0.8 times the absolute melting point. However, the maximum pressing temperature preferably no higher than necessary to densify the powder, nor preferably is the time longer than required to reach maximum density at the particular temperature employed. A longer pressing time results in undesirable crystal growth leading to expansion of the body and a lower density and greater porosity.

A rapid rate of heating and a minimum hold time at the maximum temperature is preferred, so that the densification process takes place primarily by plastic deformation, as described by P. Murray, D. T. Livey, and J. Williams "Ceramic Fabrication Processes," pp. 141–171 (Wiley, New York, 1958). The reduction of porosity by material transport which occurs during conventional sintering is usually associated with crystal growth and consequently is undesirable in the fabrication of extremely fine grain polycrystalline bodies. Extremely short heating times, of a few seconds duration, are attainable by "resistance sintering under pressure," as described by F. V. Lenel, Trans. Amer. Inst. Min. Met. Eng., 158, 203 (1955).

The temperature at which maximum density is obtained is usually lower with increasing pressure and consequently it is advantageous to apply the maximum pressure to which the mold can be subjected.

In order to minimize the formation of closed pores in pressing some bocasi powders it is preferable to apply only a small confining pressure, in the range of 50 to 200 p.s.i., to the powder in the mold cavity until the temperature is within 50 degrees of the maximum, and then apply the full pressure in order to achieve maximum densification. On the other hand, in powders which can be cold pressed to at least 50% of theoretical density, application of the maximum pressure before and during the heating cycle is preferred. The optimum temperature, pressure and time can readily be established for a particular material.

Thus, as described hereinabove with respect to improving the compactability of the blended starting powders, there are basically two different procedures that can be employed to advantage, depending upon the type of powder involved.

One procedure which is used advantageously with powders consisting of voluminous, relatively leak and compactable aggregates, comprises placing the powder in the mold cavity with minimum pressing, raising the temperature within a period of 15 minutes or less to the sintering point, and then when the temperature is within 50 degrees of the maximum to be employed, applying maximum pressure. This procedure is especially effective when the operation is conducted under high vacuum. The alternate procedure is to consolidate the power at ordinary temperature by the application of maximum pressure at the outset before heating. Then the pressure is continued throughout the heating period until maximum temperature is reached. For use of this procedure, it is preferred that the powder be of maximum compactability, the cold pressed density being preferably around 60%.

Alternate procedures in which half of the maximum pressure is applied when the temperature reaches around 100° C., and the full pressure is applied when the temperature reaches the maximum, can be used without disadvantage in powders of maximum compactibility. The advantage of this procedure is that higher final compacting pressures can be employed in that graphite forming the press is stronger at high temperature. If the maximum pressure that can be used is that which the equipment will withstand at room temperature, then the maximum pressure will be around 2000 p.s.i. when ordinary commercial graphites are employed for the compressing rods. The maximum molding pressure for maximum temperatures of 1500 to 2400° C. ranges from 4000 to 6000 p.s.i., the limitation again being the strength of the graphite equipment. Somewhat higher pressures can be employed to advantage if unusually strong graphite is obtainable.

(e) Heat treatment of the molded bocasi

The molded bocasi can be subjected to additional heating to bring about continued chemical reaction. Thus, for example, where the interspersant is a metal carbide created in situ by the interaction of finely divided metal and carbon, it is often desirable to hold the molded body at the maximum temperature for as long as 15 minutes or half an hour. Ordinarily, this is undesirable if the body has already reached maximum density, since in many instances recrystallization occurs with a resulting decrease in density. However, in other instances where the interspersant is still in the process of being formed, longer heating is preferred. For practical reasons, it is often desirable to mold the powder by simultaneous application of heat and pressure, and then after the body is removed from the mold, to reheat it to sintering temperature for a further period of time to complete consolidation while the hot press is being employed on another material. Such a procedure increases the productivity of a hot press, but usually offers little or no advantage for improving the quality of the product, and, in fact, products made in this way are generally not quite as satisfactory as those where the specimen is left in the mold under pressure throughout the heating period at maximum temperature.

By suitable mold design, finished pieces can be made to very close tolerances. Suitable finished pieces are, for example, wire drawing dies, thread guides, slush nozzles, turbine blades, rocket throat liners, and machine tools such as cutting tips, drill bits and milling inserts. Alternatively, rod, bar or sheet stock can be produced and subsequently machined.

(c) Characteristics of consolidated heteromorphous submicron gained bodies (1) *Composition.*—The composition of the consolidated bodies of this invention is determined by conventional chemical analysis. In some instances, the compositions are extremely refractory. Such chemically resistant specimens can be dissolved for analysis by fusion with borax or sodium carbonate, attacked by hydrofluoric acid, attacked by hot sulfuric acid, attacked by a mixture of sodium carbonate and sodium peroxide at red heat, or decomposed by direct combustion in oxygen at very high temperature.

The heteromorphous submicron grained bodies of this invention consist of at least 50% by volume of bocasis. A preferred body of this invention contains at least 50% by volume of one or more of the carbides of tungsten, titanium, tantalum, zirconium, hafnium, chromium, molybdenum, vanadium, and niobium. These materials are excellent conductors of electricity, providing electrical components of high durability and resistance to wear. They are at the same time of special interest because of their extreme hardness and strength, particularly in the form of the bodies of this invention, which have an extremely fine grain structure.

For use at extremely high temperatures, particularly in a vacuum as in outer space or in an inert atmosphere such as argon, the carbides of tantalum, zirconium, hafnium, niobium, and titanium are preferred as the bocasis to be employed in the submicron grained bodies. Another class of carbides preferred for use in cutting tools and tips for oil well drilling bits are the carbides of silicon, titanium, zirconium, tantalum, niobium, and tungsten.

Because of the high cost of hafnium, it is not a preferred major component of the submicron grained bodies of this invention, but can be employed to advantage as one of the interspersants.

Some bocasi compositions are preferred because of their particularly stable interspersants. Especially useful interspersants are thorium oxide, aluminum oxide, zirconium oxide, lanthanum oxide, yttrium oxide, and hafnium oxide. These are preferred not only because they are especially effective in many of the bocasi compositions, but also because they can be made in stable macromolecular form and are especially suitable for the processes of this invention.

Another preferred class of oxides to be used as interspersants is comprised of magnesium oxide, calcium oxide, beryllium oxide and strontium oxide because of their extremely high melting points, combined with the fact that they can be introduced into the compositions of this invention as macromolecularly subdivided salts, particularly carbonates, which are decomposed in the dry powder intermediate, to leave the macro-molecular oxide in situ.

Another class of submicron grained bodies of this invention is preferred because of their nitride interspersant components. Nitride interspersants, although often difficult to introduce, are particularly immiscible, inert and non-reactive with the bocasi components, and thus are especially stable at elevated temperatures. The preferred nitrides are those which can be prepared in extremely finely divided form suitable for employment in the processes of this invention, including hafnium nitride, tantalum nitride, boron nitride, titanium nitride, and zirconium nitride. These are also preferred because they are especially high melting and refractory in nature.

Another class of nitrides is preferred as interspersants because they can be introduced into the intermediate powders of this invention by synthesis from the corresponding metal by reaction with nitrogen, particularly aluminum nitride and vanadium nitride.

(2) *Density of submicron grain bodies.*—The relation between the apparent density of a body and the theoretical density calculated from the volumes and individual densities of the components permits an estimate of the internal porosity. The preferred bodies of this invention have an apparent density over 99% of the theoretical density. Expressed another way, the volume of a given weight of the preferred body is equal to the sum of the volumes of the components calculated from the weight of each component divided by its density.

However, some of the bodies of this invention have a fine-pored structure which is nevertheless so strong that useful bodies are obtained even though the density is only 90% of theoretical. The porosity can be 10% by volume, but the pores are so fine as to be invisible to the eye. The finer the pores, the less detrimental they are to strength and other physical properties. In some exceedingly fine pored bodies, a uniform porosity of 5 to 10% by volume is advantageous in that improved resistance to thermal shock and even improved impact strength is obtained in comparison with bodies that are 100% dense.

(a) Freedom from macroporosity and microcracks

Large pores, or cracks in any form, in the structure of the micrograin bodies are detrimental to mechanical strength. Even if the body has a density which is 99% of theoretical, the remaining 1% by volume of porosity is very detrimental if these pores are sufficiently large to be visible under an optical microscope, or if the porosity is present in ahe form of microcracks extending for distances of a few microns. Such cracks often are invisible under the optical microscope, but can be observed by electron micrograph techniques.

(b) Method of measuring apparent density

The method of measuring apparent density is selected according to the type of specimen available.

The simple way to measure apparent density is to cut a smooth rectangular block with parallel sides from the specimen, measure the dimensions with a micrometer to the nearest 0.001 cm., weigh the sample in air to the nearest 0.01 gram and divide the weight by the calculated volume to give the density in grams per cubic centimeter.

A method preferred for irregularly shaped specimens employs mercury displacement, as described by Maczymillian Burke, Roczniki Chem., 31, 293–295 (1957), "Pyknometer for Determining the Bulk Density of Porous Materials," and further referred to in J. Am Ceram. Soc., 45 (7), pp. 352–353 (1962), by the same author. Briefly, the method consists of immersing the sample in mercury to determine the displacement volume. Because of the high surface tension of mercury it does not penetrate capillaries or pores smaller than about 15 microns in diameter when the mercury is pressed against the specimen by atmospheric pressure. The air is evacuated from the pores of the specimen prior to its immersion in the mercury.

(3) *Grain size and structure.*—The crystallite size of the juxtaposed units is ordinarily larger than the crystallite size of the interposed units. In the bodies of this invention, both units, however, have an average crystallite size smaller than a micron, which is about the limit of the optical microscope. This means that in the preferred products of this invention, the grain structure is not readily visible when polished sections or fractured surfaces are examined by the optical microscope using ordinary metallurgical or petrographic techniques.

However, the optical microscope is useful in determining the presence of undesirable large pores, and to observe whether there is any overall heterogeneity which is to be avoided. The preferred products, when examined by the optical microscope, show essentially no structural features, and in the best instances exhibit only an almost indistinguishable fine, speckled appearance due to the presence of occasional grains or other heterogeneities large enough to be visible.

The determination of crystallite size of the products of this invention requires observation with the electron microscope. This ordinarily cannot be done directly. Instead, a thin plastic replica is made of the surface, and the replica film, after being shadowcast with metal vapor if necessary to bring out further details, is examined by the electron microscope.

The structure of the body can be examined by fracturing a sample and examining the fractured surface. Alternatively, the body can be cut with a 180 grit diamond saw and polished to an optically smooth surface. Different materials require somewhat different techniques. For example, the cutting, polishing and etching of silicon carbide is described by P. Popper and D. G. S. Davies, Powder Metallurgy, No. 8, p. 113 (1961), "The Preparation and Properties of Self-Bonded Silicon Carbide," and by J. W. Faust, Jr., "The Etching of Silicon Carbide," Proceedings of the Conference on Silicon Carbide, Air Force Cambridge Research Center, Boston, Mass., April 1959, p. 403–419.

The polished surface is then etched with agents to differentiate between the juxtaposed units or grains and the interspersed material. It is then examined by the replica technique with the electron microscope as described in the publications by B. Chalmers and A. G. Quarrell, "The Physical Examination of Metals," Edward Arnold Publ., London, second edition, 1960, pp. 429–932 and by D. E. Bradley, J. Inst. Met. 83, p. 35, 1954.

Depressions are etched in the surface where the most rapidly dissolved phase is present, and the average diameter of the depressions corresponds to the particle size of that phase. The other components are left as projections. Thus, with a structure similar to that represented in FIG. 1, an etchant for the interspersant will leave holes between the interposed units; if the structure is similar to that illustrated in FIG. 6, the juxtaposed units will be left as island separated by depressed regions.

A very satisfactory method for macro-molecular examination of fracture surfaces is available. The fracture surface can be accurately replicated using the two-stage technique described in an article: "Survey of Preparation Techniques for Electron Microscopy," Phillips Gloulampenfabrieken, Scientific Equipment Department, Eindhoven, Netherlands.

When this replica is observed in an electron microscope, the fracture can be observed clearly and unambiguously between 2500× and 60,000×, or even up to 500,000× in special cases. Resolution of 2 Angstroms is common and as low as 8 Angstroms is possible. The depth of focus permits "in focus" photomicrographs in the full range of magnification.

Polished surfaces can, of course, be examined quite satisfactorily at magnifications up to 1500× with the light microscope. Gradations of structure and the distribution of multiple phases are readily studied on a polished and suitably etched surface. At higher magnifications, the electron microscope must be used to reveal the fine detail of structure and morphology. Again the high resolution and depth of focus are big advantages.

Both the light microscope and the electron microscope is preferably used for examining surfaces of bodies of fine grain size in order to bring out all the features of porosity, grain size and homogeneity of structure.

(b) Crystallite size by X-ray diffration-line broadening

In the polycrystalline heteromorphous bodies of this invention, the crystallite sizes will generally correspond to the sizes of the juxtaposed units of bocasi and of the interposed units of interspersant, respectively. This is because in most bodies which have been pressed to 100% density or close thereto, the juxtaposed units of bocasi have undergone recrystallization to the limit permitted by the interspersant, so that each juxtaposed unit of bocasi generally becomes a single grain. However, in some compositions where exceedingly finely divided disaggregated macro-molecular bocasi powders are used and the packing density is high, a state of 100% of theoretical density can be reached in a short hot pressing time at minimum temperature. Under these circumstances, the juxtaposed units of bocasi still consist of a number of closely packed crystallites of bocasi, with no interspersant between them. The juxtaposed units of interspersant, nevertheless, play an important role in determining the properties of the body when used for prolonged periods at high temperature, since grain growth of the bocasi, which sometimes occurs within the juxtaposed units during use, will be limited to the size of the juxtaposed units, so that high strength and hardness are retained.

A characteristic of the preferred submicron grained bodies of this invention is that when characterized by X-ray diffraction, a broadening of the diffraction lines can be observed in one or more of the components, most commonly the interspersant and in preferred bodies, also the juxtaposed units.

Line broadening described fully hereinabove, for submicron grained bodies of this invention is related to the crystallite size, and not to internal strains in the crystal lattice. The body has been heated to high temperature and such strains have been relieved.

The procedure for determining crystallite size in the body consists in cutting a specimen in the form of a thin wafer or rod suitable for examination by X-ray diffraction either by transmission or reflection. A specimen of the body, alternatively, can be crushed to pieces a few tenths of a millimeter in size, sufficiently small to be mounted in the conventional manner for obtaining a "powder pattern." The specimen is pulverized only sufficiently to comminute it to a sufficient extent to be mounted in the specimen holder.

The crystallite sizes in the juxtaposed units of bocasi in the submicron grained bodies of the invention will usually lie in the range from 100 to 750 millimicrons. It is understood that the X-ray method becomes less precise when the crystallite size exceeds about 500 millimicrons, but it is usually possible to distinguish samples in which the average crystallite size is between 500 to 1000 millimicrons from those in which the crystallite size is larger than 1000 millimicrons.

The preferred average crystallite size of the bocasi phase in the bodies is less than 500 millimicrons. An average crystallite size of less than 100 millimicrons will, of course, be preferable when such bodies can be produced with no porosity, but generally speaking, bodies containing bocasi crystallites of average particles size much smaller than about 100 millimicrons are simultaneously somewhat porous. In such instances, the higher strength of the body resulting from the finer grain size is offset by the detrimental effect of the porosity. Hence, the strongest bodies of this invention generally exhibit a crystallite size of the juxtaposed bocasi in the range from 100 to 500 millimcrons average diameter, as calculated from the X-ray line broadening.

The crystallite size of the interspersant can likewise be calculated from the line broadening of the X-ray diffraction lines characteristic of the interspersant phase. Since the interspersant units are smaller than the juxtaposed units of bocasi, the average crystallite size ranges from about 25 to 500 millimicrons in average diameter. Only the most stable, high melting interspersants such as carbon will have a crystallite size less than about 50 millimicrons in the dense heteromorphous body.

In calculating the crystallite size from the measured broadening of the X-ray diffraction lines for a given material, one line of a given material can give a calculated crystallite size different from that calculated from another line. Since it is the minimum dimension of the unit that is important, the crystallite size is calculated from the width of the line which shows the greatest degree of broadening in the particular composition under consideration.

(c) Homogeneous distribution of juxtaposed units and interspersants

As shown in the figures, the distribution of juxtaposed units and interspersants in the heteromorphous body is as uniform as possible in the sense that a micrograph of one section of the specimen has the same general appearance, showing the same general type of distribution of units, as another section. If it is observed that certain regions of the structure show a greater proportion of interspersant to juxtaposed units than another portion of the structure, then poor mixing of the components in the original powder blending or inhomogeneous conditions of temperature and pressure in the sintering operation have intervened.

A deliberate variation in homogeneity can, however, be introduced with beneficial results. For example, it is often advantageous to create a structure in which there are regions high in bocasi, while other regions are lower. This type of structure is particularly valuable where the interspersant is admixed with a metal. Thus, in some applications a body having a laminar structure consisting of juxtaposed units of tungsten carbide bonded with an interspersant of cobalt and macro-molecular lanthanum oxide, can be made in such a way that there are alternate layers continuing a high cobalt content, such as 25% by weight and a low cobalt content, such as 2% by weight, respectively. The layers of high cobalt content are extremely tough and impact resistant, while the layers of low cobalt content are much more brittle, but much harder. Such bodies of heterogeneous structure with the heterogeneties of area dimensions ranging in size or thickness from a millimeter to five microns are advantageous in some applications such as wear resistant surfaces in bearings subject to heavy mechanical shocks.

Except for such deliberate macro-heterogeneity of structure, the bodies of this invention are preferably so homogeneous in structure that on a polished section no variation in appearance from one area to another, indicating heterogeneity, can be seen when examined under a optical microscope at a magnification of 100 times. The preferred bodies of this invention appear homogeneous under higher magnification to permit comparison of adjacent areas down to 5 microns in diameter.

(4) *Mechanical properties of bocasis.*—In order to ascertain the physical properties of the products of the above described processes, both for the purpose of establishing the optimum fabrication conditions and to make a comparison with conventional materials, standard procedures are employed for the measurement of density, transverse rupture strength, impact strength and hardness.

(a) Preparation of specimens

Test bars are cut from the fabricated piece using a high precision diamond saw wafer cutting machine, for example, Micro-matic Model WMSA 1784, supplied by the Michromech Manufacturing Corporation.

Rectangular bars are prepared in two size ranges, 0.070±0.05″ and 0.25±0.05″ square cross-section and between 0.5 and 2″ long. The fine grit diamond impregnated saws which are used, Norton Co., 180–220 grit diamond metal or resin-bonded 0.018–0.022″ wheels, give a good surface finish, enabling measurements to be made on the bars without further polishing (b) Density and porosity measurement The density and porosity mesurements are made on bars prepared as described above or on pieces which have been previously subjected to physical testing. The method employed is described fully in A.S.T.M. Standards, vol. 5 (1961), and is designated C20–46. Values are obtained for the apparent specific gravity, bulk density and percentage of open pores, which is the relationship of the volume of open pores to the total volume of the specimen. The difference between the apparent specific gravity and the theoretical density divided by the bulk density corresponds to the percentage of closed pores.

The bulk density is also obtained by accurate measurement of bar dimensions and dividing the weight of the bar by the calculated volume. The method of mercury displacement in an accurately calibrated pycnometer, as described by M. Burr, Roczniki Chemie, 31, 293 (1957) is also used to ascertain the apparent specific gravity of either regular or irregularly shaped pieces. All these procedures are found to give reliable values for density and porosity.

(c) Transverse rupture measurement

Many procedures are described for the measurement of transverse rupture strength by W. H. Duckworth, J. Amer. Ceram. Soc., 34, 1 (1951), and W. D. Kingery, "Property Measurements at High Temperatures," pp. 166–168 (John Wiley & Sons, New York, 1959). Two procedures are employed in measurements on the compositions of the invention, both based on A.S.T.M. Designation C113–55, as described in A.S.T.M. Standards, Part 5, pp. 432–433, 1961.

Square bars, 0.25±0.05″, are supported on 5/32″ diameter cylinders with a span of 1″ and the load applied by a 5/16″ cylindrical radius head at the middle of the span. The material used for the head and bearing cylinders is hardened steel at room temperature, Haines Stellite X–40 at temperatures up to 1200° C. and Carborundum Co. KT silicon carbide between 1200 and 1500° C. The load is applied with an Instron Tensile Testing Machine, Model TTC, using a cross head speed of 0.02″/min. and loading rates in the range 5000 to 50,000 p.s.i. per minute. The sample, bearing cylinders and cross head are enclosed in a platinum 10% rhodium wound resistance furnace and the temperatures measured by a platinum 13% rhodium thermocouple positioned close to the sample.

For rapid testing of 0.07±0.05″ square bars at room temperature a modified 20 Kg. Ohaus triple beam balance is used. The sample bars are supported on steel blocks which are adjustable to give spans of ½″, ¾″ and 1″ and which are supported on the pan of the balance. The cross head consists of a hardened steel knife, 0.04″ thick having a 0.02″ radius of curvature at the point of contact with the sample. The knife is rigidly held in contact with the mid-point of the test bar by a saddle above the sample. The load is applied by running lead shot into a bucket suspended on the balance arm until the sample breaks. The load is calculated from the weight required to break the sample and the mechanical advantage of the balance. By varying the rate of addition of the lead shot, the loading rate can be adjusted over the range 5000–150,000 p.s.i.

The transverse rupture modulus, in pounds per square inch, is calculated from the following formula:

$$R = \frac{We3}{2bd^2}$$

where:

$R$ = modulus of rupture in pounds per square inch
$W$ = total load in pounds at which the specimen fails
$e$ = distance between the supports in inches
$b$ = width of the specimen in inches
$d$ = depth of specimen in inches.

Using bars cut from a commercial alumina plate, the two test procedures gave average strengths (five bars) as follows:

0.025" square bars—21,700±1500 p.s.i.
0.070" square bars—23,800±2700 p.s.i.

Although the values obtained on the modified Ohaus balance tester shows greater scatter than those measured on the Instron tester, the test is sufficiently reliable for the rapid comparative screening of many samples. The higher average value obtained on the smaller cross section bars is consistent with knowing that the measured transverse rupture strength of a material increases with decreasing cross section of the test bar.

(d) Impact strength measurement

Values obtained for the impact strength of relatively brittle materials are related to the particaular testing procedure adopted and various methods are described by A. Dinsdale and W. T. Wilkinson, "Mechanical Properties of Non-metallic Brittle Materials," pp. 193–203 (Interscience, New York, 1958) and W. Spath and M. E. Rosner, "Impact Testing of Materials," pp. 102–110 (Gordon and Breach, New York, 1961). The procedure used to measure the impact strength of the bocasi compositions of this invention is based on A.S.T.M. Designation E23–60, A.S.T.M. Standards, Part 3, pp. 79–93, 1961.

A Tinius Olsen, Change-O-Matic Impact Testing Machine is used to make all measurements, the Izod vice being modified so that the hammer strikes the sample $3/8''$ above the top of the vice. The test bars, 0.025"±0.05" square cross section and at least 1" long are climped rigidly with $1/2''$ protruding from the top of the vice. The sample bar is not notched but otherwise the test procedure is as described in A.S.T.M. E23–60. The loss of energy by the pendulum on breaking the sample is indicated on a graduated scale in inch-pounds and the impact strength in foot pounds per square inch is calculated from the following formula:

$$I = \frac{E}{12 \times b \times d}$$

where:

I=Pendulum energy loss in inch-pounds
b=Width of specimen in inches
d=Thickness of specimen in inches.

(e) Hardness measurement

Hardness measurements are made on the more brittle materials using a Tuben Hardness Tester Model MO, and following the procedures described in A.S.T.M. Designations E–92–57 and E140–58, A.S.T.M. Standards, Part 3, pp. 53–58 and 65–73, 1961. The hardness values are reported as Knoop Hardness Numbers using 500 or 1000 g. loads.

On less brittle materials, permitting a larger indentation to be made without initiating strain cracks, a Wilson Model 3JR Rockwell Hardness Tester is used. The procedure is described in A.S.T.M. Designation E118–61, A.S.T.M. Standards, Part 3, pp. 39–52. A diamond cone and a 60 kilogram load are used and the hardness is measured on the Rockwell A Scale.

(5) *Electrical properties.*—The electrical properties of the heteromorphous submicron grained bodies of this invention differ from those of bodies made of pure carbide, silicide, or boride of the corresponding bocasi. Generally, the electrical resistivity is higher, to an extent depending upon the electrical resistance of the interspersant. In some instances, bodies consisting for the most part of a conducting bocasi will nevertheless be an electrical insulator due to the non-conducting properties of the minor amount of interspersant which is so evenly distributed as to prevent electrical contact between the juxtaposed units of bocasi. Such bodies have the unusual characteristic of becoming conducting at very high voltage, but being non-conducting at low voltage.

Thermoelectric properties, resistivity and temperature coefficient of resistivity can be varied uniformly by suitable blending of different types of bocasi components. A major advantage of the bodies of this invention is the reproducibility and uniformity of electrical characteristics resulting from the reproducible uniform and homogeneous structure.

(6) *Thermal properties.*—The thermal conductivities of the bodies of this invention are generally lower than those of pure borides, carbides, and silicides corresponding to the bocasi employed. The lower thermal conductivity is a result not only of the exceedingly fine grain size, but also the presence of interspersants which frequently have lower thermal conductivity than the juxtaposed units of bocasi. The exception to this, of course, is where the interspersant is admixed with a metal phase which has a higher thermal conductivity than the bocasi.

In one preferred class of bocasi, the coefficients of thermal expansion of the juxtaposed units and of the interspersant are equal, e.g., molybdenum disilicide and aluminum oxide. Such types of bodies exhibit very high resistance to thermal shock.

(7) *Methods of shaping — finishing.* — The molded bodies of this invention can often be made sufficiently close to the required finished shape for a specific use that no further finishing is required. However, in other instances, additional cavities, holes, and the like are desired to be formed, or the body is to be changed in overall shape.

In a few instances, particularly compositions containing minor amounts of metals, the bodies can be further molded if reheated to near the original molding temperature and subjected to stress. For the most part, however, the products of this invention are not susceptible to either hot or cold working or forging, such that they are cut, dissolved or eroded to suitable shape. On the other hand, extrusion is possible in some instances if the extrusion operation is carried out immediately in conjunction with the hot pressing process. For this, the body is pressed to density and immediately extruded through an orifice opened at the right instant. It is generally not preferred to cool the molded body and then reheat it for extrusion because of the additional recrystallization that can occur, especially if the extrusion temperature required exceeds about 1500° C.

Cutting and shaping of the bodies of this invention is carried out most expeditiously with diamond saws and diamond tipped tools. Grinding and polishing with diamond dust can also be employed.

The heteromorphous dense bodies of the invention which are electrically conducting can be machined, drilled or cut by Electrical Discharged Machining (EDM). However, there are a few compositions, particularly those in which refractory oxide interspersants are employed, which are not sufficiently electrically conducting to permit the use of EDM. In this instance diamond cutting or drilling or electron beam machining is used. Techniques involving the maser or laser can be used for making very small holes, while for coarse cuts, the plasmajet can be employed.

(8) *Resistance to corrosion and oxidation.* — The heteromorphous bodies of this invention vary widely from each other with respect to resistance to corrosion and oxidation. Broadly, however, the fine grained heteromorphous bodies of this invention are more corrosion and oxidation resistant than conventional coarse grained bodies which do not contain interspersants. Many processes of corrosion and oxidation involve attack at grain boundaries. Suitable selection of highly resistant and refractory interspersants therefore leads to improved resistance to corrosion and oxidation. The fine grain structure also retards the rate of attack.

The bocasi submicron polycrystalline bodies of the present invention will be better understood by reference to the numerous illustrative examples given hereinafter.

VI. USES OF THE INVENTION (A) Uses of the aggregated colloidal bocasi powders The bocasi powders as recovered from the molten salt synthesis medium tend to be in a flocculated or loosely aggregated state. These have certain uses based on their aggregate structure. By increasing the time between additions it is possible to increase the degree of aggregation and of cementation between the particles of aggregates. This can be done by maintaining a relatively low level of supersaturation of the molten salt with respect to the bocasi; for example, by relatively small increments being added slowly. This minimizes the number of new nuclei created in each addition and tends to deposit the newly created bocasi upon the surfaces of already partially aggregated bocasi powders. It is possible to achieve the same effects by extended heating times while the bocasi is still in the salt melt, following the completion of all of the reagent additions, especially when the temperature is increased to the neighborhood of 1100° C. Under these conditions, the smaller colloidal particles of the bocasi powders tend to dissolve and deposit at junction points of larger flocculated units, and thus reinforce the junctions. By control of these variables it is thus possible to synthesize bocasi powders with a controlled degree and strength of reinforcement of aggregates.

(1) *Catalysts.*—There are uses in which bocasi powders with heavily reinforced aggregation are preferred, e.g., when the colloidal bocasi is to be employed as a catalyst support. There are many instances, such as in the catalytic cracking and reforming of petroleum products, where the effectiveness of a catalyst is limited by the structural stability of the support at elevated temperatures. In such applications, the preferred support is a relatively large pored structure with pores from 50 to 1000 Angstroms in diameter; the extremely refractory bocasi materials of this invention can be made with such a structure. Not only do they have novel and varied catalytic applicability in their own right, but as catalyst supports they are capable of being operated at temperatures from 800 to 1200° C., where conventional silica and aluminosilicate catalyst supports sinter and collapse.

(2) *Fillers.*—Aggregated materials of bocasi powders of this invention may be employed as reinforcing fillers for organic plastics and elastomers. The use of silica, asbestos flour, and carbon black for such purposes has long been known in the art. There are many areas of utility, however, where the properties of the reinforcing filler determine the effectivenss of the composite, e.g., resistance to ultraviolet light, ozone attack, abrasion resistance, and oxidation resistance at high temperatures, as well as flammability.

The aggregated bocasi powders possess the extremely high surface area and the strength of aggregation, known in the industry as "structure," which makes carbon black of such great utility. In addition, however, they exhibit an entirely different range of surface chemical reactivity, and thus are capable of bonding with types of organic functional groups on the polymers which do not bond satisfactorily to carbon blacks. In further contrast to carbon blacks, these bocasi materials, even though of extremely fine particle size, exhibit exceptional resistance to oxidation and corrosion, so that the resistance of the filled polymer to oxidation, hydrolytic degradation, as well as pyrolitic oxidation, is in many instances strikingly improved.

The most dramatic effect in filled polymers is the improved abrasion resistance obtained by using these extremely hard, extremely wear-resistant particles instead of the relatively soft carbon blacks. For example, aggregated silicon carbide bocasi powders of the invention when incorporated by intensive milling into automobile tread stock instead of carbon black gives remarkable resistance to abrasion and wear.

This same resistance to abrasion and wear is also found in compositions which might be defined as organic-bonded bocasi bodies. It is possible, for example, to prepare hard, dense, heavy bodies from the tungsten or tantalum carbide bocasi aggregated powders of the invention by bonding them with resins such as epoxy resins. These make tough, wear-resistant compositions which may be used for cutting relatively soft metals, plastics or wood.

In a similar fashion, the heavily aggregated bocasi powders of the invention can be incorporated into elastomeric and thermoplastic organic materials such as latex dispersions or polyethylene by milling and heat calendering. Sheets of plastics or elastomers highly loaded with bocasis may be used as polishing cloths. It is possible with such compositions to attain a smoothness obtainable only by the most expensive and finest abrasives with techniques such as pitch lapping. For such purposes, the aggregated bocasi powders of the invention are to be preferred over the disaggregated powders, since they give a more rapid polishing action, although for finest finishes, the disaggregated bocasi powders should be employed.

(3) *Electrical devices.*—Bocasi powders of the invention may also be used in certain electronic applications. For example, the phosphor and the electroluminescent activity of the silicon carbide bocasi powders of the invention, particularly the solid solutions of aluminum nitride and silicon carbide prepared as described in Example 29 are of interest. It has been found that the areas of highest luminescent activity appear to be at the junction point between crystallites; the more heavily aggregated powders of the invention appear to be more efficient than the disaggregated powders, or powders formed by drying the sols of the invention.

(4) *Thickeners.*—The aggregated colloidal bocasi powders of the invention may be employed as unique thickening agents which can be used to thicken liquids for which no thickening agents were previously available. Due to their extreme resistance to chemical corrosion, certain selected, open-pored aggregated colloidal bocasi powders such as silicon carbide may be employed as thickeners to make gels of hydrofluoric acid, nitric acid, concentrated sulfuric acid, caustic solutions, chromyl chloride and other corrosive liquids for which there were previously no adequate thickening agents available. The thickened hydrofluoric acid composition may, for example, be used to selectively etch glass surfaces by applying the paste in selected areas.

Molten metals of various types may be effectively thickened by the colloidal bocasi powders of the invention. Particularly the carbides, and, to a lesser extent, the silicides of the invention appear to be stable in the lower melting metals, such as lead, zinc, tin, and aluminum, and yet in many instances are wetted by them. For this purpose it is necessary to incorporate within the molten metal a small amount of an active metal such as calcium or sodium which can reduce the monolayer of oxygen adsorbed on the surface of the aggregated colloidal bocasi powders of the invention. When this precaution is taken, it is possible to stir the bocasi powders into such molten metals and to attain any level of viscosity or thixotropy required, even up to the point where metals such as lead will maintain a solid form or shape at temperatures hundreds of degrees above the melting point.

Molten salts may be similarly thickened; thus it is possible to apply molten salts as a flux to the surface of metal in thick layers which will not run off.

(5) *Nucleation of glasses.*—Certain molten glasses may be thickened by refractory, corrosion-resistant, colloidal, aggregated bocasi powders of the invention, thus rendering the glass less mobile and more easily shaped.

The bocasi powders of the invention may also be employed as reinforcing fillers and nucleating agents in glasses. Most materials hitherto used to nucleate and control the devitrification of glasses have been substances such as titanium dioxide, which are at least partially soluble in the glass. A limiting factor in using such nucleating agents is that at elevated temperatures there is a tendency for the nucleating agent either to dissolve or to grow rapidly in particle size, and thus become ineffective for nucleation. Now for the first time it is possible to employ materials which, although readily wet by glasses, are not readily attacked at normal glass-forming temperatures, and which do not dissolve. The colloidal silicon carbide aggregated powders of the invention can be coated with a uniform coating of amorphous silica by means known to the art, prior to being incorporated by ballmilling with glass frit, followed by melting. Alternatively, it is possible to suspend the aggregated powders of the invention in an aqueous solution, and coprecipitate them with components which can then be added to glass batches. Thus, it is possible to precipitate calcium silicate by adding to a rapidly stirred suspension of the aggregated silicon carbide powders of the invention, simultaneously a stream of calcium chloride aqueous solution and a sodium silicate aqueous solution. The silicon carbide aggregates are thus surrounded and enclosed in a calcium silicate matrix. This can be recovered and dried, ballmilled and fired to an anhydrous state, and then incorporated into glasses, enamels, and other similar vitreous refractory compositions. The softening temperature of the glass is raised and the mechanical strength, hardness and abrasion and corrosion resistance of the glass may be improved.

(6) *Reinforcing metals.*—Similarly, is possible to incorporate the colloidal refractory powders of the invention into metals by precipitating them along with reducible hydrous oxides such as those of cobalt, iron, copper, and nickel, for example by neutralizing the corresponding metal nitrate solutions with ammonium carbonate in the presence of suspended and rapidly stirred bocasi powders. The metal oxides may then be ballmilled and reduced by hydrogen or in a molten salt with sodium or calcium, to give metal powders containing the colloidal bocasi powders of the invention as reinforcing fillers and thickening agents. The crystal size of the resulting metal powder is maintained in a much finer state at elevated temperature near the melting point of the metal than in the absence of these reinforcing bocasi fillers. When such powders are fabricated into dense metallic objects of powder metallurgical techniques, the mechanical properties of the resulting metals are greatly improved over those obtained in the absence of the bocasi.

(7) *Modifying carbon.*—The bocasi powders of the invention may be used to improve both the mechanical properties and the corrosion and oxidation resistance of carbon bodies. The colloidal bocasi powders of the invention can be incorporated in the normal mixes which are used to make solid carbon bodies, such as mixtures of carbon with pitch, carbon with furfural resins, with phenolformaldehyde B stage resins, etc. They can, in fact, even be used without a bonder such as those mentioned above, if employed in somewhat greater quantities and intimately mixed with the carbon, and will themselves function as excellent bonding agents for carbon bodies, particularly when fabrication is accomplished by hot pressing. Thus, the boron carbide, the silicon carbide, the chromium carbide, and the various boride and silicide bocasi powders of the invention improve the mechanical strength and the oxidation and corrosion resistance of carbon, and may increase the useful service temperature in oxidizing atmospheres by several hundred degrees centrigrade, if employed in sufficient amounts.

(8) *Porous bodies.*—In this connection it should be noted that it may be desirable to make a porous body. This has already been noted in a discussion of catalyst supports and reinforcing and thickening agents, but it is also very useful to make light weight but relatively strong structures, which resemble foamed structures. Porous bodies may be used for special purposes such as high temperature filters for molten salts, molten metals and extremely corrosive liquids. For such purposes, it is therefore desirable to deliberately employ reinforced aggregated bocasi powders which can be hot pressed but which will still maintain a relatively porous network structure.

(9) *Pigments.*—Bocasi powders may be used as pigments. Enamels and glasses used for decorative purposes are often limited in the choice of pigmenting materials which can be incorporated yet which retain the desired color and appearance after processing. For this purpose, aggregated and reinforced bocasi particles having an aggregate size in the general range of from 100 millimicrons to a micron, with ultimate units ranging in size from 50 millimicrons to 250 millimicrons have high hiding powder. suitable introduction of metal oxides such as iron oxide along with a bocasi such as silicon carbide, the glass can be modified to give a range of shades as well as other optical effects.

(10) *Polishes.*—The colloidal bocasi powders of the invention are, of course, excellent fine polishing agents and abrasives in their own right. They give almost none of the gross scratching effects which are often found in all but the finest abrasives otherwise available. They can be bonded with all of the normal bonding agents employed in the abrasive art, such as various types of resins, metals, and vitreous substances.

(11) *Source of disaggregated powders.*—An important use for the aggregated colloidal powders of the invention is as a precursor for the disaggregated powders and sols of the invention which, in turn, may be used to make the dense bodies of this invention.

VI(B) USE OF DISAGGREGATED BOCASI POWDERS OF THE INVENTION (1) *Improved effects obtained with disaggregated bocasi powders.*—Whereas aggregated colloidal powders are most effective, and perform more efficiently when the desired utility involves thickening of a material in a liquid or molten state, the reinforcing effect, particularly on the mechanical properties such as tensile and transverse rupture strength in both metals and glasses as well as vitreous ceramics, is improved most dramatically per unit weight of bocasi when these are in the highest state of dispersion. For this purpose, it is very useful, for example, to coat the disaggregated colloidal powders of the invention with silica for incorporation into glasses, with metal hydroxide followed by chemical reductions to give the metal for incorporation into metals, or by coprecipitation to give the constituents which will later be employed as components of a glass for vitreous ceramics. The disaggregated colloidal powders show improved mechanical properties, with less deleterious effects on ductility than when employed in the aggregated form.

Disaggregated colloidal powders of the invention are especially useful as nucleating agents to control crystallization and grain growth in glasses. It is to be noted that the ultimate in reinforcing properties and in improvements of the type discussed above can usually be obtained by means of coflocculation of the sols of the invention with sols of materials which are to form the major components of the structural material, or by precipitating the precursors of the major components upon and around each of the disaggregated bocasi ultimate units. Thus, metal hydroxides may be precipitated around the titanium carbide sols of the invention and reduced in hydrogen to form, for example, nickel, titanium-carbide cermet powders, wherein each titanium carbide particle is surrounded by a dense and uniformly distributed nickel coating. Similarly, the silicon carbide sols of the invention may be coated with colloidal amorphous silica to furnish unique nucleating agents which can be added to molten glass batches or mixed with the solid constituents of a glass batch. Such bocasis will form a uniform and homogeneous dispersion in the resulting glass.

To make carbon bodies, either employing the bocasi powders as bonding agents or as reinforcing agents, and to improve the oxidation resistance of carbon, the most dramatic improvements in both oxidation resistance and bonding and reinforcing effects are obtained with the disaggregated bocasi powders. Thus, it is possible by depositing molecular precursors of carbon such as a furfuryl alcohol polymer around each bocasi particle in a bocasi sol to attain the colloidal dispersed bocasi powders of the invention encapsulated individually, each with a coating of carbon, and these may then be used to form submicron-grained, corrosion resistant, oxidation resistant, and strong, hard carbon articles.

(2) *Making dense bodies.*—The particulate metal analogues of the invention can also be used as materials of construction by powder metallurgy techniques. The disaggregated colloidal powders of the bocasis are particularly useful for this purpose. Thus, they can be hot pressed, compacted under pressure and sintered, or fabricated by flame techniques to form articles of any desired shape. Such articles are characterized by having unusually high impact strength and resistance to thermal shock.

(3) *Polishes.*—The disaggregated colloidal boscasi powders may be employed for all those applications wherein aggregated colloidal bocasi powders are broken down and disaggregated during use. For example, when the aggregated materials are used as polishing agents, the mechanical action brings about disaggregation; disaggregated powders may therefore be employed as a polishing material, with the added advantage that in polishing compositions prepared as liquid suspensions, the disaggregated bocasi remains better suspended. For extremely fine polishing, for example, optically smooth surfaces, disaggregated powder is preferred.

(4) *Metal-bocasi compositions.*—Disaggregated colloidal bocasi powers are preferred in applications where homogeneous mixing with other finely divided substances is desired. Thus, disaggregated powders may be dry blended with extremely finely divided metal particles such as those obtained by the condensation of metal vapors in extremely high vacuum. Such powders must be handled out of contact with air, and the disaggregated bocasi powders must first be deaerated and then blended with the pyro-phoric metal powders by mechanical mixing and finally by ball-milling, preferably in a hydrocarbon liquid, in an inert atmosphere. In this manner, compositions ranging from 1% metal and 99% bocasis to 1% bocasi to 99% metal may be prepared and then consolidated by conventional powder metallurgy techniques, particularly in those cases where more than 50% of the composition, on a volume of solids basis is metallic; where the larger fraction of the solid volume is colloidal bocasi, hot pressing is usually found advantageous. By this means, extremely hard and strong compositions of high impact strength may be obtained which combine for the first time in the same material unusually high hardness with high toughness or impact strength.

Similar uniform mixtures of disaggregated colloidal bocasis with the more commonly available commercial metal powders such as nickel powder produced by the carbonyl process with a particle size from 1 to 10 microns in diameter may be employed to give useful compositions, although the mechanical properties are not as outstanding as when a finer metal powder is used so that a more homogeneous body is obtained.

(5) *Organic polymer-bocasi compositions.*—Disaggregated bocasi powders of this invention may be milled into organic polymers, or incorporated into solutions of organic polymers and then dried, to give organic-bonded compositions of high hardness and resistance to wear. Compositions ranging from 30 to about 50 volume percent of bocasi exhibit the most unusual properties. Compositions containing still more bocasi and less organic polymer, tend to be microporous, showing less mechanical strength and tending to be brittle. Compositions containing less than about 30% by volume of bocasi exhibit outstanding toughness, strength, and hardness, but otherwise resemble similar polymer compositions filled with an equal volume of fine carbon black. However, for certain purposes, the colloidal bocasi powder introduces unusual properties; for example, colloidal tungsten carbides can be employed in loadings as low as 5% by volume to increase the density of the composition. Tungsten carbide and a number of the other bocasis also render plastic compositions opaque to X-rays, at relatively low volume loadings. In the range from 20 to 50% by volume of electrically conducting bocasi powders provide plastic bodies of controlled electrical resistance. Some of the bocasi powders such as tungsten carbide provide very high electrical conductivity and may be used in sliding electrical contacts.

(6) *In glass and ceramics.*—Disaggregated colloidal bocasi powders may be incorporated into conventional glass and ceramic bodies for special effects. Glass bonded, conductive bocasi powders provide compositions of uniform, controlled electrical resistance. Small amounts of bocasis provide a stable, black color in vitreous enamels. When ballmilled with conventional ceramic components such as clays and fired in a neutral to reducing atmosphere, useful electrical resistors may be prepared having a homogeneous structure and good resistance to oxidation at red heat. Thus, the disaggregated bocasi powders of this invention may be employed as a component in making electrical resistance and heating elements of the conventional type, with some improvement in properties. It will be understood, however, that these bodies are not fine grained, in that the grain size is larger than one micron, and the properties are inferior to the submicron grained bodies prepared in accordance with the teaching of the present invention.

VI(C) USES OF BOCASI SOLS

The powders of this invention, when adequately disaggregated, may be dispersed to form sols which have a variety of uses.

(1) *Catalysts.*—The extremely finely divided nature and high specific surface area of the disaggregated bocasis in both powder and sol form make the bocasis particularly suitable for the preparation of catalysts. It must be pointed out, however, that the nature of the resulting catalysts will depend entirely on how the catalyst is processed and dried, particularly in regard to the nature of the atmosphere in which it is heated. Most of the bocasi powders in the colloidal state are oxidized in the atmosphere at red heat, to produce the corresponding metal oxide. The bocasis may therefore be employed as a source of the metal oxide, and at the same time may provide a catalyst base for the catalytically active oxides. Vanadium carbide made, for example, in the form of disaggregated bocasi powder, may be dispersed in hydrocarbon oil and deposited on an alumina catalyst support. Molybdenum carbides or titanium carbide may be deposited on a carbon support. The disaggregated bocasi powder may be suspended in a hydrocarbon medium, then the surface of the bocasi activated by the addition of a reducing agent such as aluminum alkyl. The colloidal bocasi powders of this invention, therefore, provide for the first time highly active surfaces of metal carbides, borides and silicides of elements noted for varied catalytic activity.

The disaggregated bocasis in the form of organosols suitably activated with reducing agents such as aluminum alkyl, provide catalytically active particles for the polymerization of unsaturated hydrocarbons. For example, colloidal titanium carbide in the presence of aluminum alkyls may be employed as catalysts for the polymerization of propylene and at the same time the titanium carbide becomes incorporated into the polymer structure as an active cross-linking filler, providing a solid polymer with high strength, hardness and modulus of elasticity. Even as low a loading as 2 or 3% of titanium carbide makes the polymer black and opaque, and impermeable to ultraviolet light.

(2) *Fillers in plastics.*—Bocasi sols of this invention may be mixed with dispersions of organic polymers such as natural and synthetic latices. Thus, colloidal silicon carbide may be employed as a white filler in elastomers, giving compositions of high abrasion resistance and tensile strength. Tungsten carbide may be incorporated into elastomer latex such as neoprene at high loading to produce subsequently vulcanized bodies containing 45% by volume of tungsten carbide and having extremely high density; a rubber hammer almost as heavy and tough as steel may be made in this way.

(3) *Mixtures-organosols.*—Bocasi sols may be admixed with petroleum waxes and liquid hydrocarbon fuels; soaps, detergents, including cationic and anionic surfactants, wetting agents and emulsifying agents; solutions and dispersions of cellulose and cellulose derivatives including water-soluble hydroxy ethyl ethers of cellulose, carboxymethyl cellulose derivatives, cellulose xanthate; colloidally dispersed cellulose, dispersions of cellulose fibers, including paper pulp ranging in degree of dispersion from kraft pulp to glassine; finely divided, naturally occurring mineral substances including kaolin, bentonite, montmorillonites, attapulgites, diatomaceous earth; and organic modified derivatives of clays such as alkyl ammonium and tetraalkylammonium salts of colloidal clays such as bentonites.

In addition to the suspensions and colloidally dispersed substances mentioned above, the bocasi sols may be mixed with a wide variety of liquids and true solutions. Thus, the colloidal bocasis may be transferred from water to organic solvents, to provide organosols. For example, bocasi sols such as silicon carbide may be mixed with water-miscible alcohols such as normal propanol at pH 4, and the water removed by azeotropic distillation to leave colloidal silicon carbide in anhydrous propanol. With sufficiently prolonged heating, particularly by heating under pressure, the surface of the bocasi may become esterified with the alcohol. Organophilic monolayers may be applied to bocasis thus by interaction with alcohols, long chain amines, quaternary ammonium ions, and in the case of bocasis dried from the elements having more basic oxides, organophilic coatings may be applied as layers of fatty acids. Thus, colloidal chromium boride may be rendered organophilic by the adsorption of stearic and other fatty acids and soap. By this means, the colloidal bocasis may be rendered dispersible in water immiscible liquids, oils, fats, waxes, hydrocarbon fuels, lubricating greases.

(4) *Treatment of surfaces.*—A particularly valuable application of colloidal bocasis is modifying surfaces to render them harder and more resistant to wear and abrasion. For example, when a sol of colloidal silicon carbide is dried on glass and the surface is rubbed, particles of silicon carbide become embedded in the surface of the glass and can be seen as a slightly metallic-looking film of silicon carbide.

Colloidal bocasis of this invention, such as silicon carbide, titanium diboride, zirconium diboride, columbium disilicide, and similar oxidation resistant bocasis are especially useful for the application of refractory coatings on conventional oxide-based refractory bodies. Thus, refractory crucibles and molds may be lined by applying suspensions and sols of colloidal bocasis to act as corrosion resistant and inert linings and in molds to serve as parting layers. In this type of application, the colloidal bocasis may be used as binders for coarser powders of the same general composition. Thus, colloidal silicon carbide may be used as a binder for fine grit silicon carbide powders. Colloidal titanium diboride may serve as a binder for graphitic boron nitride powder. It should be pointed out that in most instances, these compositions should not be subjected to prolonged heating in air, since the colloidal bocasis will slowly oxidize unless they are incorporated into a glass-forming composition to prevent contact with oxygen. If the coating comes immediately into contact with a molten metal, which provides strongly reducing conditions, the coating is stable and highly resistant to attack.

(5) *Polishes.*—Bocasi sols are valuable as super-polishing agents. While particles of submicron size are of little value for grinding and removing substantial thicknesses of substrates, they are valuable for finishing surfaces of metals, ceramics and glasses to an optically smooth condition. As mentioned above, some of the colloidal bocasi remains embedded in the surface, but this essentially contributes to the final smoothness.

(6) *Electrically conducting fluids.*—Certain bocasi sols at high concentrations provide electrically conductive fluids. Thus, aqueous sols of colloidal tungsten carbide at concentrations of 80 and 90% by weight of tungsten carbide are still fluid although somewhat thixotropic, and have the unusual characteristic of acting as a liquid conductor of electricity.

(7) *Use of sols in preparing dense, heteromorphous, submicron grained bodies of this invention.*—A most important use for the bocasi sols is in the preparation of powders from which the heteromorphous, submicron grained bodies of the present invention are fabricated. In many cases, the novel sols of this invention are the only suitable precursors of the heteromorphous bodies of the invention. This use of sols is shown in numerous examples of the invention.

VI(D) USES OF HETEROMORPHOUS SUBMICRON GRAINED BODIES (1) *Refractory components.*—The heteromorphous, submicron grained articles of this invention are suitable for use as containers and structural materials for parts to handle molten metals, including aluminum, magnesium, zinc, calcium, lead and tin. It is, for example, known that titanium diboride is highly resistant to molten aluminum, and may be employed as an electrode; however, submicron grained titanium diboride bodies of this invention are stronger and more resistant to erosion and corrosive attack than the conventional coarse grained titanium diboride. Where maximum electrical conductivity is not required, a fine grain titanium diboride body with colloidal thorium oxide as an interspersant is suitable, for example, as a container for molten metals, such as calcium, magnesium, and aluminum.

The heteromorphous bodies of this invention are generally resistant to corrosive attack by molten glasses and slags, as well as molten salts. Such resistance is inherent, or at least demonstrated by the fact that the bocasis are prepared at high temperatures in molten salts.

Likewise, the fact that many of the bocasis, even in the finely divided form, are purified by treatment with hydrochloric acid, sodium hydroxide solution, and hydrofluoric acid, exemplifies the extreme chemical inertness of these materials. Thus, heteromorphous, submicron grained bodies of tungsten carbide, silicon carbide, titanium carbide, titanium and zirconium diboride, and chromium boride are valuable for the fabrication of inert corrosion resistant parts such as for pumps, for extremely corrosive substances such as the strong inorganic acids, hydrogen fluoride and molten salts. Resistance to corrosion and erosion makes the heteromorphous bodies of this invention suitable for use in critical parts in high temperature furnaces, steam generators, gas turbines, spark plugs, burner tips, and the like. For each particular use, the preferred bocasi may be selected by one skilled in the art on the basis of the known chemical resistance and high melting point, as well as resistance to oxidation of the corresponding carbide, boride, or silicide.

(2) *Cutting tools.*—As the demands of modern technology become more stringent, stronger, tougher and harder materials are continually being developed to meet extreme performance requirements. The very properties which are sought in these materials give rise to serious problems in shaping and forming them to required dimensions. Consequently, if full advantage is to be taken of these newly available materials, it is necessary to make available tools with which they can be fabricated. Even with established materials, there is a continuing need for higher cutting speeds, finer finishes, and more demanding tolerances, all of which impose demands on tools and tool materials which cannot adequately be met at the present time. Considerable progress has been made in the areas of carbide, cermet, and oxide based cutting tools, but in many instances, when pushed to the limit of performance, these tool materials prove to be inadequate, or, at best, only a partial answer to the problem.

The properties which are most important in determining the performance capabilities of a cutting tool are strength, hardness, and toughness, and in this respect the dense, submicrograined bodies of the invention are quite outstanding. They make available a wide range of compositions applicable to the fabrication of machine tools for turning, milling, planing, grinding, lapping, honing, drilling, boring, reaming, and tapping, and thus they constitute a new class of machine tool compositions applicable to a wide variety of materials and fabrication procedures. For example, the submicrograined bodies of tungsten carbide containing carbon or alumina as the interspersant, and similar titanium carbide-carbon and titanium carbide-alumina compositions are found to be particularly effective in machining operations on cast iron and cast superalloys such as the stellites. Cutting speeds of 800 to 1000 surface feet per minute at a cut depth of 0.03" and a feed rate of 0.015" per revolution may be achieved, removing 20 to 50,000 lineal feet of material prior to failure of the cutting tip due to flank wear. This represents a substantial improvement, both with respect to feed and volume of metal removed, compared with the best commercial cemented carbide tips. Similar performance on cast metals and alloys may be obtained using cutting tips fabricated from the submicrograined cobalt bonded bodies prepared according to the teaching of the invention.

In machining metals which form long continuous chips such as the steels, welding of the chip to the cutting tip leads to cratering and early fracture of the tip. Cutting tips made from the compositions of the invention show improved resistance to this type of wear, particularly those based on titanium carbide. Improved performance where chip welding is a problem may be obtained by incorporating minor amounts of submicrograined titanium carbide or tantalum carbide, or both, in the bodies of the invention, by mixing them as colloidal sols with the major components in the fabrication process. These components added in the range of 5 to 20 volume percent based on the final composition decrease the adhesion of a continuous chip and thus lengthens the tool life.

Cutting tips made from such compositions may be used at high speeds, up to 1000 surface feet per minute, for extended periods of time, e.g., 20 to 30 minutes for cutting hardened tool steels, such as "Kynite."

Other areas of application of the submicron grained bodies of the invention characterized by outstanding toughness and hardness—for example, materials in which the juxtaposed units are titanium boride, titanium carbide, or tungsten carbide, with carbon, alumina or thoria as the interspersant—are the hard facing of deep drilling tools used in well drilling, and as chisels, edges, and bits in mining equipment such as excavator shovels, stone crushers, scrapers, and the like.

Another improved type of cutting tool may be made with a conventional coarse microstructure, but with submicron-grained carbide particles. Thus, cutting tools may be made by bonding granules of heteromorphous-submicron-grained tungsten carbide with cobalt powder in the conventional manner to make, for example, bonded carbide tools. In the conventional cutting tools, grains of tungsten carbide titanium carbide, and the like, are in the form of crystalline fragments a few microns in diameter, and are held together by metallic cobalt. In use, the strength of this material depends in part on the strength of the individual crystals of carbide. Since in the conventional products the grains are fragments of single crystals, they are subject to cleavage and individually are not very resistant to impact. By first creating a much finer submicron grained heteromorphous body in which the crystallites of tungsten carbide, for example, are only 300 millimicrons in diameter, and then pulverizing this body to particles in the 1 to 5 micron size range, one has an improved starting material for bonding with cobalt. Tools made from this powder by sintering with cobalt in the conventional manner exhibit improved wear resistance and have higher impact strength, because there are no continuous planes of cleavage through the polycrystalline carbide grains.

(3) *Dies.*—The compositions of the invention lend themselves to the fabrication of extrusion dies and compacting dies and punches for powder metallurgical applications. Particularly their outstanding strength and wear resistance enables them to withstand more stringent conditions and achieve longer service life. Dies, die nibs and punches may be fabricated to finished dimensions by hot pressing the fine powders of the invention to components of finished dimensions, or by hot pressing blanks and subsequently shaping these to the finished article by diamond cutting, drilling, and polishing, or by electric discharge procedures such as the "Elox" process. Compositions which are particularly useful in the manufacture of metal extruding and powder metallurical fabrication dies are the bocasis in which the juxtaposed units are tungsten carbide, silicon carbide, titanium carbide, titanium boride, and molybdenum disilicide, and the interspersant is carbon, alumina, thoria, zirconia, or lanthana. Compositions containing up to 35% of a metal such as cobalt are preferred where maximum toughness and resistance to impact is essential.

(4) *Nozzles.*—A further large field of application for the bocasis of the invention is in abrasion-resistant nozzles of all types. The high resistance to wear characteristic of the submicrograined bodies of the invention give outstanding performance in nozzles used for sand blasting, pumping oil well drilling muds, and similar applications where slurries of highly abrasive particles are required to be pumped at high velocities. Nozzles fabricated from powders in which the juxtaposed units are silicon carbide and titanium carbide, and the interspersant is carbon or alumina, may operate for several thousand hours as sand blasting nozzles, outlasting commercial cemented carbide nozzles by a factor of two- or threefold. The submicrograined tungsten carbide-cobalt-bonded compositions of the invention in which lanthana and thoria are used as grain growth inhibiting interspersants may also be used in fabricating abrasion resistant nozzles and show substantial improvements in useful life over the conventional cemented carbide nozzles.

(5) *Wear-resistant surfaces.*—The submicrograined, dense, hard compositions of the invention may be used in applications requiring improved resistance to wear; they provide extended service life and permit more extreme conditions of use. In these applications, bodies in which the juxtaposed units are silicon carbide, tungsten carbide, titanium carbide, tantalum carbide, titanium boride, and boron carbide show markedly improved wear resistance compared with the conventionally fabricated equivalents. Such components find applications as bearings in pumps for molten metals or molten salts, rolls and the sheet and wire rolling industry, file rings and seats for corrosive liquids and sludges, thread guides for synthetic and natural fibers and glass fibers, guides for the bearing spooling devices of fishing tackle, engraving needles, phonograph needles, fountain pen balls, and points and bearings in precision instruments where extremely accurate performance is over an extended period of time.

(6) *Electrical uses.*—Some of the heteromorphous submicron grained bodies of this invention have a suitable electrical resistance to be employed directly as electrical heating elements. The conventional procedure of diluting the conduction medium with inert ceramic materials to increase electrical resistance is applicable providing the interspersant has about the same coefficient of thermal expansion as the bocasis, as is the case with an alumina interspersant with molybdenum disilicide.

In the case of bodies of silicon carbide in which oxides such as alumina, mullite, and zircon are used as interspersants, varying electrical conductivity may be achieved by careful control of the amount and distribution of interspersant. Of particular interest is the use of zirconium oxide as an interspersant, since in the hot pressing operations the oxide becomes slightly reduced, so that the interspersant becomes a semiconductor. Molybdenum disilicide and silicon carbide bodies of this invention are much stronger and more resistant to oxidation than conventional heating elements based on these substances.

As an electrical conductor, heteromorphous bodies of this invention based on tungsten carbide as the major component with minor proportions of interspersants, are of particular value as electrical conductors and may be used in making electrical contacts, where extremely low resistance is not required.

(8) *Abrasive Grain.*—Abrasive polycrystalline grains made by crushing heteromorphous submicron grained bodies of this invention may be employed as grinding agents, and, in finer sizes, as polishes, giving superior performance because of the greater hardness of the individual abrasive grains, as compared with the conventional materials in which the grains have a coarsely crystalline structure. This new type of abrasion grain may be employed as suspensions, or coated on fabrics or paper backing in the conventional manner. They may be used for air blasting. All of the heteromorphous submicron grained bodies of this invention, as shown in the examples as having a hardness greater than about 1500 Knoop, may be crushed to suitable particle size for use in this manner. However, the bodies having a hardness greater than 2500 Knoop are preferred; such materials are more difficult to shatter, and grind to abrasive grain sizes than conventional abrasive raw materials, but the improved toughness of the resulting abrasive grains more than justify the additional expense of the pulverizing operation.

The uses of the products of this invention will be better understood by reference to the following illustrative examples.

Example 1

This example describes the preparation of particulate titanium carbide, using calcium carbide as the carbon-containing reactant, titanium dioxide as the titanium-containing reactant, and metallic calcium as the reducing agent.

The apparatus used in carrying out this reaction consists of a cylinder 4 inches in diameter and 11 inches high, fabricated from $\frac{1}{16}$ inch sheet "Inconel" (80% Ni; 13% Cr; 7% Fe). The cylinder is contained in a $\frac{1}{4}''$ wall "Duralloy" (65% Fe; 20% Cr; 15% Ni) pot provided with a flange to which is bolted a tightly fitting head. Two tapered joints are attached to the head. Retort-shaped glass bulbs are inserted in the tapered joints and the solid powder reactants are dispensed from these bulbs by rotating them in the joints so that the powder spills over into the reactor. A stirrer, made from $\frac{1}{2}$ inch "Inconel" tube with flat blades of "Monel" welded to the tube, enters the reactor via an asbestos packed bearing. The temperature in the reactor is recorded by means of a thermocouple inserted inside the hollow stirrer shaft. An electrically heated "Calrod" furnace surrounds the pot, the temperature of the furnace being recorded by means of another thermocouple.

Five hundred parts of anhydrous calcium chloride are charged to the reactor and the air in the system is displaced by passing argon, previously gettered over finely divided titanium metal at 800° C., into the reactor, the gas exit being connected to a bubbler. The calcium chloride is melted and the melt brought to 875° C. with good agitation by the mechanical stirrer.

Aliquots of the mixed reactants, consisting of 16 parts colloidal titania powder, 8 parts of commercial calcium carbide (80% $CaC_2$), and 12 parts of calcium, are charged at five-minute intervals to the reactor by manipulating the addition bulb and controlling the rate of addition by observing the heat evolved, as recorded by the stirrer thermocouple. The temperature is maintained in the range of 875 to 925° C. during the reaction, the addition being completed over a period of eighty minutes and a total of 240 parts titanium dioxide, 120 parts commercial calcium carbide, and 180 parts of calcium being added. The melt is kept at 875 to 900° C. with stirring for a further period of one hour. Then, after raising the stirrer from the melt, the salt is allowed to cool to room temperature under argon. The solidified salt cake is broken up and pulverized.

The crushed salt cake is stirred with ice water, glacial acetic acid is added to dissolve the calcium oxide byproduct, and the pH is finally adjusted to 8.0. The insoluble residue is recovered by centrifugation, using a Sharples Super-Centrifuge, and the process of washing to remove soluble salts and calcium oxide, followed by centrifuging, is repeated three times, adding acetic acid to adjust the final pH of each wash to 7.0. The final washings are free from chloride and calcium and the residue, consisting of particulate titanium carbide, is dried in a vacuum oven at 100° C.

X-ray diffraction, using monochromatized CuK$\alpha$ radiation, given a good pattern with $d$ values corresponding to TiC and the line broadening coefficient $K'$ is calculated to be $9.4 \times 10^{-4}$. Nitrogen surface area measurement gives a surface area of 16 m.$^2$/g., corresponding to an average particle size of 75 millimicrons, as calculated by the surface area particle size relationship given earlier.

Emission spectrographic analysis shows the product to contain small amounts of calcium, nickel, iron, chromium and silicon as impurities.

The crystallite atomic extensitiy coefficient of the product as determined from nitrogen surface area measurement is 6.68.

Example 2

This example describes the preparation of particulate silicon carbide, calcium carbide being the carbon-containing reactant and colloidal silica being the silicon-containing reactant, the component elements being released by reduction with calcium metal.

The apparatus used in carrying out the reaction is similar to that described in Example 1.

One thousand parts of anhydrous calcium chloride are charged to the reactor, 120 parts of colloidal silica powder are charged to one of the bulbs, and a mixture, of 120 parts of calcium pellets with 80 parts of commercial calcium carbide (80% $CaC_2$), crushed to pass through a 20 mesh sieve, is charged to the other bulb. The air in the system is displaced by passing argon, previously gettered over finely divided titanium metal at 800° C., into the reactor, the gas exit being connected to a bubbler. The calcium chloride is melted and the melt brought to 900° C. with good agitation by the mechanical sirrer.

By manipulaing the addition bulbs, the reactants are charged to the reactor in small aliquots, alternating the additions and controlling the rate of addition by observing the heat evolved as recorded by a thermocouple in the melt. By this procedure it is possible to keep close to the stoichiometry of the reaction for reduction of the silica and conversion to silicon carbide. The temperature is maintained in the range 900–950° C. throughout the reaction, the addition being completed over a period of one and one-quarter hours, and an argon atmosphere being maintained throughout. The melt is kept at 940–950° C. with stirring for a further period of one and one-half hours, and the stirrer and thermocouple are then raised above the level of the melt, which is allowed to cool to room temperature under argon. The solidified salt cake is then broken up and pulverized.

The crushed salt cake is stirred with a 20% solution of acetic acid in methanol at 0° C. in an argon atmosphere, and centrifuged to recover the insoluble material. After two extractions with methanolic acetic acid and two using methanol, the supernatant is free from chloride.

The residue, consisting of particulate silicon carbide, is dried in a vacuum oven.

X-ray diffraction using monochromatized CuKα radiation shows the product to be mainly β-silicon carbide and K' is calculated as $1.1 \times 10^{-2}$. Nitrogen surface area measurement gives a surface area of 180 m.²/g., corresponding to an average particle size of 10.5 millimicrons as calculated by the surface area particle size relationship given earlier.

Emission spectrographic analysis shows the product to contain less than 0.1% iron, chromium and nickel. Analysis for silicon, carbon, and oxygen is consistent with that of a mixture of 70% silicon carbide and 25% silica.

The crystallite atomic extensity coefficient of the product as determined from X-ray diffraction line broadening coefficient is 4.46.

Example 3

The procedure of Example 2 is repeated, increasing the amounts of silica, calcium, and calcium carbide to 150, 150, and 100 parts by weight, respectively, and maintaining the temperature in the range of 1000 to 1050° C. The product is recovered from the salt cake as described in Example 2.

X-ray diffraction gives a good pattern for β-silicon carbide, and the average value of K', for several lines of the CuKα diffraction pattern, is computed to be $5.2 \times 10^{-3}$. Emission spectrographic analysis shows the product to contain less than 1% iron, chromium and nickel. Analysis for silicon, carbon and oxygen corresponds to a mixture of 92% silicon carbide and 4.5% silica.

The crystallite atomic extensity coefficient of the product as determined from X-ray diffraction line broadening coefficient is 5.44.

Example 4

This example shows the preparation of a silicon carbide by use of magnesium as a reducing agent, and the subsequent preparation of a sol of the case from the aggregated powders obtained by the primary reaction.

Twenty-five hundred grams of calcium chloride are loaded into a carbon crucible equipped with a carbon stirrer. This is heated under argon to a temperature of 1000° C., and 15 increments are added, each increment containing 15 g. of colloidal silica in the form of a dry powder, 13 g. of magnesium turnings, and 1.4 g. of a finely divided 300 m.²/g. surface-area carbon black. The 15 increments are added at four minute intervals, and the melt is quenched immediately after the last addition.

Twenty-five hundred and fifty grams of salt cake are recovered, crushed, and put very cautiously into 8 liters of an ice cold, 3 N hydrochloric acid solution. After the salt, calcium oxide, and magnesium oxide magnesium oxide byproducts are dissolved, the product is washed two times with water and dried in a vacuum oven.

One hundred and eleven grams are recovered, having the following analysis: 67.6% silicon, 22% carbon and 6.5% oxygen. Emission spectrographic analysis shows impurities at the following levels: .2 to 1% calcium, .1 to 1% molybdenum, and .05 to .25% of iron, magnesium, chromium, and nickel, respectively.

In view of the relatively high oxygen content, indicating some unreacted silica, the product is refluxed for one hour with 2 liters of 2 N sodium hydroxide, following which it is washed until the pH of the effluent water is 6; a 66% recovery is obtained.

The material recovered has the following analysis: 67.3% silicon, 27.7% carbon, 1.4% oxygen. Emission spectrograph shows .2 to 1% of impurities of magnesium, calcium, iron, and molybdenum, and .05 to .25% of aluminum, chromium, titanium, nickel, and zirconium.

The nitrogen surface area of this product is 13 m.²/g., which corresponds to about 145 millimicrons as the size of the ultimate particles if they are discrete the line broadening coefficient, K' CuKα radiation is $2.6 \times 10^{-3}$. Electron micrographs show the product to consist of 2 to 10 micron aggregates of much smaller ultimate units having a particle size in the range of 20 to 50 m$\mu$.

The crystallite atomic extensity coefficient of the product as determined from nitrogen surface area measurement is 7.68.

This product is ballmilled in a 5″ outer diameter steel mill of about 2 quart capacity, using 2800 g. of steel balls, ¼″ in diameter, along with 100 g. of the dried silicon carbide product described above, and 255 g. of propanol as a suspending solvent. Milling is continued for 56 hours on rubber lined rolls with the mill turning at a rate of 80 r.p.m. The product is recovered by washing the steel balls on a large mesh screen and is heated in concentrated HCl at 90° C. to remove the iron picked up in the ballmilling operation. The product is washed once with 3 N HCl, and then several times with distilled water until the pH reaches 3.5. At this point it is neutralized with ammonium hydroxide to a pH of 6 and centrifuged through a high speed centrifuge. The weight of the wet cake recovered from the centrifuging operation is 140 g.

On hundred grams of this is suspended in 500 ml. of water and the pH adjusted to 8.5 with ammonium hydroxide. This is whizzed for about 10 minutes in a Waring Blendor and a sol of substantially descrete particles having ultimate units in the size range of 30 millimicrons at a solids concentration of about 9.22% is obtained. The relative viscosity of this sol in comparison with distilled water as a standard, is 2.43 at a pH of 8.2, and 2.08 at a pH of 10.5. Electron micrographs show the particles to be minute, short fibrils with a length to diameter ratio of about 5 to 1.

The crystallite atomic extensity coefficient of the product as determined from electron micrograph measurement is 6.16.

Example 5

This example illustrates the preparation of silicon carbide from sodium silicofluoride. It also illustrates recovery of the product by distillation of salt, as compared with dissolution in water as in previous examples.

Five hundred thirty grams of sodium chloride and 670 g. of potassium chloride are put in an "Inconel" liner and stirrer and the temperature increased to 700° C. Ten increments containing 19 g. of sodium silicofluoride, 10 g. of sodium metal, and 1.3 g. of 300 m.²/g. carbon black, which has previously been fired to 500° C. in argon to free it of oxygen, are added at 5 minutes intervals. The temperature of the reactor is then increased to between 960 and 1000° C. and held at this temperature for one hour. The product is quenched and crushed and 1464 g. of salt cake are recovered.

Five hundred grams of this are slurried with 7 liters of distilled water and washed 3 times with additional distilled water. The product is dried overnight in a vacuum oven at a temperature of 100 to 110° C.

The product obtained has an analysis of 48.7% silicon, 26.4% carbon, and 6.1% oxygen, and is shown by X-ray to comprise β-silicon carbide with a trace of α-silicon carbide present. The nitrogen surface area of this material is about 250 m.²/g., corresponding to a particle size of about 10 millimicrons. The K' CuKα radiation is $2.5 \times 10^{-3}$. The weight of product recovered is 9.3 g.

An additional 500 g. of the same salt cake is heated at 1200° C. in a carbon boat inside an Alundum tube under an argon atmosphere. Heat-up occurs over a period of about 6 hours and is shut off after holding for 1 hour at 1200° C. The product recovered weighs about 9.1 g., corresponding closely to the same recovery obtained above by dissolution in an aqueous solution. The chemical analysis is also very similar, showing 48% silicon, 25.2% carbon, and 8.4% oxygen. The nitrogen surface, however, is considerably lower, being 65 m.²/g. This would correspond to a particle size of about 29 millimicrons. The K' CuKα radiation is $2.1 \times 10^{-3}$. Emission spectrograph shows impurities of 1 to 5% calcium, .5 to 2% iron, nickel, and chromium, .2 to 1% tungsten, magnesium, and potassium.

The crystallite atomic extensity coefficient of the product as determined from electron micrograph measurement is 7.42.

EXAMPLE 6

This example illustrates the preparation of silicon carbide sols from the aggregated dry powder products of the case.

Sixteen hundred and fifty grams of a silicon carbide aggregated dry powder prepared by the procedures of Example 3 are ballmilled in four increments in a one gallon capacity steel ballmill having 9000 g. of ⅜" steel balls and 325 g. of silicon carbide per charge. Enough ethylene glycol is used as a milling fluid to just cover the balls; this requires about 900 g. of ethylene glycol. Ballmilling is preformed at a speed of 33 r.p.m. on rubber-lined rolls for a period of 72 hours with each increment. The increments are combined, washed free from the steel balls, and the ethylene glycol filtered off.

They are then washed several times with water and heated for 1 hour with concentrated HCl. They are then diluted to total volume of 40 to 45 gallons with water and allowed to stand overnight. The silicon carbide has then settled to the bottom of the tank, and 35 to 40 gallons of water are siphoned off. This is repeated and an additional 35 to 40 gallons of water are added, containing 850 g. of citric acid. The citric acid is added in an effort to complex any residual iron not removed by the acid washing. This material is centrifuged to recover the silicon carbide and 6.2 lbs. of wet cake are obtained. It is reslurried in 40 to 45 gallons of water and 10 lbs. of ammonium bicarbonate are added to flock the silicon carbide, which is again recovered by centrifugation. This process is repeated twice more, and the final silicon carbide wet cake is 5.4 lbs., or 2450 grams.

It is then treated with 5 gallons of a 2 N caustic solution and heated for one hour after which the caustic is decanted off. It is brought up to volume in 12 liters of water and milled in a colloid mill after adjusting the pH to 10 by deionizing the slurry with the hydrogen form of an ion exchange resin.

It is found that the product will not peptize satisfactorily at this point. A test is made showing that a considerable amount of iron still remains associated with the product in the form of insoluble ferric hydroxide. It is then reslurried in 6 N HCl and heated for an additional hour on a steam bath. It is recovered and washed by decantation three times, using aqueous ammonium chloride solution to keep the product flocked. It is brought up after the three washes to a total volume of 20 liters, at which point the pH is adjusted to 6 by the addition of ammonium hydroxide. The product is recovered by centrifugation and reslurried in 15 l. of water and deionized to a pH of 10 by using the hydroxyl form of a strong base anion exchange resin, and then deionized back to a pH of 8.5 with the strong acid form of a hydrogen cation exchange resin. This product is put through a high speed centrifuge and the sol which passes through the centrifuge without centrifuging out is retained.

Analysis of the percent solids shows this sol to contain 3.56% silicon carbide and the total yield of sol is about 16,000 grams.

Chemical analysis shows the following (percent): silicon, 52.4, carbon, 26.4, oxygen, 4.9, and the nitrogen surface area is 174 m.²/g. This corresponds to a particle size of about 10.5 millimicrons. A sample of dry powder recovered from this sol is analyzed by X-ray, giving a line broadening coefficient, K' CuKα radiation of $5.4 \times 10^{-3}$. Chemical analysis shows this powder to contain the following impurities: 0.47% calcium oxide, 0.76% alumina, 0.03% nickel oxide, 0.24% ferric oxide, and 0.03% chromic oxide.

The sol density of 26.3° C. is 1.0196 grams per cubic centimer, and from this, assuming additivity of the densities of the silicon carbide and the water, we get a density of the solids of 2.93 g./cc. This corresponds very closely to the density which would be expected from a sol of the particle size indicated above, which has a monolayer of SiOH groups attached to its surface.

The pH of this sol is 9.32, and its specific conductivity is 9200 ohms per cubic centimeter at this pH.

The following table indicates the viscosity characteristics of this sol as a function of pH.

| pH: | Relative viscosity of 3.56% Silicon carbide sol |
|---|---|
| 3.2 | 4.18 |
| 7.6 | 1.55 |
| 8.5 | 1.32 |
| 10.5 | 1.15 |

It should be noted that this sol will flock very rapidly in a period of about 30 seconds by the addition of 10 N sodium chloride. It can also be flocked without added salt by decreasing the pH to 7, in which case a relatively slow flocculation takes place, or it can be flocked much more rapidly by dropping the pH to 3.2 with acid.

The crystallite atomic extensity coefficient of the product as determined from X-ray diffraction line broadening coefficient is 5.40.

EXAMPLE 7

This example describes the preparation of a silicon carbide sol from an aggregated powder of the case. Six hundred twenty grams of a silicon carbide powder produced as described in Example 3, are ballmilled in one gallon ballmill containing 40% of its volume filled with ⅛" steel balls and 1.5 quarts of ethylene glycol as a suspending fluid.

The product is recovered by centrifuging and is suspended in 6 N HCl and boiled for one hour. It is allowed to settle, the supernatant decanted off and washed with a volume of 6 N HCl equal to five times the settled volume of the SiC solids. It is settled, decanted, and washed by settling and decantation with five times its settled volume (about 3 gallons) containing about a pound of ammonium chloride to keep the silicon carbide flocculated. After two washings by decantation, the product is reslurried in water and enough caustic added to give a 5% caustic concentration. This is boiled for one hour, and the caustic removed by decantation.

After reslurrying, one mole of technical grade "Versene" (tetrasodium salt of ethylenediamine tetrasacetic acid) is added and the solution allowed to stand overnight. It is permitted to settle and decanted and washed twice with five times its settled volume of water containing a pound of ammonium bicarbonate.

It is then centrifuged and gives 900 g. of wet cake. It is made up to a pH of 10 with ammonium hydroxide and milled 1 hour in an Eppenbach colloid mill. After milling, the specific resistivity is 750 ohms.

It is deionized with 2 lbs. of a strong base anion exchange resin (hydroxyl form), filtered through glass wool, and deionized from a pH of 10.4 to a pH of 8 with the hydrogen form of a strong acid cation exchange resin. It is then filtered through glass wool to separate it from the resin and readjusted to a pH of 10 with ammonium hydroxide. Its specific resistivity after this treatment is 5000 ohms.

This sol is put through a Sharples high speed centrifuge and gives 8400 g. of a 1.64% solids sol having a density at 25.2° C. of 1.000 g./cc.

The chemical analysis of this sol shows the solids, after vacuum drying, to consist of 50% silicon, 30% carbon, and 4.2% oxygen.

The powder has a nitrogen surface area of 74 m.$^2$/g. X-ray analysis shows $\beta$-silicon carbide, and a K' CuK$\alpha$ radiation equal to $4.6 \times 10^{-3}$.

Emission spectrographic analysis shows impurities to comprise .1 to 1% calcium oxide, .1 to .5% magnesium oxide, and .05 to .25% zirconium. No other impurities are shown in the emission spectrographic analysis. The considerably higher level of purity of this sol compared with that of Example 37, shows the utility of the extra "Versene" purification step in giving a purer sol product.

The crystallite atomic extensity coefficient of the product as determined from nitrogen surface area measurement is 5.36.

EXAMPLE 8

Using the procedure of Example 2, 450 parts by weight of colloidal tungstic oxide is reacted with 80 parts of calcium carbide (80% CaC$_2$) and 200 parts of calcium, the reactants being added to 1000 parts of molten calcium chloride at 1000 to 1040° C., over a period of three hours.

The product is recovered by methanolic acetic extraction until free from chloride and dried.

The resulting grey powder gives a good X-ray diffraction pattern for tungsten carbide, with K $$CuK\alpha = 3.4 \times 10^{-3}$$

Analysis gives 92% tungsten carbide and an oxygen content of 1.6%.

The crystallite atomic extensity coefficient of the product as determined from X-ray diffraction line broadening coefficient is 5.99.

EXAMPLE 9

This exemplifies the preparation of a sol of tungsten carbide from a colloidal tungsten carbide powder made in the manner described in Example 8, containing 92.3% tungsten, 6.1% carbon and 0.6% oxygen by weight, corresponding to about 98% tungsten carbide. The specific surface area is 4.9 square meters per gram and the average crystallite size from broadening of X-ray lines is 30 millimicrons. One thousand grams of this tungsten carbide powder and 100 grams of sodium chloride are placed in a 1 gal. steel ballmill half full of ½" balls and rotated at 32 r.p.m. for 16 hours. The powder which is caked on the walls is broken up and mixed with 100 grams of additional sodium chloride and again milled for 3 hours. The cake on the walls is again broken up and 500 grams of normal propyl alcohol is added to the mill which is run for 3 hours. The contents of the mill are washed out with water and diluted to a volume of 8 liters and permitted to stand while the tungsten carbide settles for a period of 10 days. The tungsten carbide is washed by decantation by repeatedly pouring off the clear supernatant liquid and resuspending the sediment in distilled water, until the supernatant liquid after settling has a specific resitivity of 45,000 ohm. cm., and a pH of about 6. The clear supernatant liquid is decanted and to the black tungsten carbide paste is added 400 ml. of water and 300 grams of 48% hydrofluoric acid, the mixture being kept in a plastic container, in which it is stirred and then permitted to stand for 16 hours. The tungsten carbide is again washed by decantation with water until the supernatant liquid has a resistivity of 12,000 ohms. cm. and pH of 3.7.

The aqueous mixture is then made alkaline by the addition of a 10% by weight aqueous solution of tertramethylammonium hydroxide to give a pH of 11.5 and the mixture is stirred for 15 minutes, diluted to a volume of 8 liters in a depth of 10 inches, and then permitted to settle for one day. The black supernatant aqueous sol is decanted from the sludge and the sludge is again diluted to 8 liters with distilled water and readjusted to a pH of 11.5 and permitted to settle for one day. The supernatant black sol is decanted and mixed with the first sol. The sludge is for a third time diluted to volume of 8 liters with water and well stirred after adjusting the pH to 11.5, again permitted to settle for 24 hours, and the supernatant liquid combined with the previous ones.

The non-dispersed, aggregated, colloidal tungsten carbide in the sludge is saved for other use; the specific surface area is 2.9 m.$^2$/g., and the crystallite size by X-ray line broadening is 35 millimicrons, the carbon content is 6.5% and oxygen content 0.28% by weight.

The combined sol is adjusted to a pH of 7 by the addition of acetic acid and 5% by weight of ammonium bicarbonate is added to promote flocculation and settling. The supernatant liquid is discarded and the precipitated colloid is washed by decantation and settling and the concentrated precipitate diluted with water to a total weight of 1000 grams, which contains 467 grams of colloidal tungsten carbide. The pH of this mixture is 8.6, and the specific resistivity is 920 ohm cm. The pH is raised to 11 by the addition of 30 mls. of 0.4 molar tetramethylammonium hydroxide solution to peptize the colloidal tungsten carbide to a sol.

A sample of this tungsten carbide aqueous sol is dried in a vacuum oven and gives a powder having the following characteristics: The specific surface area is 6.1 m.$^2$/g., the crystallite size, determined by the broadening of the X-ray lines is 30 millimicrons. The powder contains 6.8% carbon and 0.8% oxygen by weight. A sample of the powder, after being Spex milled, gives a cold pressed density of 9.0 g./cc., or 57.5% of theoretical. The sol was employed in making heteromorphous bodies of this invention.

The crystallite atomic extensity coefficient of the product as determined from nitrogen surface area measurement is 5.92.

EXAMPLE 10

This example illustrates the preparation of a 7 volume percent carbon-93 volume percent silicon carbide composition as a powder of the invention and its fabrication by hot pressing into a dense, submicrograined, heteromorphous body of the invention. Fifteen parts by weight of carbon obtained by drying the carbon sol characterized and described in Example 12 at 70° C. in a vacuum oven are mixed with 300 parts by weight of the silicon carbide powder of Example 2.

The vacuum dried, colloidal bocasi powders in the amounts designated above are mixed in a one pint tungsten carbide-lined steel ballmill, which contains sufficient ¼" diameter tungsten carbide balls to fill half the volume. The mixed powders to be homogenized are added in an amount just sufficient to fill the spaces between the balls. The mill is filled with argon and closed, and rotated at 80 r.p.m. After 3 hours, the mill is emptied and the material that is caked on the walls is broken off and crushed to pass a 30 mesh screen and placed again in the mill. Milling is continued for a minimum of 24 hours. The mill is opened in an atmosphere of argon. This milling operation is repeated many times to obtain the amount of solids desired for further fabrication.

The above disaggregated powder is loaded into a carbon mold, 1" in diameter, equipped with carbon rams. The mold is placed within the center of a graphite susceptor which, in turn, is enclosed within water-cooled copper coils which are connected to a high frequency induction generator of 50 kilowatts capacity. The whole mold assembly, pusher rods of carbon, and induction coils are surrounded by a thin steel shell which is also water cooled, about 3 feet in diameter, which is equipped to be evacuated with a high speed vacuum pump. This shell also has connections for introducing various types of inert gases such as argon or helium, when such atmospheres are desired. Inserted through the shell and entering the shell through a vacuum tight seal are metal extensions connected to the carbon pusher rods, which are in turn connected to a high pressure hydraulic press.

After loading the powder into the carbon mold, and evacuating the steel shell, the induction furnace is turned on and the temperature of the carbon susceptor increased at a rate of about 100° C. per minute until 2300° C. is achieved. Four thousand p.s.i. pressure is then applied through the pusher rods in the carbon mold and the powder is compressed to density. The sample is held under pressure for thirty minutes after movement of the rams indicates the thickness of the sample is being reduced at a rate of less than 0.4% per minute. The furnace is turned off, and the sample cooled back to room temperature.

The resulting 85% dense body is shown by X-ray electron micrographic, and metallographic characterization to consist of juxtaposed units of 300 to 500 millimicron alpha and beta silicon carbide maintained out of a uniform contiguous relationship to one another by 80 to 100 millimicron units of carbon, which are, however, clustered or concentrated in areas as large as 200 millimicrons in diameter.

The transverse rupture strength of this composition is 44,000 p.s.i., its Knoop hardness under a 1000 g. load is 1400, and its impact strength is 5 ft. lbs./sq. in.

EXAMPLE 11

This is an example of a homogeneously blended powder of disaggregated tungsten carbide and disaggregated colloidal silicon carbide made by blending sols of the corresponding material, forming them into a coprecipitate and drying, and of a hot pressed heteromorphous, dense, submicrograined body made from the powder, the body consisting of juxtaposed units of tungsten carbide maintained out of uniform contiguity by an interspersant of silicon carbide.

The components to be mixed

Solution A is an aqueous colloidal solution of the disaggregated bocasi, which is to provide the major-volume component of juxtaposed units in the hot pressed body. In this example, Sol A is the sol of disaggregated tungsten carbide of Example 9. The sol is adjusted to a concentration of 43 grams of tungsten carbide per 100 mls.

Solution B is an aqueous colloidal solution of the component which is to provide the interspersant in the hot pressed body. In this example, Sol B is a colloidal dispersion of silicon carbide made by diluting the sol of Example 6 with water to a concentration of 0.455 grams of SIC per 100 mls.

Solution C is an aqueous solution containing 18 grams of ammonium bicarbonate per 100 milliliters.

Method of mixing sols and isolating blended powder

One gallon each of solutions A, B, and C are added at equal and uniform rates into a zone of intensive mixing as follows: A stainless steel reaction vessel of four gallons capacity is fitted with a circulating pump withdrawing liquid from the conical bottom of the reaction vessel and returning it to the top. The capacity of the circulating pump is five gallons per minute.

Into the pipe returning from the pump to the tank there are inserted three injection nipples or orifices about 0.1 inch in diameter in order to introduce streams of liquids into the turbulent center of the circulating stream. Solutions A, B and C are placed in three separate feed tanks connected through feed pumps, control valves and flow meters with the injection orifices.

The mixing operation is started by placing in the reaction vessel 0.5 gallons water to fill the recirculating line and pump. The water is recirculated and simultaneously equal volumes of solutions A, B, and C are fed simultaneously into the recirculating stream, at a uniform feed rate of 0.1 gallons per minute; the addition requires 10 minutes.

The reaction mixture is then centrifuged to remove the colloidal solids from suspension. The centrifuged cake is placed in a vacuum oven swept with nitrogen, and dried at a vacuum corresponding to 29 inches of mercury. The oven is then filled with nitrogen and permitted to cool to room temperature before it is opened.

The dried cake is micropulverized in an impact mill and the powder is passed through a screen of 60 meshes per inch.

Densification

The powder in 25 gram lots is then further densified by Spex-milling in a tungsten carbide-lined mill with two ¼" diameter tungsten carbide balls, for 15 minutes.

Characteristics of the blended powder

The powder contains 99% by weight of tungsten carbide and 1% by weight of silicon carbide. The cold pressed density is 9.0 g. per cubic centimeter.

Hot pressing

For hot pressing, sufficient powder is used to give a dense body about 1 inch daimeter and one-quarter of an inch in thickness. In the present instance, this requires 50 grams of powder. The powder is placed in a layer of even depth in a cylindrical cavity, the lower end of which is closed by the insertion of a graphite plunger. The interior of the cavity was previously coated with a film of colloidal graphite. An upper plunger is inserted and pressed down under a load of 25 lbs. to remove excess air.

The mold is placed in the induction furnace of a vacuum hot press as described in Example 10.

Initial pressure applied is 50 lbs./sq. inch. The temperature of the mold is increased from 30° C. to 1800° C. in 8 minutes. The pressure is then at once increased to 4000 p.s.i. and the temperature of the mold further raised from 1800° C. to 1900° C. in 1 minute. The power is at once shut off and the pressure released and the mold cooled from 1900° to 1500° C. in 4 minutes, and cooling continued over a period of 45 minutes to 400° C. The mold is then removed from the furnace and the molded body removed.

The molded body

The molded material is a dense heteromorphous body consisting of juxtaposed units of tungsten carbide of average grain size of 500 millimicrons maintained out of uniform contiguity by interposed units of beta silicon carbide which, in electron micrographs, appear to be about 50 millimicrons in average diameter.

The body is 95% by volume tungsten carbide and 5% by volume beta silicon carbide.

The density is 15.0 grams per cc., or 99.2% of theoretical density.

The transverse rupture strength is 195,000 p.s.i.
The impact strength is 20 ft. lbs./per square inch.
The hardness is 2500 Knoop, using a 100 gram load.

In another experiment, the powder used above is pressed initially at 4000 p.s.i. while the temperature is increased from 1000° to 2050° C. in 5 minutes, held at this temperature for 5 minutes, then cooled.

The density of the body is 14.01 grams per cc., or 92.8% of theoretical. Tungsten carbide grains as large as 10 microns in diameter are observed in micrographs of polished and etched sections. The transverse rupture strength is 143,000 p.s.i. and the impact strength is 5 ft.

lbs./sq. inch. An expansion of the body noted at 2000° C. indicates recrystallization due to overheating, with consequent development of some porosity.

In another experiment the same powder is pressed as just described, but the sample is held for 30 minutes at 2000° C. before cooling and releasing the pressure. The grain size of the tungsten carbide is over 10, but less than 100 microns. Density is 93% of theoretical, and the transverse rupture strength is 118,000 p.s.i.

Other identical hot pressing conditions, a tungsten carbide powder made by the same process and converted to powder in the same way except that no colloidal silicon carbide is added as interspersant, gives a recrystalized body with a grain size of over 100 microns, with a density of 94.5% of theoretical and a transverse bending strength of 86,000 p.s.i. Thus even under unfavorable pressing conditions, the presence of silicon carbide as an interspersant minimizes grain growth and improves strength of the tungsten carbide.

EXAMPLE 12

This example illustrates the preparation of a 30 volume percent boron carbide-70 volume percent silicon carbide composite powder, its deoxidation prior to heating, and the effect of the pressing temperatures used in the hot pressing operation on the density and mechanical properties of the final hot pressed bodies. It also illustrates the effect of adding small amounts of low melting metals as bonding agents on the density and mechanical properties.

A sol of Example 4 is diluted to give a concentration of 9.7 cc. of silicon carbide solids per liter. A sol of colloidal carbon is obtained from the Columbia Carbon Co. and is designated by them by the code M 2165-A, and consisting of a 23% by weight dispersion of colloidal carbon in an aqueous solution. It has the following chemical analysis and characterization as determined by evaporation of the water and analysis of the solids: 79.9% carbon, 12.2% oxygen and 7.15% volatile constituents other than oxygen. On heating the dried powder to 1000° under an argon atmosphere, it loses 28.55% of its weight. Its nitrogen surface area is 395 m.²/g. Electron micrographs show it consists of 250 millimicron to 1 micron aggregates comprising clusters of spherical, approximately 10 millimicron, ultimate units. This sol is diluted to a concentration of 0.35 cc. per liter.

These two sols are simultaneously mixed and flocculated with ammonium carbonate as described in Example 11. Prior to the recovery of the powder, however, they are washed thoroughly, first with isopropyl alcohol, then with acetone, and finally with benzene. The objective of the successive washings with increasingly less polar solvents is to minimize the effect of the surface tension of the trapped liquid causing aggregation and densification of the powder during drying. The powder is then vacuum dried at 70° C. overnight.

This powder is ballmilled under "Nujol" (a low vapor pressure, high molecular weight hydrocarbon oil) in a rubber lined mill, using tungsten carbide balls, the balls occupying 40% by volume of the one quart, 5" outer diameter mill, for 24 hours with 18% by weight of commercially available amorphous boron metal powder added, based on the weight of the mixed powder of silicon carbide and carbon. Sufficient "Nujol" is used to cover the tungsten carbide balls.

The resulting boron-carbon-silicon carbide powder is recovered, washed with benzene, and vacuum dried overnight at 70° C. Its chemical composition of the powder at this stage is shown by analysis to be: 34.6% silicon, 32.6% carbon, 16.6% boron, and 5.3% oxygen, with the remainder being mostly volatile hydrocarbon liquids still associated with the powder.

This powder is loaded into an alundum tube furnace equipped with a vacuum tight alundum tube and heated overnight at a temperature of 1500° C. under vacuum. Following this treatment the chemical composition and characterization of the powder is: 43.8% silicon, 28.4% carbon, 18.13% boron, and 1.6% oxygen. X-ray characterization shows silicon carbide as the only identifiable crystalline material. From X-ray line broadening considerations, the particle size of the silicon carbide appears to be about 53 millimicrons. This is quite close to the particle size indicated by the nitrogen surface area of 30 m.²/g.

Approximately 5 g. samples of this powder are hot pressed, using the equipment and procedures of Example 10, at temperatures of 1700, 1800, 1900, 2000, and 2300° C. The holding time in all cases is 30 minutes after slumping ceases, and the pressure is 4000 p.s.i. The following table shows the percentage of theoretical density, the room temperature transverse rupture strength (and in one instance the transverse rupture strength at 1200° C.), the impact strength, the Knoop hardness under a 1000 g. load, and the results of characterization by X-rays.

It will be noted that theoretical density is achieved on pressing at temperatures greater than 2000° C., and, in fact, fairly close approaches to theoretical density are possible even at pressing temperatures as low as 1800° C. As indicated in the table, although X-ray characterization shows that the particle size of the boron carbide phase is quite small (as shown by line broadening), the line intensities are too weak to be used to calculate their exact particle size.

Electron micrographic and metallographic examination are in substantial accord with the results suggested by the X-ray characterization in showing dense, extremely fine grained silicon carbide bodies consisting of juxtaposed

| Pressing Conditions | Percent Theoretical Density | Room Temp. T.R. Strength | T.R. at 1,200° C. | Impact Strength | Knoop Hardness | X-ray Characterization |
|---|---|---|---|---|---|---|
| 1,700° C., 4,000 p.s.i., 30 min. hold | 71 | 16,306 | | 0.22 | | |
| 1,800° C | 86.5 | 32,618 | | 1.4 | | |
| 1,900° C | 92.7 | 55,223 | | | | |
| 2,000° C | 98.0 | 62,673 | | | | |
| 2,000° C | | | 57,900 | | | |
| 2,000° C | 98.0 | 69,043 | | 1.5 | 1,642 | 276 mµ β-SiC, moderate α-SiC, small particle size B₄C. |
| 2,000° C | 98.5 | 68,728 | | 2.2 | 1,413 | 268 mµ β-SiC, weak α-SiC, small particle size B₄C. |
| 2,300° C | 98.0 | 72,314 | | 1.7 | 1,858 | 370 mµ β-SiC, weak α-SiC, small particle size B₄C. | units of silicon carbide approximating 300 millimicrons in size, maintained out of a uniform contiguous relationship to one another by approximately 100 to 200 millimicron sized particles of boron carbide.

Ten percent based on the weight of the boron carbide-silicon carbide composite powder obtained from the heating step are blended and milled as described in Example 10 with a fine iron and a fine aluminum powder, and these samples are pressed at 2000° C., 4000 p.s.i., and a 30 minute hold after slumping ceases, using the procedure and equipment described in Example 10.

The composition containing 10% iron shows a percentage of theoretical density of 97.7%, and a room temperature transverse rupture strength of 84,218 p.s.i. That containing aluminum powder shows 91.3% theoretical density and a transverse rupture strength of 58,930 p.s.i. at room temperature.

X-ray, electron micrographic and metallographic examination show these to be dense, hetermorphous bodies consisting of juxtaposed units of silicon carbide surrounded at the grain boundaries by a continuous phase consisting of metal bonded boron carbide particles. The boron carbide particles are about 100 millimicrons in average diameter.

EXAMPLE 13

This example shows the preparation of a sol of titanium carbide.

The dry product of Example 1 is ballmilled in a 1 qt. ballmill, using 50 g. of the powder, 2000 g. of ⅛" steel balls and 300 cc. of water as a suspending liquid. Ballmilling is continued for 64 hours at a speed of rotation for the 5" diameter mill of 80 r.p.m. The product is washed free from the steel balls and boiled for 1 hour at 6 N HCl to dissolve the iron picked up during the ballmilling operation. It is then washed by decantation three times until the pH increases to 6.

Following the acid treatment and washing the wet cake is recovered by centrifugation, resuspending in a liter of distilled water and treated with anion and cation exchange resins by putting it through a column of such resins. The pH is then adjusted to 3.5 by the addition of a small amount of HCl, and the resulting 5% sol of titanium carbide shows a specific resistivity of greater than 15,000 ohms, and is composed of substantially discrete, spherical particles, about 75 millimicrons in diameter. The percent solids in the dispersed phase determined from viscosity measurements is 85%.

The crystallite atomic extensity coefficient of the product as determined from electron micrograph measurement is 7.38.

EXAMPLE 14

The following example of a heteromorphous body of the invention consisting of 96.2% titanium carbide and 3.8% silicon carbide by weight, in which the silicon carbide is the interspersant, is prepared by blending sols of these two bocasis.

Solution A is prepared by adjusting the concentration of the titanium carbide sol of Example 13 to 15 grams of solids per 100 mls.

Solution B is prepared by diluting the silicon carbide sol of Example 6 with water to a concentration of 0.60 grams of silicon carbide per 100 mls.

Solution C in water contains 18 g. of ammonium bicarbonate per 100 mls.

Solutions A, B, and C are mixed and the resulting blended bocasi powder isolated is in Example 11. The micropulverized powder is hot pressed without intermediate densification, following the method described in Example 11.

The molded body has a density of 2.65 g./cc., corresponding to 91% of theoretical density. The grain size of the tungsten carbide juxtaposed units ranges from 200 to 800 millimicrons, and these are maintained out of uniform contiguity by interposition of 100 millimicron particles of silicon carbide located mostly at the grain boundaries.

EXAMPLE 15

This example illustrates the preparation of oxide-containing, particulate titanium boride according to a process of the invention. The reactor used was that described in Example 1, above.

A mixture of 1000 parts by weight of lithium chloride and 360 parts by weight of titanium dichloride is charged to the reactor and the air is displaced by passing argon, previously gettered over finely divided titanium metal at 800° C., into the reactor. The salts are melted and the melt brought to 650° C. with good agitation by stirring. Sodium and sodium borohydride are continuously charged to the melt at the rates of 1 part and 1.6 parts, respectively, per minute for 70 minutes, the temperature being maintained in the range of 650 to 670° C. When addition of the reactants is complete, the melt is stirred for a further period of 30 minutes at 640 to 660° C. The exit gases, argon and hydrogen, carry over a fine black powder which is removed in ethylene glycol scrubbers.

After completing the reaction step, the stirrer and thermocouple are raised above the level of the melt, which is then allowed to cool to room temperature, an inert atmosphere being maintained by passing argon into the top of the reactor. The solidified salt cake thus formed is broken up and pulverized.

The crushed salt cake is slurried with ethylene glycol in an argon atmosphere, and centrifuged to recover the insoluble material. After four extractions, the ethylene glycol supernatant is free from chloride and the residue is washed with anhydrous ether.

The particulate titanium boride is dried in a vacuum oven, the partial pressure of oxygen present being sufficient only to give the degree of product oxidation indicated below.

X-ray diffraction shows the product to be mainly titanium boride, $TiB_2$, with $K'$ $CuK\alpha=2.1\times10^{-3}$. Nitrogen surface area measurement gives an average particle size of 30 millimicrons as calculated by the surface area particle size relationship given earlier.

Emission spectrographic analysis shows the product to contain less than 1.0% of metallic impurities and these are mainly iron, chromium and nickel, which are the constituents of "Inconel" alloy. The oxygen found in the product is 1.5%, corresponding to a titanium dioxide content of 3.8%.

The black suspension obtained from the glycol scrubbers is centrifuged and the residue washed with ethylene glycol until chloride is no longer detected in the extract solvent. The final product is washed with anhydrous ether and dried. It is found to be mainly titanium boride with a titanium oxide content of 5.4%. The recovery of product from this source amounts to 10% of the total yield of titanium boride.

The centrifuge supernatant from the glycol scrubber product contains 0.8% suspended titanium boride in the form of a stable black sol. This sol is vacuum-evaporated to a solids content of 11.5% and the average particle size of dispersed titanium boride is estimated from electron micrographs to be about 20 millimicrons. The dispersed particles are in the form of dense, essentially spherical and largely unaggregated particles.

Sixty grams of the powder recovered from the vacuum drying step are suspended in 300 cc. of distilled water and placed in a rubber lined ballmill of one quart capacity and having an outside diameter of five inches. Sufficient cylindrical quarter inch pellets of tungsten carbide are placed in the mill to fill 40% of its volume. The slurry of powder and water is then placed in the mill and the mill rotated on rubber lined rolls for a period of 64 hours. The slurry is washed free of the tungsten carbide balls and brought up to a total volume of one liter. It is then deionized by putting it through a column consisting of the hydroxyl form of a strong base anion exchange resin and the hydrogen form of a strong acid cation exchange resin.

The deionized suspension is adjusted to a pH of 3 with acetic acid and forms a stable 5% sol having a specific resistivity of about 10,000 ohms, and comprising essentially non-aggregated spherical particles having an average particle diameter of 20 to 30 millimicrons. The percent solids in the dispersed phase as determined from viscosity measurements is about 90%.

The crystallite atomic extensity coefficient of the product as determined from nitrogen surface area measurement is 6.09.

EXAMPLE 16

This example refers to the preparation of a disaggregated powdered bocasi mixture of the invention containing 90 volume percent silicon carbide and ten volume percent of zirconium silicide, and its fabrication by hot pressing into a dense, heteromorphous submicrograined body of the invention.

A silicon carbide sol prepared as in Example 4 is diluted to a concentration of 3.22 weight percent, or a volume concentration of 10 cc. of silicon carbide per liter. Zirconium silicide is prepared by the procedure of Example 1 using zirconia and silica and a zirconium silicide sol is prepared by the procedure of Example 6 which is diluted until its concentration is .1 cc./liter. Four liters of each of these sols, along with four liters of ammonium bicarbonate prepared as described in Example 11, are simultaneously mixed and coflocculated using the equipment and procedure of Example 11. The disaggregated, intimately mixed, composite bocasi powder is recovered also as shown in Example 11.

Ten grams of this mixture are hot pressed at a temperature of 2000° C., a pressure of 4000 p.s.i., and a holding time of 5 minutes after slumping has ceased, using the equipment and procedure described in Example 10.

The resulting body shows a percentage of theoretical density of 92%, and X-ray metallographic, and electron micrographic characterization show it to consist of juxtaposed units of silicon carbide of both the alpha and beta crystallographic form, having a crystallite diameter of 300 millimicrons, maintained out of a uniform contiguous relationship with one another by 150 millimicron crystals of zirconium silicide. There is also evidence in the microstructure and according to X-ray analysis for the existence of some zirconium carbide as a finely dispersed phase having a crystallite size of about 50 millimicrons.

EXAMPLE 17

This illustrates the preparation of one of the disaggregated composite powders of the invention consisting of 95 volume percent silicon carbide and 5 volume percent titanium silicide, and its fabrication into a dense, solid, heteromorphous, submicron grained body by hot pressing.

Four liters of a silicon carbide sol containing 9.5 cc. of silicon carbide solids per liter are prepared as described in Example 11. Titanium silicide is prepared by the procedure of Example 1 using titanium oxide and silica and four liters of titanium silicide sol are prepared by the procedure of Example 6 which is diluted to a concentration of 0.5 cc. of titanium silicide solids per liter.

These are mixed, coflocculated and recovered as described in Example 11.

Twenty grams of the recovered powders are hot pressed using the procedures and equipment of Example 10, and the time, temperature, and pressing conditions of Example 16.

The resulting dense body has a percentage of theoretical density of 95%, and is shown by X-ray, metallographic, and electron micrographic examination to consist of juxtaposed units of silicon carbide having an average crystallite size of 3 to 400 millimicrons maintained out of uniform contiguous relationship by 200 millimicron crystals of titanium silicide. There is some evidence for the existence of small amounts of titanium carbide in the microstructure.

EXAMPLE 18

This illustrates the preparation of a composite bocasi powder of the invention, consisting of 80 volume percent silicon carbide and 20 volume percent chromium boride and its fabrication into a dense, heteromorphous, submicron grained body of the invention. Four liters of a silicon carbide sol containing 8 cc. of silicon carbide solids per liter is prepared from the sol of Example 4 by the dilution as described in Example 16. Chromium boride is prepared by the procedure of Example 2 using chromic oxide and boron and a chromium boride sol is prepared by the procedure of Example 6 and is similarly diluted to give 2 cc. per liter as a volume concentration of chromium boride. These are simultaneously mixed and coflocculated with the ammonium carbonate solution and by means of the procedure described in Example 11. Recovery of the powder is effected by the method of Example 11.

Twenty grams of this powder are hot pressed using the equipment and procedure of Example 10, at a temperature of 1800° C., a pressure of 4000 p.s.i., and a holding time of 5 minutes at the top pressing temperature.

The resulting heteromorphous, submicron grained body has a percentage of theoretical density of 100%, and is shown by X-ray characterization, coupled with electron micrographic and metallographic examination to consist of juxtaposed units of silicon carbide about 500 millimicrons in diameter maintained out of a uniform contiguous relationship with one another by crystallites of chromium boride averaging 300 millimicrons in diameter.

EXAMPLE 19

This illustrates the preparation of a composite bocasi powder of the invention containing 70 volume percent silicon carbide and 30 volume percent zirconium boride, and its fabrication into a dense, heteromorphous, submicrograined body of the invention.

A sol of silicon carbide containing 7 cc. of silicon carbide per liter is prepared by dilution of the sol of Example 4. Zirconium boride is prepared by the procedure of Example 2 using zirconia and boron and a sol of zirconium boride is prepared by the procedure of Example 6 and is diluted to a concentration of 3 cc. of zirconium boride per liter. Four liters each of these are mixed and coflocculated by ammonium carbonate, as described in Example 11, and are recovered as described in this example.

Twenty grams of this powder are hot pressed using the procedure and equipment of Example 10, at a temperature of 2000° C. and a pressure of 4000 p.s.i., with a holding time of 5 minutes.

The resulting dense, heteromorphous, submicrograined body has a density of 96% of theoretical, and is shown by electron micrographic, X-ray, and metallographic examination to consist of juxtaposed units of 500 millimicron crystals of silicon carbide maintained out of a uniform contiguous relationship with one another by 200 millimicron crystals of zirconium diboride.

EXAMPLE 20

This illustrates the preparation of a mixed bocasi disaggregated powder of the invention containing 60 volume percent silicon carbide and 40 volume percent titanium boride. Four liters of a solution containing 6 cc. of silicon carbide solids per liter is prepared by dilution of the sol of Example 4 (as described in Example 16). Four liters of a titanium boride sol containing 4 cc. per liter is prepared by dilution of the sol of Example 15, and these are mixed and coflocculated as described in Example 11.

Twenty grams of the resulting composite powder is hot pressed, using the equipment and procedure of Example 10, at a temperature of 2000° C., 4000 p.s.i. pressure and a holding time of 15 minutes after slumping of the sample has ceased.

The resulting body has a density of 97% of theoretical, and is shown by X-ray, metallographic and electron micrographic examination to consist of crystallites of silicon carbide as the juxtaposed units having an average diameter of approximately 100 millimicrons, maintained out of a uniform contiguous relationship with one another by crystallites of titanium boride having about the same average diameter.

EXAMPLE 21

This will illustrate the preparation of a composite powder containing 85 volume percent silicon carbide and 15 volume percent chromium carbide and its fabrication into a dense, heteromorphous, submicrograined body of the invention by hot pressing. The sol of silicon carbide containing 8.5 cc. of silicon carbide solids per liter is prepared from the sol of Example 4 as described in Example 16. Chromium carbide is prepared by the procedure of Example 2 using chromic oxide in place of silica and a sol of chromium carbide is prepared by the procedure of Example 6 and is diluted to a concentration of 1.5 cc. of chromium carbide per liter. These are coflocculated and mixed simultaneously by addition with ammonium carbonate, as described in Example 11. Recovery of the powder is also effected as described in Example 11.

Twenty grams of the resulting powder are hot pressed at a temperature of 1700° C., a pressure of 5000 p.s.i., with a holding time of 5 minutes.

The resulting body is 99% of theoretical density, and is shown by X-ray, electron micrographic, and metallographic analysis to consist of juxtaposed units of 300 millimicron silicon carbide particles maintained out of a uniform contiguous relationship with one another by interposed crystals of chromium carbide situated at the grain boundaries. The chromium carbide crystals are somewhat elongated in structure, but have an average crystallite dimension of about 150 to 300 millimicrons.

EXAMPLE 22

Using the procedure of Example 2, 140 parts by weight of colloidal silica powder are reacted with 235 parts of calcium molybdate and 330 parts of calcium in a melt consisting of 1000 parts of calcium chloride at 880 to 900° C. over a period of 2½ hours. The melt is stirred for a further ½ hour at 880 to 900° C. The product is recovered by aqueous extraction, as described in Example 4, using acetic acid instead of hydrochloric acid.

One hundred parts by weight of the dry powder are refluxed for 1 hour with 2000 parts of 1 normal sodium hydroxide, filtered, and washed free from alkali. The residue is dried in a vacuum oven at 80 to 90° C.

The product analyzes at 91% $MoSi_2$ with an oxygen content of 3.5%. Emission spectrographic analysis shows less than 1% calcium and less than 2% iron, chromium and nickel to be present in the product. X-ray diffraction gives a good pattern for $MoSi_2$, and K′

$$CuK\alpha = 8.6 \times 10^{-4}$$

The nitrogen surface area is 10 m.²/g., which corresponds to an average particle size of 80 m$\mu$.

The final aqueous wash contains 0.5% product in the form of a stable dispersion, and this is concentrated to 11% solids by vacuum evaporation. The particle size is 80 to 130 m$\mu$ by electron micrograph, and the percent solids in the dispersed phase is found to be 70%. A sample of the dried down solid gives a good X-ray pattern for molybdenum disilicide.

Fifty grams of the vacuum dried solids obtained after alkali treatment and drying, are dispersed in 300 cc. of water and this is milled in a rubber lined mill using tungsten carbide balls as previously described in Example 15. The resulting slurry after separation of the tungsten carbide balls is deionized, also as described in Example 15, and the pH adjusted to 9.5 using ammonium hydroxide. This gives a well dispersed sol of substantially discrete molybdenum disilicide particles, 80 to 100 millimicrons in size. The specific resistivity of this sol is found to be greater than 18,000 ohms, and the percent S as measured by viscosity is 95%.

The crystallite atomic extensity coefficient of the product as determined from nitrogen surface area measurement is 6.78.

EXAMPLES 23 to 26, INCLUSIVE

Additional examples of heteromorphous, submicron grained bodies of this invention in which juxtaposed units of a bocasi are maintained out of uniform contiguity by an interspersant of another colloidal bocasi are shown in Table I.

Emopling the procedure used in Example 11, in each example a sol of the bocasi employed for the juxtaposed units and a sol of another bocasi used for the interspersant, are mixed with ammonium bicarbonate solution, using equal volumes of the sols previously diluted to the concentrations shown in the table. The sols used are those of the examples listed by number. Isolation, drying, and micropulverizing the powders is carried out in accordance with the procedure used in Example 11; where indicated, densification is accomplished by Spex milling.

The hot pressing conditions are shown in each example, the temperature being increased at a uniform rate from room temperature to the maximum temperature shown, and held at this maximum temperature until the movement of the rams indicated that the densification of the specimen is complete. When the thickness of the specimen, as judged by ram movements, decreases at a rate less than 0.001″ per minute, the power is shut off and the specimen is immediately cooled.

In each of the bodies so produced, the particle size of the interspersant, as judged by X-ray line broadening and by electron micrographs, is less than the particle size of the juxtaposed units; the interspersant units are generally less than 300 millimicrons in average diameter. All of the heteromorphous, submicrograined bodies exemplified in Examples 23 to 26, inclusive, have a density greater than 90% of theoretical, and an average grain size less than one micron in diameter.

TABLE I

| Example No. | 23 | 24 | 25 | 26 |
|---|---|---|---|---|
| Heteromorphous Phases: | | | | |
| Juxtaposed Units | $ZrB_2$ | CrB | $MoSi_2$ | TiSi |
| Source of Sol. (Example) | 19 | 18 | 22 | 17 |
| Concentration (g./100 ml.) | 5.0 | 3.0 | 8.0 | 10.0 |
| Interspersant | SiC | SiC | SiC | SiC |
| Source of Sol. (Example) | 6 | 6 | 6 | 6 |
| Concentration (g./100 ml.) | 0.2 | 0.2 | 1.6 | 1.3 |
| Densification by Spex Milling | (¹) | (¹) | (²) | (¹) |
| Hot Pressing Conditions: | | | | |
| Pressure (p.s.i.) | 4,000 | 4,000 | 4,000 | 2,000 |
| Temperature When Pressed (° C.) | 1,500 | 1,400 | 30 | 30 |
| Heated From 30° C. to (° C.) | 2,000 | 1,450 | 1,700 | 1,350 |
| Time to Reach Top Temp. (Min.) | 12 | 8 | 10 | 7 |
| Molded Body Properties: | | | | |
| Percent of Theoretical Density | 98 | 99 | 98 | 98 |
| Percent Volume of Interspersant | 7 | | 28 | 15 |
| Diameter of Juxtaposed Units (m$\mu$) | 700 | 800 | 400 | 500–1,000 |
| Knoop Hardness (100 g. load) | | 1,200 | 1,600 | |
| Transverse Rupture (p.s.i.) | 80,000 | | 60,000 | |

¹ No. ² Yes.

EXAMPLE 27

This example illustrates the preparation of a finely divided powder consisting of a solid solution of titanium nitride in titanium carbide.

Three moles of titanium dioxide, 1 mole of calcium nitride, two moles of carbon and three moles of metallic calcium, all in the form of finely divided powders with the exception of the calcium, which is the form of small granules, are blended together uniformly and separated into five increments.

These are introduced into 1000 g. molten chloride maintained under an argon protective atmosphere in an "Inconel" liner equipped with an "Inconel" stirrer. Increments are added with a period of 10 minutes between each addition.

Following completion of the reaction, the salt melt is frozen, the salt cake crushed, and the salt dissolved in water which is acidified with acetic acid until the pH remains at 7. The resulting product is then washed with about ten times the settled volume of the reaction product, until the effluent waters no longer show a test for chloride ion. Recovery of the wet cake containing the product is accomplished in all instances by centrifuging through a high speed centrifuge. Where necessary to prevent peptization of the product, a pound of ammonium bicarbonate is added to keep it in a flocculated state.

When the aqueous solution no longer shows a test for chloride ion, the product is dried in a vacuum oven at 90° C. and characterized.

Chemical analysis shows this product to consist of 95% of a 33 mole percent mixture of titanium nitride in a 66 mole percent titanium carbide. The product contains about 3% oxygen. Nitrogen surface area measurements indicate the particle size to be about 40 millimicrons. The K' CuK$\alpha$ radiation is $4 \times 10^{-2}$.

EXAMPLE 28

This example illustrates the preparation of one of the composite powders of the invention and its fabrication into a dense, heteromorphous, submicrograined body.

The composition consists of 5 mole percent titanium nitride in 95 mole percent silicon carbide.

The procedures used in synthesizing the composite powder and its purification and recovery are the same as those of Example 27.

The following reaction blend is used. One mole of silica, one mole of carbon, $\frac{1}{10}$ mole titanium dioxide, $\frac{1}{20}$ mole calcium nitride, and 2.05 moles of calcium.

Following reaction and recovery, chemical analysis and X-ray characterization indicate the composition to consist of 95% by weight of a 5 mole percent titanium nitride, 95 mole percent silicon carbide composition. It also contains 5% by weight of oxygen. The nitrogen surface area indicates the average particle size is about 20 millimicrons, using the combined densities of the two phases weighted in their relative proportions.

X-rays show the presence of silicon carbide as the major constituent and a minor amount of titanium nitride. The K' CuK$\alpha$ radiation for the silicon carbide phase is $6 \times 10^{-2}$.

This material is fabricated using the procedure and equipment described in Example 10 by hot pressing at a temperature of 2300° C., for a period of 10 minutes, and a pressure of 5000 p.s.i The resulting dense, heteromorphous, submicrograined body of the invention is shown to consist of juxtaposed units of 300 millimicorns alpha and 300 millimicron beta silicon carbide enclosed within contiguous grains averaging 800 millimicrons, these two-phase silicon carbide grains being maintained out of a contiguous relationship with one another by 250 millimicron crystals of titanium nitride. The percentage of theoretical density of this composition is 95%.

EXAMPLE 29

This example illustrates the preparation of a 33 mole percent solid solution of aluminum nitride in silicon carbide. The procedure for synthesis and recovering the powder are the same as that shown in Example 27. The reaction mixture consists of 2 moles of silica, ½ mole of alumina, ½ mole of calcium nitride, 1 mole of carbon, and 2 moles of calcium.

Following synthesis and recovery, chemical analysis shows the composition to consist of 90% by weight of a solid solution of one mole of aluminum nitride in two moles of silicon carbide. Using the average density for this composition and the nitrogen surface area, an average particle size of 30 millimicrons is calculated. X-ray diffraction shows the powder to have a midified silicon carbide pattern in which the lines are displaced as the result of a solid solution of the aluminum nitride in the silicon carbide matrix. The CuK$\alpha$ for this composition is $6 \times 10^{-2}$. This product contains about 8% oxygen.

EXAMPLE 30

This example illustrates the preparation of a composite powder of the invention consisting of 5 mole percent boron nitride, and 95 mole percent silicon carbide, and its fabrication into a dense, heteromorphous, submicrograined body of the invention.

The equipment and procedures used in synthesis and in recovery are the same as those of Example 27, as was the choice of salt and temperature in the reaction.

The reaction mixture consists of 1 mole silica, $\frac{1}{20}$ mole boric oxide, $\frac{1}{20}$ mole calcium nitride, 1 mole carbon, and 2 moles calcium.

Following synthesis and recovery of the powder, chemical analysis and X-ray characterization show it to consist of 90% by weight of a 5 mole percent boron nitride and 95 mole percent silicon carbide, with about 5% oxygen being present. X-rays show the major phase to be silicon carbide, the minor phase boron nitride, and the K' CuK$\alpha$ radiation for the silicon carbide phase is $7 \times 10^{-2}$. Nitrogen surface area shows an average particle size of 20 millimicrons, using the average density of the two phases indicated by analysis.

Twenty grams of this powder are fabricated into a 1" diameter disc, using the pressing techniques and equipment of Example 10, a temperature of 2300° C., a pressure of 5000 p.s.i., and a holding time under pressure of 30 minutes.

The resulting dense submicrograin heteromorphous body of the invention had a density of 95% of theoretical, and is shown by X-ray, metallographic, and electron micrographic examination to consist of juxtaposed units of 300 millimicron silicon carbide grains maintained out of a continuous contiguous relationship with one another by 30 millimicron crystals of boron nitride.

EXAMPLE 31

This illustrates the preparation of a silicon carbide-carbon composite powder of the invention and its fabrication by hot pressing into a dense, heteromorphous, submicrograined body of the invention. This example also illustrates the use of carbon as reducing agent to deoxidize the colloidal silicon carbide materials of the invention. It also shows the effect of the pressing conditions on the density and mechanical properties of the final dense bodies of the invention.

The preparation of the silicon carbide sols and of the carbon sol are exactly as described in Example 12 with the exception of the fact that the silicon carbide sol is made up to a concentration of 8.5 cc. per liter and the carbide sol to a concentration of 1.5 cc. per liter. The sources and characterization of the silicon carbide and carbon sols are as described in Examples 4 and 12, respectively. Recovery of the powders after mixing and coflocculating with ammonium carbonate are as described in Example 12. The carbon deoxidation step is also conducted as in Example 12.

After deoxidation, the chemical analysis of the silicon carbide-carbon material is as follows: silicon, 59.0%, carbon, 33.6%, oxygen, 1.3%, nitrogen surface area, 54 m.$^2$/g., and X-rays show only beta silicon carbide with a trace of alpha, with the particle size from line broadening being approximately 47 millimicrons. It should be noted that the carbon deoxidation reduced the excess volume percent of free carbon from 15% prior to deoxidation at 1500° C. to about 9% afterward.

Five gram samples of this material are hot pressed using the equipment and procedure of Example 10 at a temperature of 2000° C., a pressure of 4000 p.s.i., and a holding time of 30 minutes after slumping has ceased in the first case, and a temperature of 2300° C., a pressure of 5000 p.s.i. and the same hold time in the second case.

The bar obtained by the 2000° C. pressing shows a percentage of theoretical density of 75% and a transverse rupture strength of 40,400 p.s.i. The 2300° C. pressing shows a density of 87.2% and a transverse rupture strength of 77,200 p.s.i. This illustrates the importance of optimizing pressing conditions using the compositions of this invention.

Electron micrograph, X-ray examination, and metallographic characterization show that the material pressed at 2000° C. consists of juxtaposed units of silicon carbide (primarily the beta crytalline modification) with a trace of carbon being present, the beta silicon carbide crystallites having an average crystal diameter of about 260 millimicrons. The juxtaposed units are maintained out of a uniform contiguous relationship with one another by the presence of 80 to 100 millimicron crystallites of carbon.

The heteromorphous, dense body obtained by pressing at 2300° C. shows beta silicon carbide crystallites of about 500 millimicrons diameter maintained out of a uniform contiguous relationship with one another by 100 to 200 millimicron particles of carbon.

EXAMPLES 32

This illustrates a preparation of a silicon carbide-carbon composition and its fabrication into a dense, heteromorphous, submicrograined body of the case.

The synthesis in molten salt of silicon carbide is performed as in Example 2, except that 15 volume percent carbon based on the theoretical volume yield of silicon carbide in the form of a 350 m.$^2$/g. colloidal carbon powder is added with each increment of silica and calcium carbide, thus giving an excess of carbon which is intimately mixed into the final product during the synthesis operation, rather than subsequently, as in Example 31.

The recovery of this product is accomplished as in Example 2, and chemical analysis shows that it does, in fact, have approximately 15 volume percent carbon in excess of that required to balance the silicon analysis in the form of silicon carbide.

This is heated at 1500° C. as in Example 31, after which the sample is hot pressed at a temperature of 2000° C. and 4000 p.s.i. and a hold time of 15 minutes after slumping has ceased. The equipment and procedure of Example 10 is used in hot pressing.

The resulting bar has a density of 86% of theoretical, and an average transverse rupture strength of 24,770 p.s.i. 1 X-ray, electron micrographic, and metallographic examination show juxtaposed units having an average particle size of approximately 300 millimicrons.

EXAMPLE 33

This example illustrates the preparation of a composition containing 95 volume percent silicon carbide and 5 volume percent zirconium dioxide, and its fabrication into a dense, heteromorphous submicrograined body of the invention. The silicon carbide sol prepared as described in Example 6 is diluted as described in Example 16 to a concentration of 9.5 cc. of silicon carbide per liter. The zirconium dioxide sol is prepared as described in Example 1 of U.S. Pat. No. 2,984,576. It contains 25% by weight of zirconium oxide and the particles are 10 millimicrons in diameter. The specific surface area of zirconia powder dried from the sol is 132 m.$^2$/g. This sol is diluted in the same fashion until its concentration is .5 cc./liter. These two sols are then simultaneously mixed and coflocculated, using the procedure described in Example 11, and recovered in the same fashion as described in that example.

Twenty grams of the resulting powder are hot pressed at a temperature of 2000° C., a pressure of 4000 p.s.i., and using a 15 minute hold time. The resulting dense, heteromorphous, submicrograined body has 93% of the theoretical density and is shown by X-ray, electron micrographic and metallographic examination to consist of juxtaposed units of 500 millimicron crystallites of silicon carbide, maintained out of a uniform contiguous relationship with one another by interposed crystals of 100 to 200 millimicron zirconia at the grain boundaries.

EXAMPLE 34

This example illustrates the preparation of a 96 volume percent silicon carbide, 4 volume percent alumina composite powder of the invention and its fabrication into a dense, heteromorphous, submicrograined body of the invention by hot pressing.

The silicon carbide sol of Example 7 is diluted as described in Example 16 to a concentration of 9.6 cc. of silicon carbide per liter. A sol is prepared of alumina monohydrate, "Baymal" Colloidal Alumina, a product of the E. I. du Pont de Nemours & Company, which is described in Example 33 of U.S. Pat. No. 2,915,475. This is adjusted in such a fashion that the concentration of alumina is 0.6 cc./liter. The alumina content of the alumina monohydrate is approximately 69%. This is taken into account, and the total amount of alumina employed is sufficient to allow for the weight loss upon elimination of the water content of the monohydrate. These sols are simultaneously mixed and coflocculated with ammonium carbonate as described in Example 11, and recovery was also effected as described in this example.

Twenty grams of the resulting silicon carbide-alumina composite powder of the invention are hot pressed in a 1" diameter mold, using the equipment and procedure of Example 10 at a temperature of 2000° C., a pressure of 4000 p.s.i., and employing a holding time of 5 minutes after slumping ceases, as indicated by the motion of the rams of the press.

The resulting body has a density of 98% of theoretical density for this composition and is shown by X-ray, metallographic, and electron micrographic examination to consist of juxtaposed units of 300 millimicron alpha silicon carbide, 300 millimicron beta silicon carbide, these being the constituents of approximately 600 millimicron diameter, two-phase grains, with the grains being maintained out of a uniform contiguous relationship with one another by interposed crystals of alumina having a particle diameter of 128 millimicrons. The transverse rupture strength of this composition is 94,000 p.s.i., its Knoop hardness under 1000 g. load, is 200 to 2200, and its impact strength is 10 ft. lbs./sq. in. Upon testing of the transverse rupture strength of 1200° C., it is found that its strength is still 50,000 p.s.i.

EXAMPLE 35

This example illustrates the preparation of a silicon carbide-10 volume percent alumina composition by the in situ deoxidation of the contained oxygen content of the silicon carbide by means of intermixing with aluminum metal powder and subsequent reaction to form the alumina grain growth inhibiting phase in situ.

It also illustrates the critical importance of adding just sufficient aluminum to react with all of the contained oxygen in the form of silica in the sample, and of attaining the correct pressing conditions.

A silicon carbide powder obtained as described in Example 2 is ballmilled using the conditions of Example 4, after which it is purified first by treatment with HCl, as described in Example 4, and then, to rid it of excess silica, treated by allowing it to stand for 24 hours in 24% concentration or hydrofluoric acid. Following this, the silicon carbide powder is filtered, washed twice with distilled water, and suspended in a one molar concentration of the tetrasodium salt of ethylenediamine tetraacetic acid or "Versene," as described in Example 7. The product is washed free of "Versene" and dried overnight in a vacuum oven. The resulting disaggregated, purified powder has the following chemical analysis (percent): silicon, 63.3; carbon, 25.4; oxygen, 4.6; calcium oxide, 1.0; $Al_2O_3$, 0.2; and $Cr_2O_3$. 0.1; NiO, 0.1. No other impurities were found by emission spectrographic examination. This powder is mixed with varying quantities of an aluminum flake pigment having the following composition: 92%, alumina, 7% $Al_2O_3$ in the form of an oxide film on the surface of the pigment flakes, and .6% stearic acid. This is a pigment grade flake aluminum powder produced by Aluminum Company of America, and designated "ND–3100."

This aluminum flake pigment is blended and milled with the silicon carbide using the procedure described in Example 10. The following table shows the percent of added alumina, along with the percent of theoretical density, the transverse rupture strength, the Knoop hardness, and the impact strength of a series of bars prepared by hot pressing the aluminum-silicon carbide powders at 2000° C., a pressure of 4000 p.s.i., and employing a holding time of 5 minutes after all slumping ceases, as indicated by the motion of the rams of the press.

| Percent Added Al | Percent Theor. Density | Measured Density | Trans. Rupt. Strength | Knoop Hardness | Impact Strength |
|---|---|---|---|---|---|
| 0 | 79.7 | 2.55 | 18,771 | 392 | 8.1 |
| 2.0 | 91.3 | 2.94 | 27,046 | 1,037 | 2.1 |
| 2.5 | 93.2 | 3.00 | 41,304 | 646 | 4.4 |
| 3.1 | 97.5 | 3.12 | 42,181 | 1,800 | 1.7 |
| 5.4 | 97.5 | 3.12 | 50,033 | 1,581 | 2.7 |
| 5.7 | 96.5 | 3.11 | 41,669 | 1,786 | 1.3 |
| 7.4 | 98.0 | 3.15 | 48,070 | 1,594 | 5.0 |
| 8.0 | 97.5 | 3.11 | 49,814 | 1,415 | 3.6 |
| 9.1 | 95.6 | 3.08 | 30,369 | 2,104 | 1.1 |
| 9.4 | 90.7 | 2.92 | 22,415 | 1,675 | |
| 16.7 | 91.3 | 2.94 | 17,248 | 1,380 | 3.8 |

X-ray, electron micrographic, and metallographic examination of these bars shows that they consist of juxtaposed units of silicon carbide, approximately 300 millimicrons in size, maintained out of a uniform contiguous relationship with one another by interposed units of alumina having an average crystallite size of 300 millimicrons also.

It will be noted from this table that when the weight ratio of aluminum metal (after correction for its alumina content) to the contained oxygen in the purified carbide is close to that found in $Al_2O_3$, the highest densities, coupled with the best transverse rupture strengths and the highest hardnesses are found. Either too little or too much aluminum results in a fall-off of the approach to theoretical density and a fairly rapid decrease in the transverse rupture strength and hardness. This illustrates the importance of tieing up the oxygen present in silicon carbide in the form of siilca with an active metal, which produces a refractory oxide having a relatively low vapor pressure at fabrication temperatures. It also illustrates the criticality of avoiding excess deoxidizing agent.

Further studies are made employing 7.40% aluminum, to determine the optimum pressing conditions in regard to time and temperature for this composition. It is found that complete densification does not occur on pressing at temperatures of 1800 and 1900° C., and that pressing above 2000° C. also causes decreasing density and a fall-off in transverse rupture strength. It is also found that a holding time of approximately 30 minutes after the cessation of slumping of the sample appears to be close to the optimum. A sample containing 7.40% aluminum is pressed under optimum conditions, and is shown to have an average transverse rupture strength of 75,000 p.s.i., a hardness of 2000, and an impact strength of 8 ft. lbs./sq. in.

EXAMPLE 36

This example illustrates the preparation of a 97 volume percent silicon-3 volume percent thoria composite powder of the invention, and its fabrication by hot pressing into a dense, heteromorphous, submicrograined body of the invention.

A silicon carbide sol prepared as described in Example 4 is diluted as described in Example 16 to a concentration of 9.7 cc. of silicon carbide per liter.

Solution B is an aqueous colloidal solution of thorium oxide made by dispersing calcined thorium oxalate, $Th(C_2O_4)_2$ in water containing a trace of nitric acid, the thorium oxalate having been precipitated from thorium nitrate. The oxalate precipitate is washed, dried at 650° C. for 2 hours, slurried in 6 N nitric acid for 2 hours, centrifuged, and the precipitate reslurried in water, recentrifuged and finally slurried in water with sufficient anion exchange resin in the hydroxyl form to raise the pH to 3.5. The resulting thoria sol contains thorium oxide particles 25 millimicrons in diameter. This sol is diluted with water, as was the silicon carbide sol, to a concentration of 0.3 cc. per liter. These sols are coflocculated and mixed simultaneously, as described in Example 11 using ammonium carbonate solution as the flocculant.

The resulting composite powder is hot pressed using the equipment and procedure of Example 10 at a temperature of 2000° C., a holding time of 30 minutes, and a pressure of 4000 p.s.i.

A bar having 100% of the theoretical density is obtained which has a transverse rupture strength of 40,000 p.s.i., and a Knoop hardness under a 100 g. load of 2000 to 2500. It is shown by X-ray, electron micrographic, and metallographic characterization to consist of juxtaposed units of alpha silicon carbide (Types 5 and 3) having an average crystallite size of 150 millimicrons, maintained out of a uniform contiguous relationship with one another by spherical particles of thoria averaging 130 millimicrons in diameter. It is noted in this sample that the distribution of the thoria is not completely uniform, there being thoria-rich areas and other regions which contain relatively less thoria.

EXAMPLE 37

This example illustrates the preparation of a 90 volume percent silicon carbide-10 volume percent zircon ($ZrSiO_3$) composite powder of the invention and its fabrication by hot pressing into a dense, heteromorphous, submicrograined body of the invention.

A silicon carbide sol of Example 6 is diluted as described in Example 16 to a concentration of 9 cc. of silicon carbide per liter.

A sol is prepared comprising the zirconia sol of Example 33, and a sol of "Ludox" Colloidal Silica in a 1 to 1 mole ratio. This composite $ZrO_2$–$SiO_2$ sol is prepared by deionizing the colloidal silica sol with the hydrogen form of a strong acid cation exchange resin to a pH of 3, further lowering the pH by the addition of a small amount of concentrated HCl to 2.5, and mixing this in a 1 to 1 mole ratio with the previously noted zirconia sol. A homogeneous, dispersed, mixed sol thus results.

This is adjusted as described in Example 16 to a concentration of .5 of a cc. of contained zircon per liter. In computing the volume fraction of zircon, sufficient zirconia and silica of 1 to 1 mole ratio are provide to give a .5 cc. per liter concentration, using the density of zircon in computing the volume concentration, rather than the individual densities of zirconia and silica.

This mixed sol is then simultaneously mixed and flocculated with the silicon carbide sol as in Example 11, with recovery of the powder being effected also as in Example 11.

The product is hot pressed at a temperature of 2000° C., and a pressure of 4000 p.s.i., using a holding time of 5 minutes at reaction temperature.

The resulting dense, heteromorphous, submicrograined body has 98% of theoretical density, a transverse rupture strength of 95,000 p.s.i., and a Knoop hardness of about 2000. It is shown by X-ray, electron micrographic and and metallographic characterization to consist of 200 millimicron juxtaposed units of silicon carbide maintained out of a uniform contiguous relationship with one another by a continuous grain boundary phase consisting of 100 millimicron crystallites of zircon.

EXAMPLE 38

This illustrates the preparation of a composite containing 92 volume percent silicon carbide and 8 volume percent of mullite (a crystalline aluminosilicate) as a composite powder of the invention, and its fabrication by hot pressing into a dense, heteromorphous, submicrograined body of the invention.

A silicon carbide sol of Example 4 is adjusted to a concentration of 9.2 cc. of silicon carbide per liter and an alumina sol prepared from "Baymal" colloidal aluminal as described in Example 34 is adjusted to a concentration of 6 cc. of contained alumina per liter. It will be recalled that the alumina sol is initially in the form of a monohydrate. Thus about 30% more by weight of the monohydrate is used in order to give the indicated volume of anhydrous alumina. A carbon sol such as that described in Example 12 is also mixed simultaneously as a third feed stream, with the alumina and silicon carbide sols, in an amount sufficient to give 3 weight percent carbon based on the silicon carbide solids in the composition. These three sols are mixed and flocculated simultaneously with ammonium carbonate as described in Example 11. Recovery is also effected as in this example.

The resulting composite powder is heated at 1500° C. in an alundum tube protected with an argon atmosphere for a period of 8 hours. Chemical analysis of the resulting deoxidized composite powder shows that it contains just enough oxygen in the form of silica to combine with the alumina present to give the silica to alumina ratio as found in mullite.

This powder is presented at 2000° C., and 4000 p.s.i. using the equipment and procedure of Example 10 with the holding time being 30 minutes after slumping ceases, as indicated by the cessation of movement of the rams of the press.

The resulting dense, heteromorphous, submicrograined body of the invention is shown by X-ray, electron micrographic, and metallographic examination to consist of 250 millimicron crystallites of juxtaposed units of beta and alpha silicon carbide, maintained out of uniform contiguous relationship with one another by 300 millimicron crystallites of mullite.

The transverse rupture strength of this composition is 92,000 p.s.i., its Knoop hardness is 2000 and its impact strength is 8 ft. lbs./in.$^2$.

EXAMPLE 39

This example illustrates the preparation of a silicon carbide, aluminum carbide composition of the invention by an in situ reaction between a silicon carbide, alumina composite powder and the carbon mold of the hot press upon holding the composition in the press for a long period of time.

Some of the powder composition of Example 34 is held in the press, as a thin ¼" diameter wafer in contact on all sides and above and below with carbon for a period of 45 minutes at a temperature of 2000° C. The pressure employed is 4000 p.s.i. Sectioning of this wafer shows that a reaction has occurred between the carbon mold and the alumina dispersant to virtually completely reduce the alumina and convert it into aluminum carbide. This is confirmed by chemical analysis which shows sufficient aluminum to provide for as much as 8 weight percent $Al_2O_3$ in the composition, but only a sufficient amount of oxygen to account for about 2% $Al_2O_3$.

The density of this wafer is 98% of theory, and X-ray, electron micrograph and metallographic examination show it to consist of juxtaposed units of silicon carbide about 130 millimicrons in diameter, maintained out of a uniform contiguous relationship with one another by the presence of crystallites of aluminum carbide and admixed therewith crystallites of corundum ($Al_2O_3$). The aluminum carbide crystallites are about 100 millimicrons in diameter, and those of the alumina are about 150 millimicrons.

The transverse rupture strength of this wafer is 94,000 p.s.i. and its impact strength is 3 ft. lbs./in.$^2$. The Knoop hardness using a 1000 gram load is 2200.

EXAMPLE 40

This illustrates the preparation of a dense, solid body of the invention containing 15.7 volume percent of boron carbide ($B_4C$) with the balance of the composition being colloidal silicon carbide. The silicon carbide sol of Example 7 is simultaneously mixed and coflocculated with a carbon sol of the type described in Example 12, using the procedure of Example 12. Sufficient carbon sol is employed to furnish 6.27 grams of the solids of this carbon sol based on the weight of the solids from the silicon carbide sol.

After drying in a vacuum oven, the resulting powder is heated in an alundum furnace under vacuum for a period of 10 hours at a temperature of 1530° C. The resulting powder shows an analysis of 67.9% silicon, 31.7% carbon, and 0.34% oxygen. Characterization of this powder by X-ray diffraction indicates the crystallite size (as determined by line broadening) is approximately 40 millimicrons, with the silicon carbide in beta crystal modification.

This powder is ballmilled with 10% by weight of commercial amorphous boron of the type described in Example 12. The milling procedure and equipment are the same as those employed in Example 12. After the powder is recovered from the mill, washed, and dried as described in Example 12, it has the following analysis: 9.95% boron, 87.2% silicon carbide, 2.5% carbon, and 0.31% oxygen.

This is fabricated by hot pressing, using the procedure and equipment of Example 10, with 9 grams of the powder being hot pressed in a 1" diameter carbon mold at a pressure of 4000 p.s.i., a temperature of 2000° C., and a holding time of 5 minutes after slumping ceases, as indicated by the cessation of movement of the rams of the press.

The resulting body is shown by X-ray, electron micrographic, and metallographic examination, to consist of juxtaposed units of 200 millimicron silicon carbide maintained out of a uniform contiguous relationship to one another by 100 to 200 millimicron crystallites of boron carbide. The boron carbide crystallites virtually completely occupy the intergrain boundaries between the particles of silicon carbide.

The transverse rupture strength of this product is 150,000 p.s.i. at room temperature, and 125,000 p.s.i. at 1200° C. Its Knoop hardness using a 100 g. load is 2700. Its impact strength is 10 ft. lbs./sq. in.

We claim:

1. In a process for producing a particulate silicon carbide wherein the silicon carbide particles have an average ultimate size of 1 to 250 millimicrons and are further characterized by having an X-ray diffraction line broadening coefficient, K', of from $9 \times 10^{-2}$ to $3.6 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of monochromatized Cu K$\alpha$ radiation X-rays, and $2\theta$ is the angle of deviation of the diffracted beam, the steps comprising dispersing in molten metal halide bath at 400 to 1100° C. a reducing agent selected from the group consisting of alkali and alkaline earth metals, together with at least a pair of reactants, of which one contains silicon and another contains carbon, the proportions of said reactants being such that the atomic ratio of silicon and carbon in the separate reactants is the same as that in the desired silicon carbide, at least one of said reactants being a compound wherein silicon has a positive valence, and the proportion of reducing agent being about that stoichiometrically required to reduce said positive-valenced silicon to its zero-valence, elemental form, whereby chemical reaction occurs to form the particulate silicon carbide, continuing the heating until the silicon carbide particles become flocculated, and separating the flocculated silicon carbide from the salt bath.

2. In a process for producing particulate silicon carbide containing chemically combined oxygen, wherein the silicon carbide particles have an average ultimate size of 1 to 250 millimicrons and are further characterized by having an X-ray diffraction line broadening coefficient, K', of from $9 \times 10^{-2}$ to $3.6 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of monochromatized Cu K$\alpha$ radiation X-rays, and $2\theta$ is the angle of deviation of the diffracted beam, the steps comprising dispersing in a molten metal halide bath at 400 to 1100° C. a reducing agent selected from the group consisting of alkali and alkaline earth metals together with at least a pair of reactants, one of which contains silicon and another contains carbon, the proportions of said reactants being such that the atomic ratio of silicon to carbon in the separate reactants is the same as that in the desired silicon carbide, at least one of said reactants bein a compound wherein silicon has a positive valence, and the proportion of reducing agent being about that stoichiometrically required to reduce the silicon to its zero-valence, elemental form, whereby chemical reaction occurs to form the particulate silicon carbide continuing the heating until the silicon carbide particles become flocculated, separating the flocculated particles from the salt bath, and exposing them to an oxygen-containing environment until there is combined with the silicon carbide a percentage of oxygen, based on the total weight of the composition, of from $$\frac{18D^2 + 12D + 2}{D(\rho D + 1.8D + 1.2)}$$

to 25, where D is the average particle size in millimicrons and $\rho$ is the density of the silicon carbide in grams per milliliter.

3. In a process for producing particulate silicon carbide wherein the silicon carbide particles have an average ultimate size of 10 to 200 millimicrons and are further characterized by having an X-ray diffraction line broadening coefficient, K', of from $9 \times 10^{-2}$ to $3.6 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of monochromatized Cu K$\alpha$ radiation X-rays, and $2\theta$ is the angle of deviation of the diffracted beam, the steps comprising dispersing with agitation in a molten metal halide bath at 600 to 1000° C. a reducing agent selected from the group consisting of alkali and alkaline earth metals, together with a pair of reactants, one of which contains silicon and the other contains carbon, the ratio of said reactants being such that the atomic ratio of silicon to carbon in the separate reactants is the same as that in the desired silicon carbide, at least one of said reactants being a compound wherein silicon has a positive valence, and the proportion of reducing agent being that stoichiometrically required to reduce said positive-valenced silicon to its zero-valence, elemental form, and the concentration of silicon and carbon in the fused salt bath being maintained at least 100-fold the concentrations required by the solubility product of the silicon carbide to be produced, whereby chemical reaction occurs to form the particulate silicon carbide, continuing the heating until the silicon carbide particles become flocculated, and separating the flocculated particles from the fused salt bath by cooling the mixture to ordinary atmospheric temperature, dissolving soluble constituents thereof in aqueous acid, and centrifuging out the said silicon carbide particles.

4. A process of claim 3 wherein the reactants are added continuously to the fused salt bath during the course of the reaction.

5. A process of claim 3 wherein the reactants are added to the fused salt bath in periodic, stoichiometrically equivalent increments during the course of the reaction.

6. A process of claim 3 wherein the flocculated silicon carbide, after separation from the salt bath, is exposed to an oxygen-containing environment until it is combined with a weight percentage of oxygen, based on the total weight of the composition, of from $30/\rho D$ to 10, where D is the average particle size in millimicrons and $\rho$ is the density of the silicon carbide in grams per milliliter.

7. In a process for producing particulate silicon carbide, wherein the silicon carbide particles have a crystallite atomic extensity coefficient, E, from 4.60 to 8.80 and are further characterized by having an X-ray diffraction line broadening coefficient, K', of from $9 \times 10^{-2}$ to $3.6 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of monochromatized Cu K$\alpha$ radiation X-rays, and $2\theta$ is the angle of deviation of the diffracted beam, the steps comprising dispersing in a molten metal halide bath at 400 to 1100° C. a reducing agent selected from the group consisting of alkali and alkaline earth metals, together with at least a pair of reactants, of which one contains silicon and another contains carbon, the proportions of said reactants being such that the atomic ratio of silicon to carbon in the separate reactants is the same as that in the desired silicon carbide, at least one of said reactants being a compound wherein silicon has a positive valence, and the proportion of reducing agent being about that stoichiometrically required to reduce said positive-valenced silicon to its zero-valence, elemental form, whereby chemical reaction occurs to form the particulate silicon carbide continuing the heating until the silicon carbide particles become flocculated, and separating the flocculated silicon carbide from the salt bath.

8. In a process for producing particulate silicon carbide containing chemically combined oxygen, wherein the oxygen-modified silicon carbide particles have a crystallite atomic extensity coefficient from 4.60 to 8.80 and are further characterized by having an X-ray diffraction line broadening coefficient, K', of from $9 \times 10^{-2}$ to $3.6 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of monochromatized Cu K$\alpha$ radiation X-rays, and $2\theta$ is the angle of deviation of the diffracted beam, the steps comprising dispersing in a molten metal halide bath at 400 to 1100° C. a reducing agent selected from the group consisting of alkali and alkaline earth metals together with at least a pair of reactants, one of which contains silicon and another contains carbon, the proportions of said reactants being such that the atomic ratio of silicon to carbon in the separate reactants is the same as that in the desired silicon carbide, at least one of said reactants being a compound wherein silicon has a positive valence, and the proportion of reducing agent being about that stoichiometrically required to reduce said positive-valenced silicon to its zero-valence, elemental form, whereby chemical reaction occurs to form the particulate silicon carbide, continuing the heating until the silicon carbide particles become flocculated, separating the flocculated particles from the salt bath, and exposing them to an oxygen-containing environment until there is combined with the silicon carbide a percentage of oxygen, based on the total weight of the composition, of from $$\frac{18D^2+12D+2}{D(\rho D+1.8D+1.2)}$$

to 25, where D is the average particle size in millimicrons and $\rho$ is the density of the silicon carbide in grams per milliliter.

9. In a process for producing particulate silicon carbide, wherein the silicon carbide particles have a crystallite atomic extensity coefficient, E, of 4.60 to 8.10 and are further characterized by having an X-ray diffraction line broadening coefficient, K', of from $9 \times 10^{-2}$ to $3.6 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of monochromatized Cu K$\alpha$ radiation X-rays, and $2\theta$ is the angle of deviation of the diffracted beam, the steps comprising dispersing with agitation in a molten metal halide bath at 600 to 1000° C. a reducing agent selected from the group consisting of alkali and alkaline earth metals, together with a pair of reactants, one of which contains silicon and the other contains carbon, the ratio of said reactants being such that the atomic ratio of silicon to carbon in the separate reactants is the same as in the desired silicon carbide, at least one of said reactants being a compound wherein silicon has a positive valence, and the proportion of reducing agent being that stoichiometrically required to reduce said positive-valenced silicon to its zero-valence, elemental form, and the concentration of said silicon and carbon in the fused salt bath being maintained at at least 100-fold the concentrations required by the solubility product of the silicon carbide to be produced, whereby chemical reaction occurs to form the particulate silicon carbide, continuing the heating until the silicon carbide particles become flocculated, and separating the flocculated particles from the fused salt bath by cooling the mixture to ordinary atmospheric temperature, dissolving soluble constitutents thereof in aqueous acid, and centrifuging out the said particles.

10. A process of claim 9 wherein the reactants are added continuously to the fused salt bath during the course of the reaction.

11. A process of claim 9 wherein the reactants are added to the fused salt bath in periodic, stoichiometrically equivalent increments during the course of the reaction.

12. A process of claim 9 wherein the flocculated silicon carbide, after separation from the salt bath, is exposed to an oxygen-containing environment until it is combined with a weight percentage of oxygen, based on the total weight of the composition, of from $30/\rho D$ to 10, where D is the average particle size in millimicrons and $\rho$ is the density of the silicon carbide in grams per milliliter.

References Cited

UNITED STATES PATENTS

| | | | |
|---|---|---|---|
| 3,138,468 | 6/1964 | Matkovich et al. | 23—204 |
| 492,767 | 2/1893 | Acheson | 23—208 |
| 722,792 | 3/1903 | Acheson | 106—55 |
| 2,124,509 | 7/1938 | McKenna | 23—208 |
| 2,827,371 | 3/1958 | Quin | 23—204 |
| 3,147,159 | 9/1964 | Lowe | 148—1.6 |
| 3,175,884 | 3/1965 | Kuhn | 23—208 |

OSCAR R. VERTIZ, Primary Examiner

H. S. MILLER, Assistant Examiner

U.S. Cl. X.R.

23—204; 106—55; 148—1.6